US012503482B2

(12) United States Patent
Rhijn et al.

(10) Patent No.: US 12,503,482 B2
(45) Date of Patent: Dec. 23, 2025

(54) COMPOSITIONS AND METHODS FOR TREHALOSE PHOSPHOLIPIDS

(71) Applicants: The Brigham and Women's Hospital, Inc., Boston, MA (US); Rijksuniversiteit Groningen, Groningen (NL)

(72) Inventors: Ildiko Van Rhijn, Amsterdam (NL); Adriaan J. Minnaard, Groningen (NL); D. Branch Moody, W. Roxbury, MA (US); Tan-Yun Cheng, Ashland, MA (US); Jeffrey Buter, Groningen (NL)

(73) Assignees: The Brigham and Women's Hospital, Inc., Boston, MA (US); Rijksuniversiteit Groningen, Groningen (NL)

( * ) Notice: Subject to any disclaimer, the term of this patent is extended or adjusted under 35 U.S.C. 154(b) by 1200 days.

(21) Appl. No.: 17/421,312

(22) PCT Filed: Jan. 8, 2020

(86) PCT No.: PCT/US2020/012777
§ 371 (c)(1),
(2) Date: Jul. 7, 2021

(87) PCT Pub. No.: WO2020/146523
PCT Pub. Date: Jul. 16, 2020

(65) Prior Publication Data
US 2022/0119438 A1    Apr. 21, 2022

Related U.S. Application Data

(60) Provisional application No. 62/789,651, filed on Jan. 8, 2019.

(51) Int. Cl.
| C07H 11/04 | (2006.01) |
| A61K 31/7028 | (2006.01) |
| A61K 39/00 | (2006.01) |
| A61K 39/002 | (2006.01) |
| A61K 39/02 | (2006.01) |
| A61K 39/39 | (2006.01) |
| A61K 45/06 | (2006.01) |
| C07H 15/04 | (2006.01) |
| C07K 16/44 | (2006.01) |
| C12Q 1/10 | (2006.01) |
| G01N 33/92 | (2006.01) |

(52) U.S. Cl.
CPC .......... *C07H 11/04* (2013.01); *A61K 39/0002* (2013.01); *A61K 39/002* (2013.01); *A61K 39/02* (2013.01); *A61K 39/39* (2013.01); *A61K 45/06* (2013.01); *C07K 16/44* (2013.01); *C12Q 1/10* (2013.01); *G01N 33/92* (2013.01); *A61K 2039/55566* (2013.01); *G01N 2405/06* (2013.01)

(58) Field of Classification Search
None
See application file for complete search history.

(56) References Cited

U.S. PATENT DOCUMENTS

| 4,624,919 A * | 11/1986 | Kokusho | C12P 19/44 435/74 |
| 5,354,853 A * | 10/1994 | Staveski | C07H 15/04 536/124 |
| 6,468,798 B1 | 10/2002 | Debs et al. | |
| 8,163,713 B2 * | 4/2012 | Nishizawa | A61P 11/00 514/53 |
| 9,023,763 B2 * | 5/2015 | Sagar | A01N 57/24 504/210 |
| 2003/0206914 A1 * | 11/2003 | Porcelli | A61P 37/04 424/184.1 |
| 2010/0249057 A1 * | 9/2010 | Nishizawa | A61P 25/18 536/123.13 |
| 2012/0263649 A1 | 10/2012 | Backus et al. | |
| 2014/0113820 A1 * | 4/2014 | Sagar | A01N 57/16 504/196 |
| 2015/0031075 A1 | 1/2015 | Binsfeld et al. | |
| 2020/0369704 A1 * | 11/2020 | Burkhart | A61K 39/39 |

FOREIGN PATENT DOCUMENTS

| WO | WO 2018/060514 | 4/2018 | |
| WO | WO-2019169313 A1 * | 9/2019 | ......... A61K 31/7056 |

OTHER PUBLICATIONS

Mishra, Vivek K., et al. "Total synthesis of an immunogenic trehalose phospholipid from *Salmonella typhi* and elucidation of its sn-regiochemistry by mass spectrometry." Organic letters 21.13 (2019): 5126-5131. (Year: 2019).*
Reinink, Peter, et al. "Discovery of *Salmonella* trehalose phospholipids reveals functional convergence with mycobacteria." Journal of Experimental Medicine 216.4 (2019): 757-771. (Year: 2019).*
Adam et al., "Mass spectrometry of glycolipids. 2. Natural and synthetic diesters of trehalose," European Journal of Biochemistry, Nov. 1, 1967, 2(4):460-8.
Andrews et al., "Typhoid conjugate vaccines: a new tool in the fight against antimicrobial resistance," The Lancet Infectious Diseases, Jan. 1, 2019, 19(1):e26-30.
Backus et al., "The three *Mycobacterium tuberculosis* antigen 85 isoforms have unique substrates and activities determined by non-active site regions," Journal of Biological Chemistry, Sep. 5, 2014, 289(36):25041-53.

(Continued)

*Primary Examiner* — Bethany P Barham
*Assistant Examiner* — Peter Anthopolos
(74) *Attorney, Agent, or Firm* — Fish & Richardson P.C.

(57) ABSTRACT

Provided herein are compositions of trehalose phospholipids and uses thereof, e.g., compounds and compositions comprising 6,6'-diphosphatidyltrehalose (diPT) and analogs thereof with modifications of the diPT chemical scaffold, that bind and agonize Mincle, and the use thereof as adjuvants.

10 Claims, 32 Drawing Sheets
Specification includes a Sequence Listing.

(56) References Cited

OTHER PUBLICATIONS

Behler-Janbeck et al., "C-type lectin Mincle recognizes glucosyl-diacylglycerol of *Streptococcus pneumoniae* and plays a protective role in pneumococcal pneumonia," PLoS pathogens, Dec. 6, 2016, 12(12):e1006038, 25 pages.

Belisle et al., "Role of the major antigen of *Mycobacterium tuberculosis* in cell wall biogenesis," Science, May 30, 1997, 276(5317):1420-2.

Burbaud et al., "Trehalose polyphleates are produced by a glycolipid biosynthetic pathway conserved across phylogenetically distant mycobacteria," Cell Chemical Biology, Feb. 18, 2016, 23(2):278-89.

Capella-Gutiérrez et al., "trimAI: a tool for automated alignment trimming in large-scale phylogenetic analyses," Bioinformatics, Aug. 1, 2009, 25(15):1972-3.

Coxon et al., "The synthesis of both enantiomers of lactobacillic acid and mycolic acid analogues," Tetrahedron Letters, Sep. 3, 1999, 40(36):6689-92.

Decout et al., "Rational design of adjuvants targeting the C-type lectin Mincle," Proceedings of the National Academy of Sciences, Mar. 7, 2017, 114(10):2675-80.

Del Fresno et al., "Flexible signaling of myeloid C-type lectin receptors in immunity and inflammation," Frontiers in Immunology, Apr. 26, 2018, 9:804, 13 pages.

Edgar, "MUSCLE: multiple sequence alignment with high accuracy and high throughput," Nucleic Acids Research, Mar. 1, 2004, 32(5):1792-7.

Fahy et al., "Update of the Lipid Maps comprehensive classification system for lipids1," Journal of Lipid Research, Apr. 1, 2009, 50:S9-14.

Feinberg et al., "Mechanism for recognition of an unusual mycobacterial glycolipid by the macrophage receptor mincle," Journal of Biological Chemistry, Oct. 4, 2013, 288(40):28457-65.

Fodran et al., "Catalytic synthesis of enantiopure mixed diacylglycerols-synthesis of a major M. tuberculosis phospholipid and platelet activating factor," Organic & Biomolecular Chemistry, Aug. 2013, 11(40):6919, 27 pages.

Furukawa et al., "Structural analysis for glycolipid recognition by the C-type lectins Mincle and MCL," Proceedings of the National Academy of Sciences, Oct. 22, 2013, 110(43):17438-43.

Geisel et al., "In vivo activity of released cell wall lipids of *Mycobacterium bovis* bacillus Calmette-Guerin is due principally to trehalose mycolates," The Journal of Immunology, Apr. 15, 2005, 174(8):5007-15.

Gheysen et al., "Rapid identification of common hexapyranose monosaccharide units by a simple TOCSY matching approach," Chemistry—A European Journal, Oct. 10, 2008, 14(29):8869-78.

Gilbertson et al., "Synthesis of new disugar phosphine ligands and their use in asymmetric hydrogenation," The Journal of Organic Chemistry, Sep. 1995, 60(19):6226-8.

Grogan et al., "Cyclopropane ring formation in membrane lipids of bacteria," Microbiology and Molecular Biology Reviews, Dec. 1997, 61(4):429-41.

Guo et al., "A second *Escherichia coli* protein with CL synthase activity," Biochimica et Biophysica Acta (BBA)—Molecular and Cell Biology of Lipids, Jan. 17, 2000, 1483(2):263-74.

Hildebrand et al., "Fatty acid distribution in bacterial phospholipids: The specificity of the cyclopropane synthetase reaction," Biochemistry, Sep. 1, 1964, 3(9):1304-8.

Holten-Andersen et al., "Combination of the cationic surfactant dimethyl dioctadecyl ammonium bromide and synthetic mycobacterial cord factor as an efficient adjuvant for tuberculosis subunit vaccines," Infection and Immunity, Mar. 2004, 72(3):1608-17.

Ishikawa et al., "Direct recognition of the mycobacterial glycolipid, trehalose dimycolate, by C-type lectin Mincle," Journal of Experimental Medicine, Dec. 21, 2009, 206(13):2879-88.

Jacobsen et al., "Enantioselective catalytic ring opening of epoxides with carboxylic acids," Tetrahedron Letters, Feb. 3, 1997, 38(5):773-6.

James et al., "CD1b tetramers identify T cells that recognize natural and synthetic diacylated sulfoglycolipids from *Mycobacterium tuberculosis*," Cell Chemical Biology, Apr. 19, 2018, 25(4):392, 26 pages.

Knothe, "NMR characterization of dihydrosterculic acid and its methyl ester," Lipids, Apr. 2006, 41(4):393-6.

Layre et al., "A comparative lipidomics platform for chemotaxonomic analysis of *Mycobacterium tuberculosis*," Chemistry & Biology, Dec. 23, 2011, 18(12):1537-49.

Layre et al., "Human T cells use CD1 and MR1 to recognize lipids and small molecules," Current Opinion in Chemical Biology, Dec. 2014, 23:31-8.

Layre et al., "Lipidomic profiling of model organisms and the world's major pathogens," Biochimie, Jan. 1, 2013, 95(1):109-15.

Li et al., "In vivo and in vitro synthesis of phosphatidylglycerol by an *Escherichia coli* cardiolipin synthase," Journal of Biological Chemistry, Nov. 25, 2016, 291(48):25144-53.

Liao et al., "An efficient and general method for resolving cyclopropene carboxylic acids," Tetrahedron, Feb. 16, 2004, 60(8): 1803-16.

Madigan et al., "Lipidomic discovery of deoxysiderophores reveals a revised mycobactin biosynthesis pathway in *Mycobacterium tuberculosis*," Proceedings of the National Academy of Sciences, Jan. 24, 2012, 109(4):1257-62.

Matsunaga et al., "*Mycobacterium tuberculosis* pks12 produces a novel polyketide presented by CD1c to T cells," The Journal of Experimental Medicine, Dec. 2004, 200(12):1559-69.

Mishra et al., "Total Synthesis of an Immunogenic Trehalose Phospholipid from *Salmonella typhi* and Elucidation of Its sn-Regiochemistry by Mass Spectrometry," Organic Letters, Jun. 20, 2019, 21(13):5126-31.

Mogasale et al., "Burden of typhoid fever in low-income and middle-income countries: a systematic, literature-based update with risk-factor adjustment," The Lancet Global health, Oct. 1, 2014, 2(10):e570-80.

Moody et al., "CD1c-mediated T-cell recognition of isoprenoid glycolipids in *Mycobacterium tuberculosis* infection," Nature, Apr. 2000, 404(6780):884-8.

Moody et al., "T cell activation by lipopeptide antigens," Science, Jan. 23, 2004, 303(5657):527-31.

Nagata et al., "Intracellular metabolite β-glucosylceramide is an endogenous Mincle ligand possessing immunostimulatory activity," Proceedings of the National Academy of Sciences, Apr. 18, 2017, 114(16):E3285, 16 pages.

naturereviews.com, "Nobel Prize to immunology," Nature Reviews Immunology, dated Oct. 25, 2011, 11:174, 1 page.

Nguyen et al., "IQ-TREE: a fast and effective stochastic algorithm for estimating maximum-likelihood phylogenies," Molecular Biology and Evolution, Jan. 1, 2015, 32(1):268-74.

Oda et al., "Vizantin inhibits endotoxin-mediated immune responses via the Tlr 4/MD-2 complex," The Journal of Immunology, Nov. 1, 2014, 193(9):4507-14.

PCT International Preliminary Report on Patentability in International Appln. No. PCT/US2020/012777, dated Jun. 16, 2021, 6 pages.

PCT International Search Report and Written Opinion in International Appln. No. PCT/US2020/012777, dated Apr. 14, 2020, 9 pages.

Perez-Victoria et al., "Saturation transfer difference NMR reveals functionally essential kinetic differences for a sugar-binding repressor protein," Chemical Communications, Aug. 2009, (39):5862-4.

Pimm et al., "Immunotherapy of an ascitic rat hepatoma with cord factor (trehalose-6, 6'-dimycolate) and synthetic analogues," International Journal of Cancer, Dec. 15, 1979, 24(6):780-5.

Poltorak et al., "Defective LPS signaling in C3H/HeJ and C57BL/10ScCr mice: mutations in Tlr4 gene," Science, Dec. 11, 1998, 282(5396):2085-8.

Porwollik et al., "Defined single-gene and multi-gene deletion mutant collections in *Salmonella enterica* sv Typhimurium," PloS one, Jul. 9, 2014, 9(7):e99820, 8 pages.

(56) References Cited

OTHER PUBLICATIONS

Reinink et al., "Discovery of *Salmonella* trehalose phospholipids reveals functional convergence with mycobacteria," Journal of Experimental Medicine, Apr. 1, 2019, 216(4):757-71.

Ritchie et al., "Iimma powers differential expression analyses for RNA-sequencing and microarray studies," Nucleic Acids Research, Apr. 20, 2015, 43(7):e47, 13 pages.

Ronquist et al., "MrBayes 3.2: efficient Bayesian phylogenetic inference and model choice across a large model space," Systematic Biology, May 1, 2012, 61(3):539-42.

Roslund et al., "Complete assignments of the 1H and 13C chemical shifts and JH, H coupling constants in NMR spectra of D-glucopyranose and all D-glucopyranosyl-D-glucopyranosides," Carbohydrate Research, Jan. 14, 2008, 343(1):101-12.

Rossi et al., "Cardiolipin synthesis and outer membrane localization are required for Shigella flexneri virulence," Mbio, Aug. 29, 2017, 8(4):e01199-17.

Shah et al., "Total syntheses of cis-cyclopropane fatty acids: dihydromalvalic acid, dihydrosterculic acid, lactobacillic acid, and 9,10-methylenehexadecanoic acid," Organic & Biomolecular Chemistry, Oct. 2014, 12(46):9427-38.

Shenderov et al., "Cord factor and peptidoglycan recapitulate the Th17-promoting adjuvant activity of mycobacteria through mincle/CARD9 signaling and the inflammasome," The Journal of Immunology, Jun. 1, 2013, 190(11):5722-30.

Smit et al., "Reduction of carbon-carbon double bonds using organocatalytically generated diimide," The Journal of Organic chemistry, Dec. 5, 2008, 73(23):9482-5.

Smith et al., "XCMS: processing mass spectrometry data for metabolite profiling using nonlinear peak alignment, matching, and identification," Analytical Chemistry, Feb. 1, 2006, 78(3):779-87.

Söldner et al., "Interaction of glycolipids with the macrophage surface receptor Mincle—a systematic molecular dynamics study," Scientific Reports, Mar. 29, 2018, 8(1):1-2.

Tan et al., "Discovery of a cardiolipin synthase utilizing phosphatidylethanolamine and phosphatidylglycerol as substrates," Proceedings of the National Academy of Sciences, Oct. 9, 2012, 109(41):16504-9.

Thalen et al., "Rational medium design for Bordetella pertussis: basic metabolism," Journal of Biotechnology, Oct. 8, 1999, 75(2-3):147-59.

Wang et al., "A solvent system for the high-resolution proton nuclear magnetic resonance spectroscopy of membrane lipids," Analytical Biochemistry, Mar. 1, 1995, 225(2):242-51.

Werninghaus et al., "Adjuvanticity of a synthetic cord factor analogue for subunit *Mycobacterium tuberculosis* vaccination requires FcRγ-Syk-Card9-dependent innate immune activation," Journal of Experimental Medicine, Jan. 16, 2009, 206(1):89-97.

who.int, "Global Health Estimates 2016: Deaths by Cause, Age, Sex, by Country and by Region, 2000-2016," 2018, retrieved Apr. 25, 2022 from URL <http://web.archive.org/web/20181019130003/http://www.who.int/healthinfo/global_burden_disease/estimates/en/>, 12 pages.

Yamasaki et al., "Mincle is an ITAM-coupled activating receptor that senses damaged cells," Nature Immunology, Oct. 2008, 9(10):1179-88.

Zitomersky et al., "Longitudinal analysis of the prevalence, maintenance, and IgA response to species of the order Bacteroidales in the human gut," Infection and Immunity, May 2011, 79(5):2012-20.

\* cited by examiner

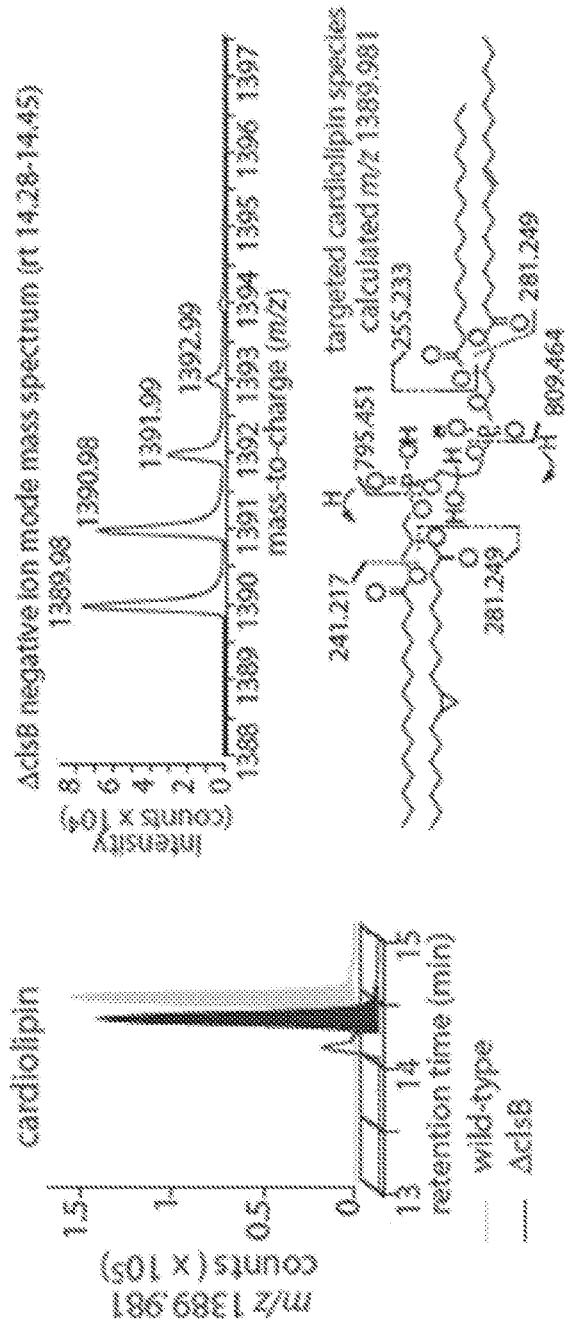
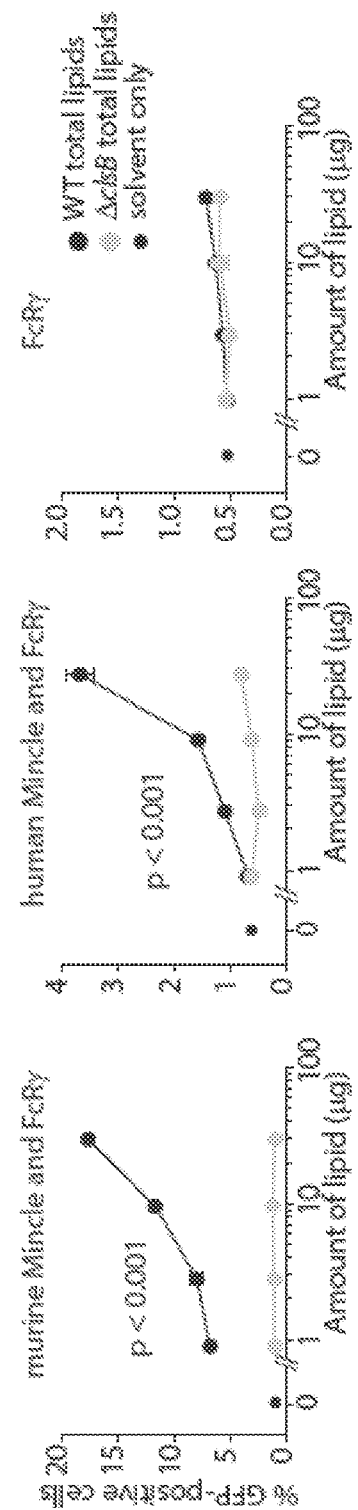
FIG. 4D
FIG. 4E

| Position | Phosphatidyl trehalose | | | | Diphosphatidyl trehalose | | | |
|---|---|---|---|---|---|---|---|---|
| | multiplicity | ¹H (ppm) | $J_{H,H}$ (Hz) | ¹³C (ppm) | multiplicity | ¹H (ppm) | $J_{H,H}$ (Hz) | ¹³C (ppm) |
| 1 | d | 5.11 | 3.7 | 94.8 | d | 5.08 | 3.7 | 94.5 |
| 2 | dd | 3.49 | 3.8, 9.8 | 72.9 | dd | 3.50 | 3.6, 9.7 | 73.0 |
| 3 | dd | 3.78 | 9.7 | 74.0 | t | 3.78 | 9.4 | 74.9 |
| 4 | dd | 3.42 | 9.4 | 71.1 | d | 3.44 | 9.9 | 71.1 |
| 5 | m | 3.94-3.96 | | 72.5 | dt | 3.96 | 2.0, 9.2 | 72.6 |
| 6a | m | 4.02 | | 65.6 | m | 4.02-4.06 | | 65.5 |
| 6b | ddd | 4.08 | 2.2, 5.6*, 11.6 | see 6a | m | see 6a | | see 6a |
| 1' | d | 5.10 | 3.7 | 94.8 | | | | |
| 2' | dd | 3.48 | 3.8, 9.8 | 72.9 | | | | |
| 3' | dd | 3.78 | 9.7 | 74.2 | | | | |
| 4' | m | 3.36 | | 71.7 | | | | |
| 5' | ddd | 3.82 | 2.3, 5.3, 10.3 | 73.6 | | | | |
| 6'a | m | 3.76-3.81 | | 62.3 | | | | |
| 6'b | dd | 3.67 | 5.2, 11.8 | see 6'a | | | | |
| A | t | 4.00 | 5.6 | 64.4 | t | 4.01 | 5.7 | 64.5 |
| B | m | 5.21-5.27 | | 71.6 | m | 5.22-5.27 | | 71.6 |
| C1 | dd | 4.45 | 3.0, 12.1 | 63.6 | dd | 4.45 | 3.0, 12.0 | 63.6 |
| C2 | dd | 4.20 | 6.9, 12.0 | see C1 | dd | 4.20 | 6.9, 12.0 | see C1 |
| D | m | 0.66-0.70 | | 16.6 | m | 0.65-0.68 | | 16.5 |
| E | m | 0.66-0.70 | | 16.6 | m | 0.65-0.68 | | 16.5 |
| F | ddd | 0.60 | 4.3 | | ddd | 0.60 | 3.7, 4.5 | |
| G | q | -0.32 | 5.0 | | q | -0.32 | 5.0 | |
| C=O | | | | 173.2 | | | | |

SEQUENCE LISTING

```
<160> NUMBER OF SEQ ID NOS: 4

<210> SEQ ID NO 1
<211> LENGTH: 32
<212> TYPE: DNA
<213> ORGANISM: Artificial Sequence
<220> FEATURE:
<223> OTHER INFORMATION: ClsB forward PCR primer

<400> SEQUENCE: 1
cgcggatccg atacggtaac gcggttcttt ct                                 32

<210> SEQ ID NO 2
<211> LENGTH: 32
<212> TYPE: DNA
<213> ORGANISM: Artificial Sequence
<220> FEATURE:
<223> OTHER INFORMATION: ClsB reverse PCR primer

<400> SEQUENCE: 2
gatgaattcc ggccgcaata aagccgtcca ag                                 32

<210> SEQ ID NO 3
<211> LENGTH: 47
<212> TYPE: DNA
<213> ORGANISM: Artificial Sequence
<220> FEATURE:
<223> OTHER INFORMATION: second round forward PCR primer

<400> SEQUENCE: 3
tagaggaata ataaatgatg aaatgcggct ggcgtgaagg taatcaa                 47

<210> SEQ ID NO 4
<211> LENGTH: 25
<212> TYPE: DNA
<213> ORGANISM: Artificial Sequence
<220> FEATURE:
<223> OTHER INFORMATION: second round reverse PCR primer

<400> SEQUENCE: 4
gttagggctt cactcctgta ttttc                                         25
```

COMPOSITIONS AND METHODS FOR TREHALOSE PHOSPHOLIPIDS

CLAIM OF PRIORITY

This application is a § 371 National Stage Application of PCT/US2020/012777, filed Jan. 8, 2020, which claims the benefit of U.S. Provisional Application Ser. No. 62/789,651, filed on Jan. 8, 2019. The entire content of the foregoing is incorporated herein by reference.

FEDERALLY SPONSORED RESEARCH OR DEVELOPMENT

This invention was made with Government support under Grant No. AI116604 awarded by the National Institutes of Health. The Government has certain rights in the invention.

SEQUENCE LISTING

This application contains a Sequence Listing that has been submitted electronically as an ASCII text file named '29618_0223US1_Sequence_Listing.txt'. The ASCII text file, created on Jul. 6, 2021, is 1.09 KB (1,122 bytes) in size. The material in the ASCII text file is hereby incorporated by reference in its entirety.

FIELD OF THE INVENTION

Described herein are trehalose phospholipids, e.g., compounds and compositions comprising 6,6'-diphosphatidyl-trehalose (diPT) and analogs thereof with modifications of the diPT chemical scaffold, that bind and agonize Mincle, and the use thereof as adjuvants.

BACKGROUND

The World Health Organization estimates that diarrheal diseases, most commonly caused by enteric Gram-negative pathogens, remain the ninth leading cause of death worldwide, the fourth leading cause of death in developing nations and a major cause of death among children (World Health Organization, 2018). *Salmonella* species, such as *S. Typhi* and related serovars, are priority pathogens that have spurred development of diagnostics, drug treatments, anti-sepsis regimens and vaccines.

Currently, both clinical and basic research on Gram-negative bacterial lipid endotoxins focus on LPS-TLR4 interactions, which is one of the most extensively studied and widely recognized receptor-ligand pairs in immunology (Editorial on Nobel Prize to Immunology, 2011). However, there is still need for the identification of other targets that contribute to the virulence of *Salmonella* species, which can serve as better immunogens for vaccine design.

SUMMARY

This application is based on the discovery of a new class of membrane lipids in Gram-negative bacterial cell walls-trehalose phospholipids. This new class of phospholipids stimulates immune responses mediated by C-type lectin receptors, such as Macrophage inducible $Ca^{2+}$-dependent lectin (Mincle) receptors, and can be used as adjuvants for vaccine development. Accordingly, the current application provides compounds of specific formulas and pharmaceutical compositions that comprise the compounds described herein. The current application also provides adjuvants that promotes immune responses mediated by C-type Lectin receptors. Furthermore, the current application provides methods of detecting bacterial antigens, as well as methods of diagnosing bacterial infections in a subject.

Accordingly, provided herein are compounds of Formula (I):

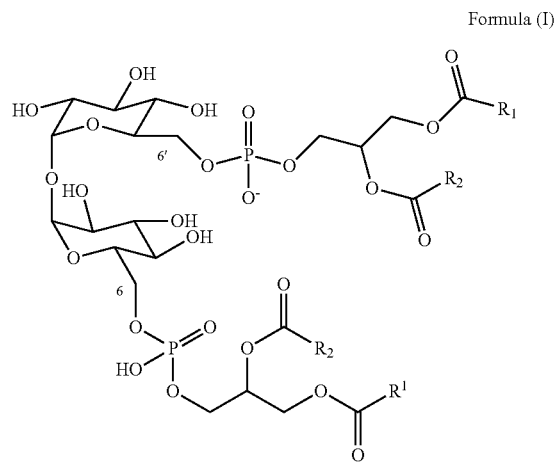

Formula (I)

wherein $R^1$ is a saturated or unsaturated fatty acid alkyl and $R^2$ is a saturated or unsaturated fatty acid alkyl.

In some embodiments, the compound is a compound of Formula (III)

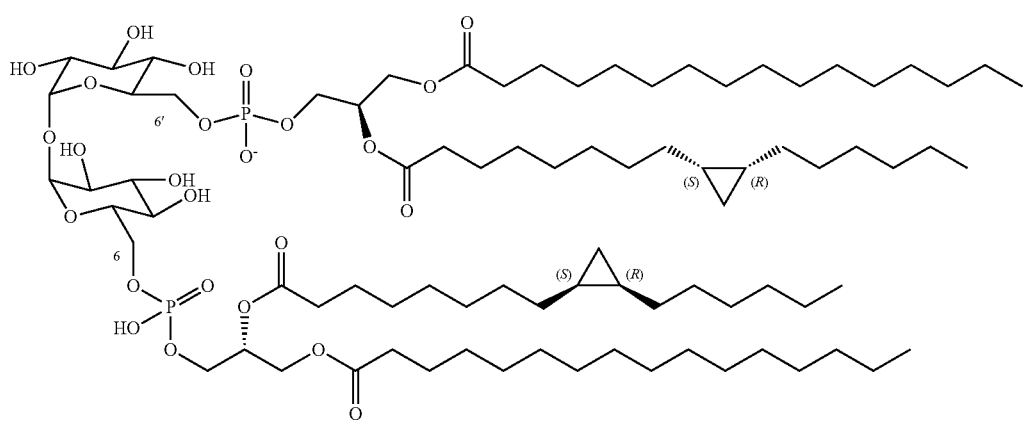

Formula (III)

In some embodiments, the compound is a compound of Formula (IV)

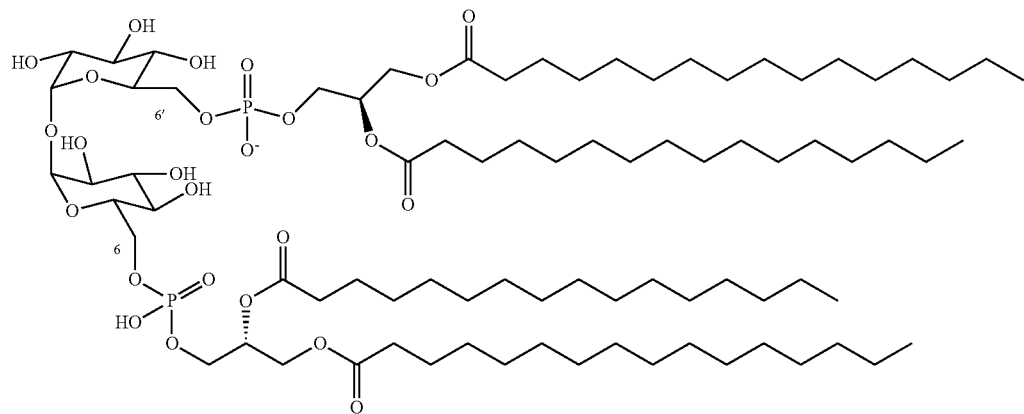

Formula (IV)

In some embodiments, the compound is a compound of Formula (V)

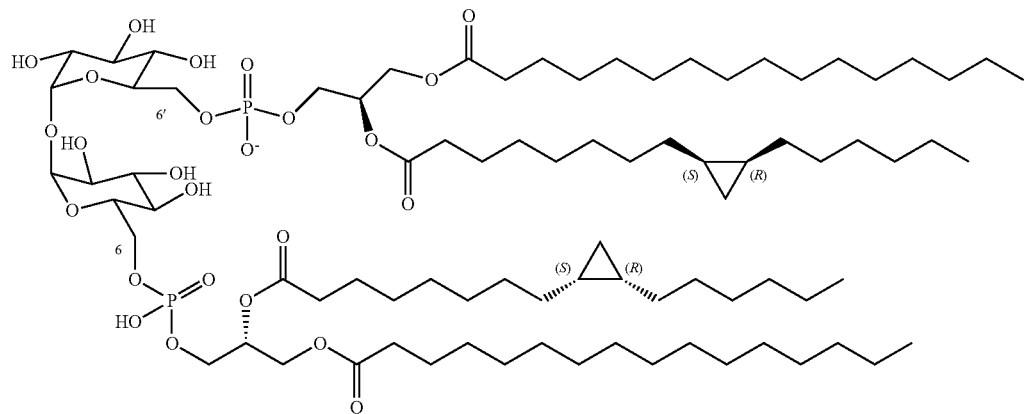

Formula (V)

Also provided herein are pharmaceutical compositions comprising any one of the compounds described herein, and a pharmaceutically acceptable carrier.

In some embodiments, the pharmaceutically acceptable carrier is an emulsion.

Also provided herein are adjuvants comprising an effective amount of any one of the pharmaceutical compositions described herein.

In some embodiments, the compound in the pharmaceutical composition is a compound of Formula (III)

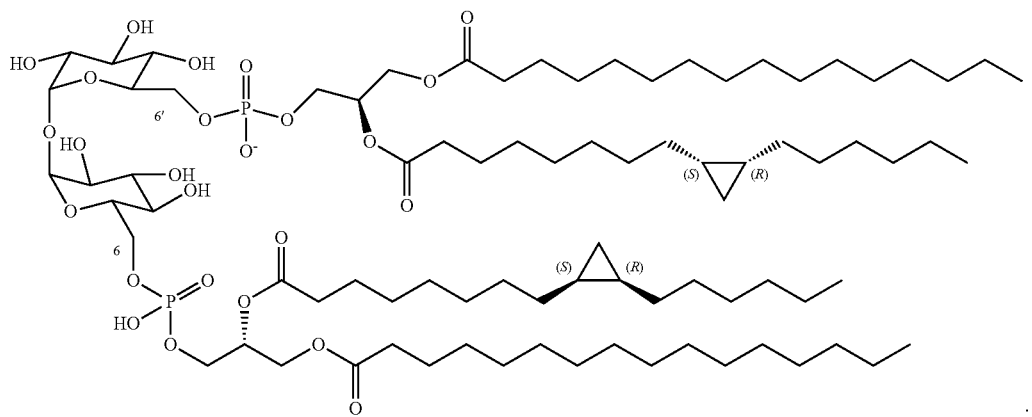

Formula (III)

In some embodiments, the compound in the pharmaceutical composition is a compound of formula (IV)

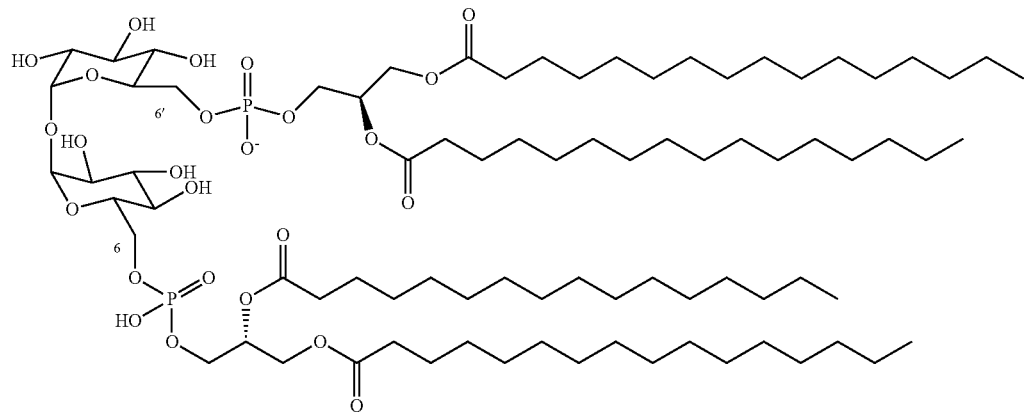

Formula (IV)

In some embodiments, the compound in the pharmaceutical composition is a compound of Formula (V)

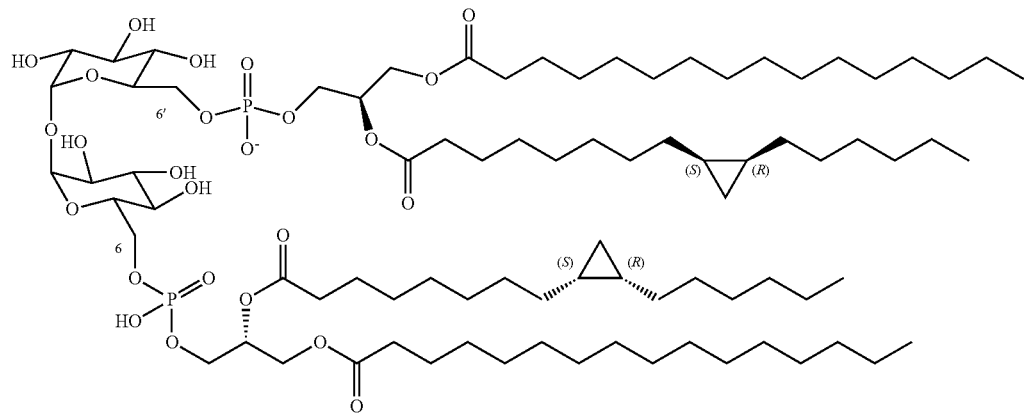

Formula (V)

In some embodiments, the adjuvant stimulates an immune response mediated by a C-type lectin receptor.

In some embodiments, the C-type lectin receptor is a macrophage inducible $Ca^{2+}$-dependent lectin (Mincle) receptor.

In some embodiments, the C-type lectin receptor is a DC-immunoactivating receptor (DCAR).

Also provided herein are compositions comprising the any one of the adjuvants described herein, and an antigen.

In some embodiments, the antigen is a virus antigen, a bacterium antigen, a parasite or protozoa antigen, or a fungus antigen.

Also provided herein are antibodies that specifically bind to a trehalose phospholipid.

Also provided herein are methods of provoking an immune response to an antigen in a subject, the methods comprising administering to the subject an effective amount of a composition comprising any one of the adjuvants described herein, and an antigen.

In some embodiments, the composition is administered subcutaneously.

Also provided herein are methods of detecting a Gram-negative bacterium in a subject, wherein the method comprises detecting a trehalose phospholipid in a biological sample from the subject, wherein the trehalose phospholipid is 6-phosphatidyltrehalose (PT) or 6,6'-diphosphatidyltrehalose (diPT), and wherein the presence of a trehalose phospholipid indicates the presence of a Gram-negative bacterium.

Also provided herein are methods of diagnosing a bacterial infection by a Gram-negative bacterium in a subject, the method comprising: detecting a level of a trehalose phospholipid in a biological sample from the subject; and comparing the level of a trehalose phospholipid in the sample to a reference level, wherein the trehalose phospholipid is 6-phosphatidyltrehalose (PT) or 6,6'-diphosphatidyltrehalose (diPT), and wherein the presence of a level of a trehalose phospholipid in the sample that is above the reference level indicates the presence of an infection by a Gram-negative bacterium.

In some embodiments, the Gram-negative bacterium is a *Salmonella* bacterium.

In some embodiments, the methods described herein further comprises administering a treatment for an infection by a Gram-negative bacterium to the subject.

In some embodiments, the treatment comprises administering to the subject an antibiotics.

In some embodiments, the treatment comprises administering to the subject an anti-diarrheal treatment.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

In the following description, for purposes of explanation, specific numbers, materials and configurations are set forth in order to provide a thorough understanding of the methods and compositions described herein. It will be apparent, however, to one having ordinary skill in the art that the disclosure may be practiced without these specific details. In some instances, well-known features may be omitted or simplified so as not to obscure the present disclosure. Furthermore, reference in the specification to phrases such as "one embodiment" or "an embodiment" means that a particular feature, structure or characteristic described in connection with the embodiment is included in some embodiments. The appearances of phrases such as "in one embodiment" in various places in the specification are not necessarily all referring to the same embodiment.

The articles "a" and "an" are used herein to refer to one or to more than one (i.e., to at least one) of the grammatical object of the article. By way of example, "an element" means one element or more than one element.

As used herein the term "comprising" or "comprises" is used in reference to compositions, methods, and respective component(s) thereof, that are essential to the methods and compositions described herein, yet open to the inclusion of unspecified elements, whether essential or not.

The term "consisting of" refers to compositions, methods, and respective components thereof as described herein, which are exclusive of any element not recited in that description of the embodiment.

Other features and advantages of the methods and compositions described herein will be apparent from the following detailed description and figures, and from the claims.

DESCRIPTION OF DRAWINGS

FIG. 4D is a group of diagrams showing the result of extracted ion chromatogram of cardiolipin in lipid extracts from wild-type *S. typhimurium* and *S. typhimurium* ΔclsB (left). The identity of cardiolipin was confirmed by high resolution MS, where the observed m/z 1389.98 (right, upper) matches the expected mass of 1389.981 (right, lower), and CID-MS, which identified fragments corresponding to phosphatidyl units and fatty acids.

FIG. 4E is a group diagram showing Total lipids from wild type or ΔclsB *S. typhimurium* were used to stimulate reporter cell lines expressing murine Mincle-FcR□, human Mincle-FcRγ, or FcRγ alone. p<0.001 by ANOVA after curve fitting and analysis using the R package drc.

DETAILED DESCRIPTION

Figure 1A:
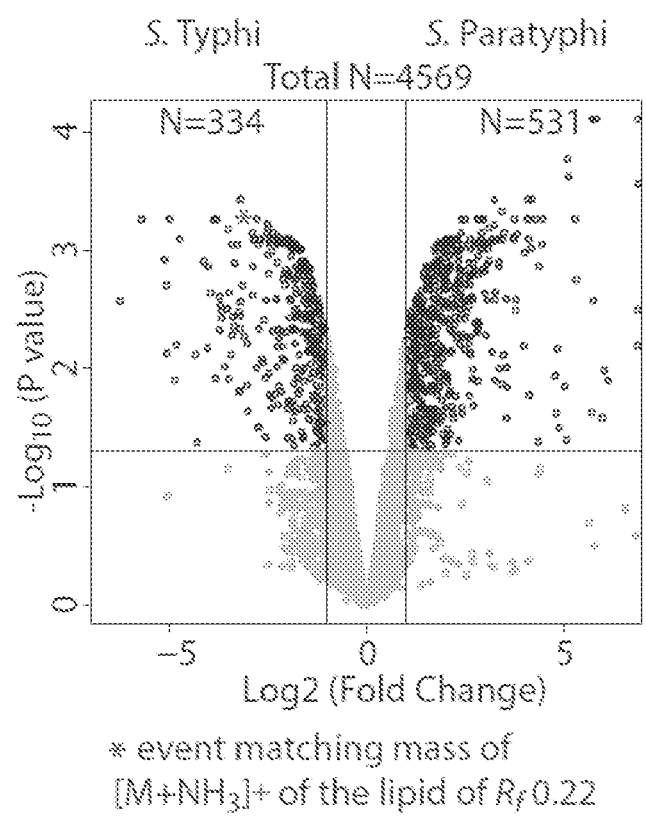
FIG. 1A is a diagram depicting that three independent cultures of *S. typhi* (Quailes) and *S. paratyphi* A (NVGH308) underwent lipid extractions and comparative lipidomics. Among all 4569 molecular events (black circles and asterisk), 865 (black circles) show two-fold intensity change (p<0.05, corrected for multiple comparisons).

*Salmonella typhi* is the etiologic agent of typhoid fever. This enteric fever has a high mortality rate if untreated and is responsible for an estimated 200,000 deaths annually (Mogasale et al., 2014). More generally, diarrheal diseases from Gram-negative bacteria are among the most prevalent and most deadly bacterial infectious diseases in the world, comparable to *M. tuberculosis* which causes tuberculosis (World Health Organization, 2018). *Salmonella enterica* typhi (*S. typhi*) lives in a membrane bound vacuole, which does not fuse with lysosomes and permits the intracellular replication of the bacteria. Gram-negative bacterial cell walls are comprised of an inner membrane dominated by phospholipids, a thin layer of peptidoglycan polymer, and an outer membrane with more complex lipids, which directly interface with the host.

Like other Gram-negative bacteria, *Salmonella* species synthesize lipopolysaccharide (LPS), which resides in the outer leaflet of the outer membrane and strongly stimulates the innate immune system by triggering Toll-like receptor 4 (TLR4) (Poltorak et al., 1998). LPS is among the most studied molecules in infectious diseases (Editorial on Nobel Prize to Immunology, 2011), where it unquestionably controls fever and sepsis as key manifestations of *S. typhi* and other Gram-negative bacterial syndromes. Yet, anti-LPS therapies have had limited success in treating sepsis, and differing LPS chemotypes do not fully explain the markedly different immunogenicity, fever inducing capacity and pathogenicity of diverse Gram-negative bacterial species and strains. Further, given the focus on LPS as a strong stimulant for the mammalian immune system, the many other foreign molecules in Gram-negative cell walls have received less attention. Furthermore, comparative lipidomic analyses of important pathogenic and non-pathogenic Gram-negative species have not been reported, raising the possibility that undiscovered virulence-associated lipids exist.

A rapid method was recently developed that takes advantage of normal phase chromatography to separate and analyze dozens of classes and thousands of molecular species of bacterial lipids by mass spectrometry (MS) (Layre et al., 2011). Combined with manual methods of thin layer chromatography (TLC), collision induced dissociation-mass spectrometry (CID-MS), and nuclear magnetic resonance (NMR) spectroscopy, this system has been proven to offer an approach to discovery of previously unknown or pathogen-specific lipids, such as phosphomycoketides, dideoxymycobactins, and tuberculosinyladenosines (Layre et al., 2014; Madigan et al., 2012; Matsunaga et al., 2004). Using *S. typhi* as an example of a major Gram-negative pathogen, its lipids and those of less pathogenic serovars including *S. paratyphi*, *S. enteriditis* and *S. typhimurium* were compared, generating clear evidence for strain-specific differences in lipid synthesis.

Focusing on the most abundant lipids that are selectively expressed by key pathogenic species, the products and key genes of a new glycolipid biosynthesis pathway in a subset of pathogenic Gram-negative bacteria were discovered and defined. A gene annotated as a cardiolipin synthase B functions as the essential enzyme for an abundant family of previously unknown immunogenic trehalose-containing phospholipids. Whereas most phylogenetic analyses and clinical strain typing rely on genetic methods, these studies illustrate the unique information available through systematic analysis of bacterial lipids. Similarities among mycobacterial and *salmonella* trehalose-containing lipids suggest functional convergence in their activation of human immune response, highlighting a new pathway to adjuvant development.

The data presented herein identify ClsB as essential for production of 6-phosphatidyltrehalose (PT) and 6,6'-diphosphatidyltrehalose (diPT) in the major disease-causing serovars of *Salmonella enterica*. Although trehalose is common in plants and bacteria, trehalose phospholipids were previously unknown. Thus, the discovery and detection of diPT and PT was entirely unexpected and prompts the reconsideration of the function of the enzyme known as ClsB. ClsA condenses two PG molecules to form CL, whereas ClsC condenses PE and PG (Rossi et al., 2017; Tan et al., 2012). Despite its name and homology to ClsA and ClsC, the function of ClsB has been less clear. *E. coli* ClsB mediates PG turnover to CL outside of cells, but in other experiments it does not affect cardiolipin content in *E. coli* (Guo and Tropp, 2000; Tan et al., 2012) or *Shigella flexneri* (Rossi et al., 2017). Other members of the phospholipase D superfamily cleave phosphates to transfer phosphatidic acid to an acceptor, and here we show that *S. typhimurium* clsB is absolutely required for PT and diPT biosynthesis, suggesting that trehalose could be an acceptor for phosphatidic acid transfer. While in vitro studies of recombinant ClsB are required to test this hypothesis, our findings cast further doubt on a gene function corresponding to its name as a cardiolipin synthase.

Here, murine and human Mincle were identified as cellular receptors for diPT. Members of the C-type lectin family of receptors, which also includes Dectin-1, Dectin-2 and DC-SIGN, can activate monocytes, macrophages and myeloid dendritic cells via ITAM or ITAM-like domains that act as kinases to turn on phospho-Syk signaling pathways (Del Fresno et al., 2018). The crystal structure of human Mincle identifies a calcium binding site positioned near a proposed carbohydrate binding site, which in turn is located adjacent to a hydrophobic patch (Feinberg et al., 2013; Furukawa et al., 2013). Mincle activation occurs in response to 1-linked and 6-linked glucose containing lipids (Behler-Janbeck et al., 2016; Decout et al., 2017; Nagata et al., 2017). Comparative analysis with other C-type lectins, mutational analysis, and molecular modeling suggest that the glucose or trehalose sugars common to natural Mincle ligands bind in the carbohydrate binding site (Feinberg et al., 2013; Furukawa et al., 2013; Soldner et al., 2018). The 6,6'-linked C20 fatty acids in trehalose dibehenate and C80 mycolic acids in TDM are proposed to bind in the hydrophobic patch. Thus, diPT contains the two key chemical elements previously proposed to mediate Mincle binding. However, because there is no precedent for Mincle activation by phospholipids, prior models have not accounted for putative interactions with an anionic phosphoglycerol unit. There is no identifiable cationic binding site between the carbohydrate binding site and the hydrophobic patch on Mincle. However, docking simulations suggest that the most proximal part of 6-linked alkyl chains, corresponding to the two phosphoglycerol units in diPT, do not contact Mincle (Soldner et al., 2018). Thus, existing models predict diPT docking in a manner in which the phosphate moieties act as a bridge between the sugar- and lipid-binding epitopes, rather than directly contacting Mincle.

These structural considerations and the precedent of TDM provide a rationale for adjuvant development using synthetic modifications of the natural diPT structure. Freund's adjuvant is widely used in experimental biology and provided the basis for use of pure TDM as an adjuvant. Subsequently, the chemically simplified and more hydrophilic adjuvant TDB was developed as a further refinement of the TDM natural structure (Holten-Andersen et al., 2004; Pimm et al., 1979). Unlike these molecules, diPT contains two phospholipid units, which further promote water solubility, a favorable feature in adjuvant development. This chemical consideration, along with the high potency of synthetic diPT for human Mincle agonism, support the use of diPT and modifications of the diPT chemical scaffold as adjuvants. In particular, the chemical syntheses reported here for diPT can be modified to include simplified lipid moieties to further increase water solubility without affecting the Mincle binding regions of the molecule.

Thus, provided herein are compounds and compositions comprising trehalose phospholipid diPT and analogs thereof with modifications of the diPT chemical scaffold that bind and agonize Mincle, and the use thereof, e.g., as adjuvants and biomarkers for the detection of infection.

I. Compounds

Provided herein are trehalose phospholipid compounds of Formula (I):

Formula (I)

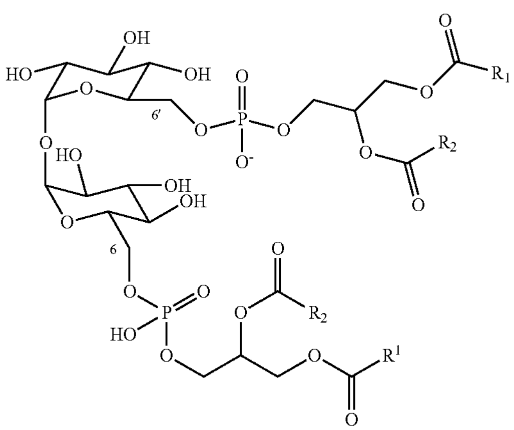

In some embodiments, the compound provided herein is a compound of Formula (II):

Formula (II)

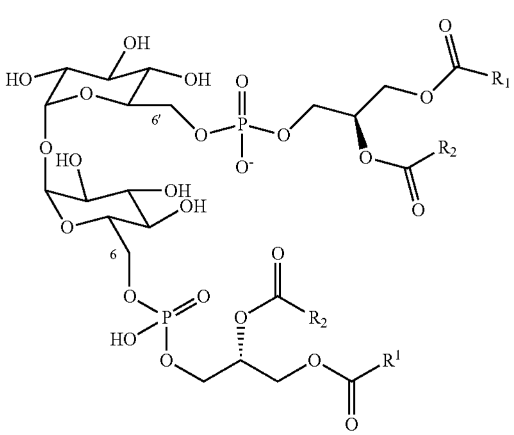

In some embodiments, $R^1$ is a saturated fatty acid. In some embodiments, $R^1$ is an unsaturated fatty acid. In some embodiments, $R^2$ is a saturated fatty acid. In some embodiments, $R^2$ is an unsaturated fatty acid. In some embodiments, $R^1$ is a monounsaturated fatty acid. In other embodiments, $R^1$ is a polyunsaturated fatty acid. In some embodiments, $R^2$ is a monounsaturated fatty acid. In some embodiments, $R^2$ is a polyunsaturated fatty acid. In some embodiments, $R^1$ is a fatty acid alkyl. In some embodiments, $R^1$ is a C6-22 fatty acid alkyl which is optionally interrupted by a C3-6 cycloalkyl group. In some embodiments, $R^2$ is a fatty acid alkyl. In some embodiments, $R^2$ is a C6-22 fatty acid alkyl which is optionally interrupted by a C3-6 cycloalkyl group. In some embodiments, one or both of $R^1$ and $R^2$ can be a molecule with differing fatty acids.

In some embodiments, $R^1$ is selected from the group consisting of:

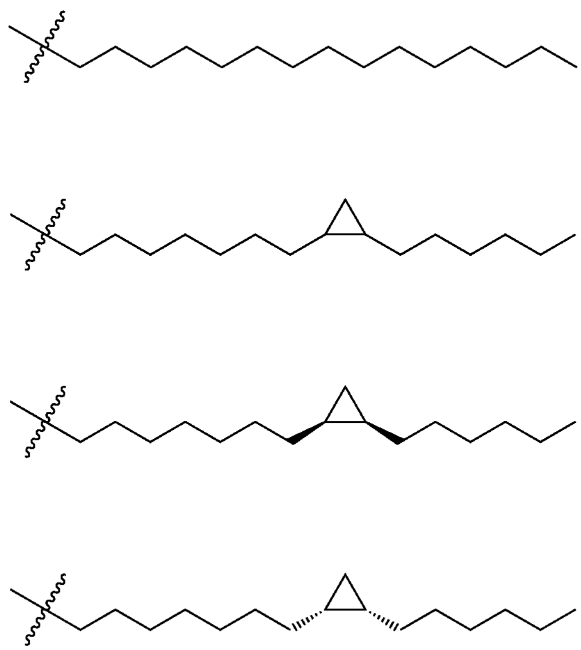

In some embodiments, $R^2$ is selected from the group consisting of:

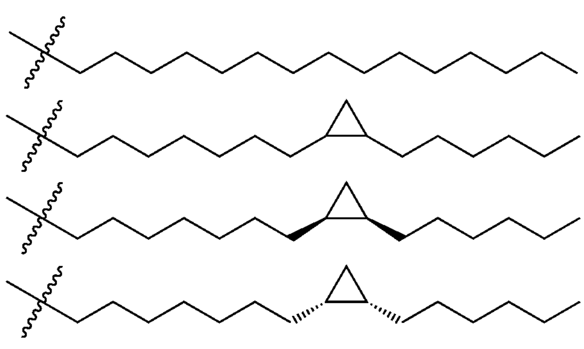

In some embodiments, the compound is a compound of Formula (III)
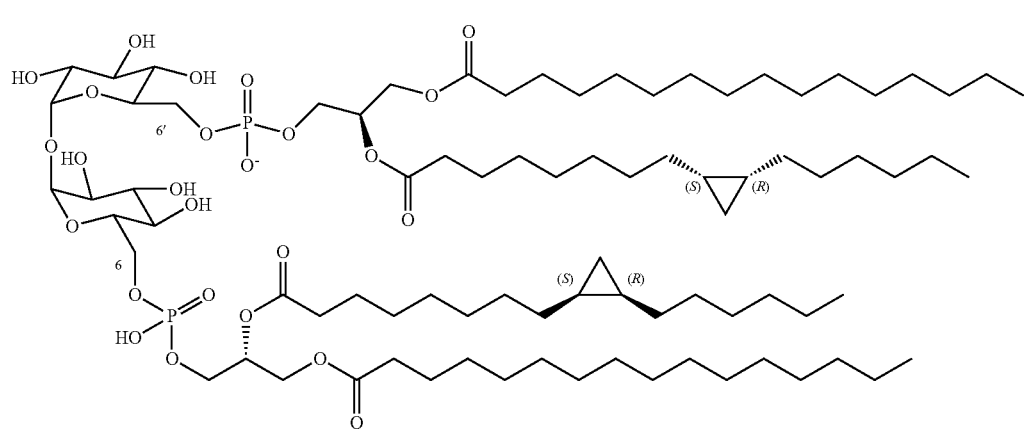
Formula (III)
In some embodiments, the compound is a compound of Formula (IV)
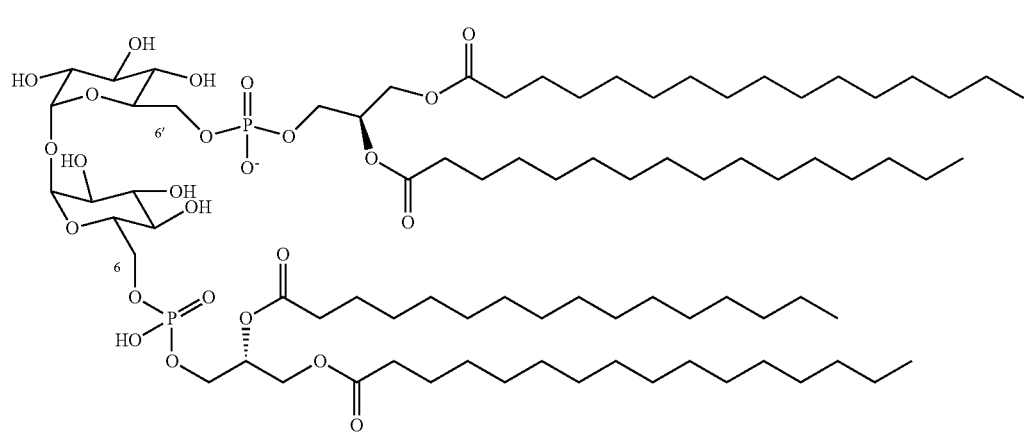
Formula (IV)
In some embodiments, the compound is a compound of Formula (V)
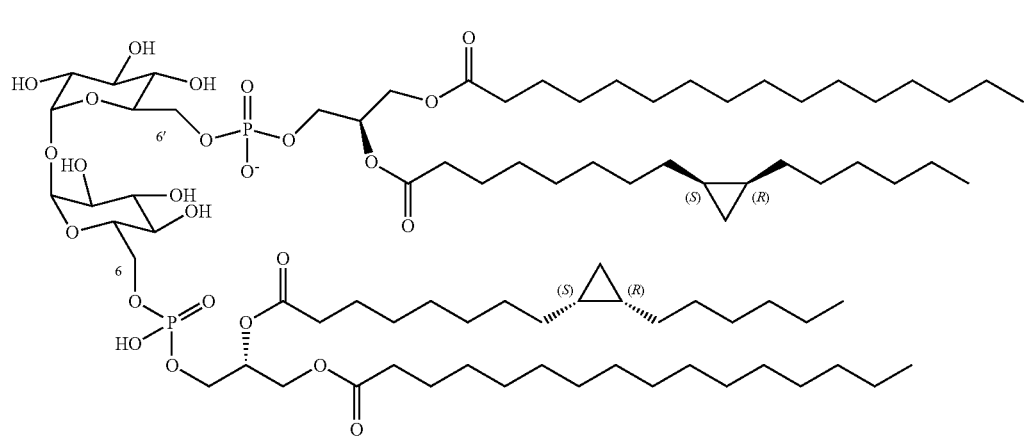
Formula (V)

Trehalose Phospholipids

As used herein, the term "trehalose phospholipids" refers to a phospholipid that contains a trehalose, or a derivative thereof. Trehalose is a sugar consisting of two molecules of glucose. It is also known as mycose or tremalose. Some bacteria, fungi, plants and invertebrate animals synthesize it as a source of energy, and to survive freezing and lack of water. In some embodiments, the trehalose has a structure of Formula (VI)

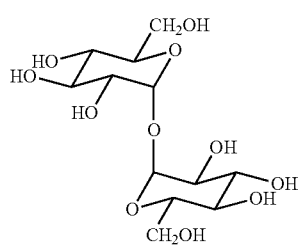

Formula (VI)

The trehalose phospholipid described herein can be a naturally occurring phospholipid or a synthetic compound. In some embodiments, a trehalose phospholipid is a glycerolphospholipid. In some embodiments, a trehalose phospholipid is a 6-phosphatidyltrehalose (PT). In some embodiments, a trehalose phospholipid is a 6,6'-diphosphatidyltrehalose (diPT). In some embodiments, a trehalose phospholipid is a compound of any one of the formulas described herein.

The trehalose phospholipids described herein can be used as a biomarker for diagnostic purposes. In some embodiments, the trehalose phospholipids described herein can be used as a biomarker for the diagnosis of an infection by a Gram-negative bacterium. In some embodiments, the trehalose phospholipids described herein can be used as a biomarker for the diagnosis of a *Salmonella* infection.

Synthesis of the Compounds

Compounds of any one of the formulas presented herein may be prepared by synthetic processes or by metabolic processes. Preparation of the compounds by metabolic processes includes those occurring in the human or animal body (in vivo) or processes occurring in vitro. In some embodiments, the compounds described herein are synthesized by chemical synthesis processes. In some embodiments, the compounds described herein are prepared by biosynthesis processes, for example, using a bacterial expression system. In some embodiments, the biosynthesis of the compounds further include co-expressing an enzyme that is essential for the production of the compounds. In some embodiments, the enzyme is cardiolipin synthase (ClsB).

II. Pharmaceutical Compositions

Also provided herein are pharmaceutical compositions comprising any of the compounds described herein, and a pharmaceutically acceptable carrier. In some embodiments, the active agent in the pharmaceutical compositions comprise or consist of one or more of the trehalose phospholipids described herein.

As used herein the language "pharmaceutically acceptable carrier" includes saline, solvents, dispersion media, coatings, antibacterial and antifungal agents, isotonic and absorption delaying agents, and the like, compatible with pharmaceutical administration.

Pharmaceutical compositions are typically formulated to be compatible with its intended route of administration. Examples of routes of administration include parenteral, e.g., intravenous, intradermal, subcutaneous, oral (e.g., inhalation), transdermal (topical), transmucosal, and rectal administration. In some embodiments, the pharmaceutical composition is formulated as a water-in-oil emulsion.

Methods of formulating suitable pharmaceutical compositions are known in the art, see, e.g., *Remington: The Science and Practice of Pharmacy*, 21st ed., 2005; and the books in the series *Drugs and the Pharmaceutical Sciences: a Series of Textbooks and Monographs* (Dekker, NY). For example, solutions or suspensions used for parenteral, intradermal, or subcutaneous application can include the following components: a sterile diluent such as water for injection, saline solution, fixed oils, polyethylene glycols, glycerin, propylene glycol or other synthetic solvents; antibacterial agents such as benzyl alcohol or methyl parabens; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. pH can be adjusted with acids or bases, such as hydrochloric acid or sodium hydroxide. The parenteral preparation can be enclosed in ampoules, disposable syringes or multiple dose vials made of glass or plastic.

Pharmaceutical compositions suitable for injectable use can include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor EL™ (BASF, Parsippany, NJ) or phosphate buffered saline (PBS). In all cases, the composition must be sterile and should be fluid to the extent that easy syringability exists. It should be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyetheylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, sodium chloride in the composition. Prolonged absorption of the injectable compositions can be brought about by including in the composition an agent that delays absorption, for example, aluminum monostearate and gelatin.

Sterile injectable solutions can be prepared by incorporating the active compound in the required amount in an appropriate solvent with one or a combination of ingredients enumerated above, as required, followed by filtered sterilization. Generally, dispersions are prepared by incorporating the active compound into a sterile vehicle, which contains a basic dispersion medium and the required other ingredients from those enumerated above. In the case of sterile powders for the preparation of sterile injectable solutions, the preferred methods of preparation are vacuum drying and freeze-drying, which yield a powder of the active ingredient plus any additional desired ingredient from a previously sterile-filtered solution thereof.

Oral compositions generally include an inert diluent or an edible carrier. For the purpose of oral therapeutic administration, the active compound can be incorporated with excipients and used in the form of tablets, troches, or capsules, e.g., gelatin capsules. Oral compositions can also be prepared using a fluid carrier for use as a mouthwash. Pharmaceutically compatible binding agents, and/or adjuvant materials can be included as part of the composition. The tablets, pills, capsules, troches and the like can contain any of the following ingredients, or compounds of a similar nature: a binder such as microcrystalline cellulose, gum tragacanth or gelatin; an excipient such as starch or lactose, a disintegrating agent such as alginic acid, Primogel, or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring.

For administration by inhalation, the compounds can be delivered in the form of an aerosol spray from a pressured container or dispenser that contains a suitable propellant, e.g., a gas such as carbon dioxide, or a nebulizer. Such methods include those described in U.S. Pat. No. 6,468,798.

Systemic administration of a therapeutic compound as described herein can also be by transmucosal or transdermal means. For transmucosal or transdermal administration, penetrants appropriate to the barrier to be permeated are used in the formulation. Such penetrants are generally known in the art, and include, for example, for transmucosal administration, detergents, bile salts, and fusidic acid derivatives. Transmucosal administration can be accomplished through the use of nasal sprays or suppositories. For transdermal administration, the active compounds are formulated into ointments, salves, gels, or creams as generally known in the art.

In some embodiments, the pharmaceutical compositions comprise any of the compounds described herein, and a pharmaceutically acceptable carrier, and optionally one or more antigens. In some embodiments, the pharmaceutical composition is formulated as a water-in-oil emulsion. In some embodiments, the pharmaceutical composition is administered subcutaneously. In some embodiments, the pharmaceutical composition is administered intravenously.

III. Adjuvants and Vaccines

Adjuvants

Provided herein are adjuvants that comprise any one of the trehalose phospholipids described herein.

The term "adjuvant" as used herein, refers to any substance that acts to accelerate, prolong, or enhance antigen-specific immune responses when used in combination with specific vaccine antigens. An adjuvant can be a naturally occurring component contained in weakened or killed immunogens. For example, an adjuvant can be a whole bacterial cell, a protein, or a protein fragment in a bacterial cell, or a component of the lipid membrane of a bacterial cell. An adjuvant can also be a synthesized compound. For example, an adjuvant can be an aluminum salt, a phospholipid, or derivative thereof. In some embodiments, an adjuvant is a trehalose-containing lipid. In some embodiments, an adjuvant is a trehalose phospholipid. Adjuvanted vaccines can help elicit stronger local immune reactions as well as systemic immune reactions than non-adjuvanted vaccines.

Adjuvants are often used to modify or augment the effects of a vaccine by stimulating the immune system to respond to the vaccine more vigorously, thus providing increased immunity to a particular disease. Adjuvants typically accomplish this task by mimicking specific sets of evolutionarily conserved molecules, such as pathogen associated molecular patterns (PAMPs), which include liposomes, lipopolysaccharide (LPS), Toll-like receptor agonists, molecular cages for antigen, components of bacterial cell walls, and endocytosed nucleic acids such as double-stranded RNA (dsRNA), single-stranded DNA (ssDNA), and unmethylated CpG dinucleotide-containing DNA. Because immune systems have evolved to recognize these specific antigenic moieties, the presence of an adjuvant in conjunction with the vaccine can greatly increase the innate immune response to the antigen by augmenting the activities of dendritic cells (DCs), lymphocytes, and macrophages by mimicking a natural infection.

In some embodiments, the adjuvants described herein modulate immune responses by increasing the immunogenicity of weak antigens. In some embodiments, the adjuvants described herein modulate immune responses by enhancing speed and duration of immune response. In some embodiments, the adjuvants described herein modulate immune responses by stimulating and modulating humoral responses, including antibody and antibody isotype production. In some embodiments, the adjuvants described herein modulate immune responses by stimulating cell-mediated immunity. In some embodiments, the adjuvants described herein modulate immune responses by improving induction of mucosal immunity. In some embodiments, the adjuvants described herein modulate immune responses by enhancing immune responses in immunologically immature patients, particularly infants. In some embodiments, the adjuvants described herein modulate immune responses by decreasing the dose of antigen required; reducing costs and eliminating inconvenient requirements for booster shots.

In some embodiments, the adjuvants described herein modulate immune responses mediated by a C-type lectin receptor. In some embodiments, the C-type lectin receptor is a macrophage inducible $Ca^{2+}$-dependent lectin (Mincle) receptor. In some embodiments, the C-type lectin receptor is a DC-immunoactivating receptor (DCAR).

The adjuvants described herein can be delivered via different delivery systems. In some embodiments, the adjuvants are delivered in a water-in-oil emulsion. In some embodiments, the adjuvant is delivered without any bacterial cell. In some embodiments, the adjuvants described herein are delivered in lipid particles. In some embodiments, the adjuvant described herein are delivered in microparticles. Any other suitable delivery system known in the art may be used to deliver the adjuvants described herein. The adjuvants described herein may be administered simultaneously, sequentially or separately with the active vaccination component.

The adjuvants described herein can be used at any suitable concentration that can effectively modulate an immune response. For example, the adjuvants described herein can be used at 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 mg/ml or more. The concentration of the one or more adjuvants may also be in a range between any two of the values listed above.

Vaccines

Also provided herein are compositions that can be used as vaccines that comprises any of the adjuvants described herein, and at least one antigen.

The term "vaccine" as used herein, refers to a substance used to stimulate the production of antibodies and/or provide immunity against one or several diseases, prepared from the causative agent of a disease, its products, or a synthetic substitute, treated to act as an antigen without inducing the disease.

A vaccine typically contains an antigen that resembles a disease-causing agent and is often made from weakened or killed forms of the disease-causing agent. For example, a vaccine can have one or more toxins from a bacterium, one or more of its surface proteins, or one or more membrane components, e.g., a lipid component of a bacterium. Vaccines can be prophylactic (to reduce the risk of developing or to ameliorate the effects of a future infection by a natural or "wild" pathogen), or therapeutic (e.g., vaccines against cancer, which are being investigated). In some embodiments, the vaccine described herein is a prophylactic vaccine. In some embodiments, the vaccine described herein is a therapeutic vaccine.

The adjuvants described herein can be included any suitable vaccines. In some embodiments, the adjuvants described herein are used in vaccines against a pathogen such as a virus, a bacterium, a parasite or protozoa, or a fungus; or against a cancer, e.g., acute myeloid leukemia, adenocarcinoma, bladder cancer, bile duct cancer, brain cancer, breast cancer, carcinoma, chronic myeloid leukemia, colorectal cancer, esophageal cancer, gastric cancer, glioblastoma, HPV-induced cancer, kidney cancer, liver cancer, malaria, melanoma, multiple myeloma, multiple sclerosis, non-small-cell lung cancer, ovarian cancer, pancreatic cancer, prostate cancer, or renal cell cancer.

Antigens

The term "antigen" as used herein, refers to a substance capable of initiating and mediating an immune response. Antigens that stimulate or potentiate immune responses are said to be immunogenic and may be referred to as immunogens. In some embodiments, an antigen is a component of a vaccine.

Antigens are generally substances capable of stimulating immune responses (i.e., antigens are potentially immunogenic). The immune responses stimulated by antigens may be one or both of humoral or cellular, and generally are specific for the antigen. Antigens, therefore, are substances that may be bound by antibody molecules or by T cell receptors. Many types of biological and other molecules can act as antigens. For example, antigens may originate from molecules that include, but are not limited to, proteins, peptides, carbohydrates, polysaccharides, oligosaccharides, sugars, lipids, phospholipids, glycophospholipids, metabolites, hormones, nucleic acids, and other molecules, and fragments and/or combinations thereof. Antigens of any of these origins and types, as well as other known in the art, may be used in the vaccine described herein.

Antigens may originate from innate sources or from sources extrinsic to a particular mammal or other animal (e.g., from infectious agents). Antigens may possess multiple antigenic determinants such that exposure of a mammal to an antigen may produce a plurality of corresponding antibodies or cellular immune responses with differing specificities. Antigens may be purposefully introduced into a subject for purposes of eliciting an immune response (e.g., immunization) by a variety of routes, including but not limited to, ingestion, inhalation, skin contact, subcutaneous injection, intravenous injection, intramuscular injection, intradermal injection, contact with mucosal surfaces and by other routes.

Antigens may include or be part of components larger than single molecules, such as all or parts of cells, bacteria, viruses, fungi, and other microorganisms, and part or combinations of these. Bacterial antigens include proteins, lipids, polysaccharides and other molecules derived from the outer surfaces of the cell, from the cell interior, from the flagella, or from other components. Other antigens may be those secreted by an infected cell or released upon cell death or disruption.

Examples of antigens that may be used in the adjuvanted vaccines described herein include, but are not limited to, antigens from a virus, a bacterium, a parasite or protozoa, or a fungus.

The virus can be, e.g., rotavirus, aphthovirus (the agent for foot and mouth disease), Ebola virus, Hanta virus, parainfluenza, herpesvirus species (herpes simplex virus, Epstein-Barr virus, chickenpox virus, pseudorabies, cytomegalovirus), rabies virus, polio virus, Hepatitis A, B, C and E, distemper, Venezuelan equine encephalomyelitis virus, feline leukemia virus, reovirus, respiratory syncytial virus, Lassa fever virus, polyoma virus, canine parvovirus, papilloma virus, flavivirus, tick borne encephalitis virus, paramyxovirus (the agent for Rinderpest), rhinoviruses, enteroviruses, Mengo virus, paramyxoviruses, (mumps, measles, respiratory syncytial virus), avian infectious bronchitis virus, HTLV 1, HIV-1 and -2, influenza virus A, B and C, lymphocytic choriomeningitis virus, parvovirus, adenovirus, togavirus (rubella, yellow fever, dengue fever (e.g., pre-membrane and envelope proteins)), bovine respiratory syncytial virus, coronavirus, Japanese Encephalitis virus, or polio virus.

The bacterium can be, e.g., *Bordetella pertussis, Brucella abortis, Escherichia coli, Salmonella* species, e.g., *Salmonella typhi, Streptococci, Vibrio* (*V. cholera, V. parahaemolyticus*), *Shigella, Pseudomonas, Brucella* species, *Klebsiella, Mycobacteria* species (tuberculosis, avium, BCG, leprosy), *Pneumococci, Staphylococci, Enterobacter* species, *Clostridium tetani* (the agent for tetanus), *Bacillus anthracis* (the agent for anthrax), *Streptococcus pneumoniae*, Meningococcus A, B, C, Y, W, W-135, *Helicobacter pylori, Rochalimaea henselae, Pasteurella* (*P. haemolytica, P. multocida*), *Chlamydia* (*C. trachomatis, C. psittaci*), *Treponema pallidum* (the agent for syphilis), *Haemophilus* species, e.g., *Haemophilus* influenza type b, *mycoplasma* species, *Borrelia burgdorferi* (the agent for Lyme disease), *Legionella pneumophila, Clostridium botulinum* (the agent for botulism), *Corynebacterium diptheriae, Yersinia entercolitica, Ehrlichia, Anaplasma*, or *Coxiella burnetii* bacteria.

The parasites and protozoa can be, e.g., those causing malaria (*Plasmodium falciparum, P. vivax, P. malariae*), schistosomes, trypanosomes, leishmania, filarial nematodes, *Trichomonas vaginalis* (the agent for trichomoniasis), *Sarcocystis, Taenia* (*T. saginata, T. solium*), *Toxoplasma gondi, Trichinella spiralis* (the agent for Trichinosis), or *Eimeria* species (the agent for Coccidiosis)

The fungus can be, e.g., *Cryptococcus neoformans, Candida albicans, Aspergillus fumigatus, Coccidioides immitis, Coccidioides posadasii* and others.

In some embodiments, the antigen is a cancer- or tumor-derived antigen, e.g., melanoma-associated antigen (MAGE) series of antigens (e.g., MAGE-C1 (cancer/testis antigen CT7), MAGE-B1 antigen (MAGE-XP antigen, DAM10), MAGE-B2 antigen (DAME), MAGE-2 antigen, MAGE-4a antigen, and MAGE-4b antigen), tyrosinase, glycoprotein 100 (gp100), disialoganglioside GD-2, disialoganglioside O-acetylated GD-3, ganglioside GM-2, epidermal growth factor receptor (EGFR), vascular endothelial growth factor receptor (VEGFR), mutant B-Raf antigen associated with melanoma and colon cancer, human epidermal growth factor receptor-2 (HER-2/neu) antigen, melanoma-associated antigen recognized by T cells (MART-1) (e.g., MART-1 26-35 peptide, MART-1 27-35 peptide), protein kinase C-binding protein, reverse transcriptase protein, A-kinase-anchoring protein (AKAP protein), vaccinia-related kinase Serine/Threonine Kinase 1(VRK1), fucosyltransferase (T6-7), zinc finger protein 258 (T11-6), p53-binding protein (T1-52), T5-15 (KIAA1735), T5-13 (Sos1), T11-5 (hypothetical protein MGC4170), T11-9 (hypothetical protein AF225417), T11-3 (trap ankyrin repeat), T7-1 (KIAA1288), a mutant or wild type ras peptide, *Homo sapiens* telomerase ferment (hTRT), cytokeratin-19 (CYFRA21-1), squamous cell carcinoma antigen 1 (SCCA-1), protein T4-A, squamous cell carcinoma antigen 2 (SCCA-2), ovarian carcinoma antigen CA125 (1A1-3B) (KIAA0049), cell surface-associated MUCIN 1 (e.g., tumor-associated MUCIN, carcinoma-associated MUCIN, polymorphic epithelial MUCIN peanut-reactive urinary MUCIN, polymorphic epithelial mucin (PEM), PEMT, episialin, tumor-associated epithelial membrane antigen, epithelial membrane antigen (EMA), H23 antigen (H23AG), PUM, and breast carcinoma-associated antigen DF3), CTCL tumor antigen se1-1, CTCL tumor antigen se14-3, CTCL tumor antigen se20-4, CTCL tumor antigen se20-9, CTCL tumor antigen se33-1, CTCL tumor antigen se37-2, CTCL tumor antigen se57-1, CTCL tumor antigen se89-1, prostate-specific membrane antigen, 5T4 oncofetal trophoblast glycoprotein, Orf7 Kaposi's sarcoma-associated herpesvirus, colon cancer antigen NY-CO-45, lung cancer antigen NY-LU-12 variant A, cancer associated surface antigen, adenocarcinoma antigen ART1, paraneoplastic associated brain-testis-cancer antigen (onconeuronal antigen MA2; paraneoplastic neuronal antigen), neuro-oncological ventral antigen 2 (NOVA2), hepatocellular carcinoma antigen gene 520, tumor-associated antigen CO-029, tumor-associated antigen MAGE-X2, synovial sarcoma antigen, X breakpoint 2, squamous cell carcinoma antigen recognized by T cell, serologically defined colon cancer antigen 1, serologically defined breast cancer antigen NY-BR-15, serologically defined breast cancer antigen NY-BR-16, chromogranin A, parathyroid secretory protein 1, pancreatic cancer-associated antigen (DUPAN-2), carbohydrate antigen CA 19-9, carbohydrate antigen CA 72-4, carbohydrate antigen CA 195, or carcinoembryonic antigen (CEA).

The antigens employed in the adjuvanted vaccines described herein may be the naturally occurring form of the antigen as derived from its natural source. The naturally occurring antigens may also be converted to other forms, including less toxic forms, which may be fragments or may contain other deletions, additions or modifications. These converted forms of antigens generally will retain immunogenicity. Diphtheria and tetanus toxoids are examples of detoxified forms of natural antigens, in this case produced by chemical (e.g., formaldehyde) treatment. Other means for eliminating toxicity of antigens are well known and include enzymatic digestion/fragmentation of protein antigens, denaturation (commonly through heat or chemical treatment), conjugation, chemical modification, and others.

It is common in the field to administer multiple antigens in a single vaccine formulation to induce protection against multiple diseases, infectious agents, types, serotypes, serovars, and others, and the compositions of the present disclosure may similarly include multiple antigens. Particular examples of such antigens which are combined include diphtheria, tetanus, pertussis and other antigens. Antigens may also be associated with a carrier protein that mediates the immunogenicity of the antigens. Examples of such conjugated antigens are well known in the art and commercially available in pharmaceutical formulations as vaccines. All of these example antigens, combination antigens, carrier-associated antigens, and others, may be incorporated into the adjuvanted vaccines described herein.

The concentration of the antigen in the adjuvanted vaccines may be of any concentration, but generally is sufficient to stimulate an immune system when administered to an individual or mammal. In one example, the concentration of one or more antigens is 10 µg/ml. In other examples, the concentration of one or more antigens may be 20, 30, 40, 50, 100, 150, 200, 250, 300, 350, 400, 450, 500, 550, 600, 650, 700, 750, 800, 850, 900, 950, or 1000 µg/ml. In other examples, the concentration of antigen may be 2, 3, 4, 5, 6, 7, 8, 9, 10 mg/ml or even more. The concentration of the one or more antigens may also be in a range between any two of the values listed above.

IV. Antibodies

Also provided herein are antibodies that specifically bind to a trehalose phospholipid, e.g., a 6-phosphatidyltrehalose (PT), or a 6,6'-diphosphatidyltrehalose (diPT).

The term "antibody" as used herein refers to an immunoglobulin molecule or immunologically active portion thereof, i.e., an antigen-binding portion. Examples of immunologically active portions of immunoglobulin molecules include F(ab) and F(ab')$_2$ fragments, which retain the ability to bind antigen. Such fragments can be obtained commercially, or using methods known in the art. For example F(ab)$_2$ fragments can be generated by treating the antibody with an enzyme such as pepsin, a non-specific endopeptidase that normally produces one F(ab)$_2$ fragment and numerous small peptides of the Fc portion. The resulting F(ab)$_2$ fragment is composed of two disulfide-connected Fab units. The Fc fragment is extensively degraded and can be separated from the F(ab)$_2$ by dialysis, gel filtration or ion exchange chromatography. F(ab) fragments can be generated using papain, a non-specific thiol-endopeptidase that digests IgG molecules, in the presence of a reducing agent, into three fragments of similar size: two Fab fragments and one Fc fragment. When Fc fragments are of interest, papain is the enzyme of choice because it yields a 50.00 Dalton Fc fragment; to isolate the F(ab) fragments, the Fc fragments can be removed, e.g., by affinity purification using protein A/G. A number of kits are available commercially for generating F(ab) fragments, including the ImmunoPure IgG1 Fab and F(ab')$_2$ Preparation Kit (Pierce Biotechnology, Rockford, IL). In addition, commercially available services for generating antigen-binding fragments can be used, e.g., Bio Express, West Lebanon, NH The antibody can be a polyclonal, monoclonal, recombinant, e.g., a chimeric, de-immunized or humanized, fully human, non-human, e.g., murine, or single chain antibody. In some embodiments the antibody has effector function and can fix complement. In some embodiments, the antibody has reduced or no ability to bind an Fc receptor. For example, the antibody can be an isotype or subtype, fragment or other mutant, which does not support binding to an Fc receptor, e.g., it has a mutagenized or deleted Fc receptor binding region. The antibody can be coupled to a toxin or imaging agent. The antibodies described herein can be any subtype. In some embodiments, the antibody described herein is an IgA. In some embodiments, the antibody described herein is an IgD. In some embodiments, the antibody described herein is an IgE. In some embodiments, the antibody described herein is an IgG. In some embodiments, the antibody described herein is an IgM.

In some embodiments, the antibody that specifically binds to a trehalose phospholipid is an isolated human antibody. In some embodiments, the antibody that specifically binds to a trehalose phospholipid is isolated from a subject infected by a Gram-negative bacterium. In some embodiments, the antibody that specifically binds to a treahlose phospholipid is isolated from a subject infected by a *Salmonella* bacterium. In some embodiments, the subject is a human subject. In some embodiments, the antibody specifically binds to a 6-phosphatidyltrehalose (PT). In some embodiments, the antibody specifically binds to a 6,6'-diphosphatidyltrehalose (diPT). In some embodiments, the antibody binds to any one of the compounds described herein.

The antibody described herein can be a therapeutic antibody or a diagnostic antibody.

V. Methods and Uses

Also provided herein are methods of detecting a gram negative bacterium, e.g., a *Salmonella* bacterium, in a subject by detecting a trehalose phospholipid, e.g., a 6-phosphatidyltrehalose (PT), or a 6,6'-diphosphatidyltrehalose (diPT), in a biological sample from the subject. In some embodiments, the presence of a trehalose phospholipid indicates the presence of a Gram-negative bacterium, e.g., a *Salmonella* bacterium, in the subject.

Any suitable methods of detection known in the art can be used to detect the trehalose phospholipid in the biological sample as described herein. In some embodiments, an antibody that specifically binds a trehalose phospholipid is used to detect the trehalose phospholipid. In some embodiments, the antibody is any one of the antibodies described herein. In some embodiments, the trehalose phospholipid is detected using an enzyme-linked immunosorbent assay (ELISA).

In some embodiments, an antibody that specifically binds to a trehalose phospholipid is contacted with a biological sample from the subject, allowing the antibody to specifically bind to the trehalose phospholipid in the biological sample, e.g., a PT or diPT on the surface of a Gram-negative bacterium. In some embodiments, the antibody is linked to a detectable moiety. In some embodiments, the detectable moiety is an enzyme or a substrate of an enzyme. In some embodiments, the detectable moiety is a fluorescent label. In some embodiments, the detectable moieties on the antibody bound to the trehalose phospholipid are detected, allowing the detection of the trehalose phospholipid. In some embodiments, the method described herein further comprises washing the biological sample to remove the unbound antibodies.

Further provided herein are methods of diagnosing an infection by a Gram-negative bacterium, e.g., a *Salmonella* infection, in a subject by detecting a gram negative bacterium, e.g., a *Salmonella* bacterium, in a subject.

Further provided herein are methods of provoking an immune response to an antigen in a subject by administering to the subject an effective amount of a composition comprising any one of the adjuvants described herein, and an antigen.

As used herein, a "biological sample" includes any biological specimen obtained from an individual. Suitable samples for use in the present methods include, but are not limited to, whole blood, plasma, serum, saliva, urine, stool (i.e., feces), tears, and any other bodily fluid, or a tissue sample (i.e., biopsy) such as a small intestine or colon sample, and cellular extracts thereof (e.g., red blood cellular extract). In some embodiments, the biological sample is a blood, plasma, or serum sample. In some embodiments, the biological sample is a feces sample.

The methods described herein further include determining the level of one or more trehalose phospholipids, e.g., 6-phosphatidyltrehalose (PT) or 6,6'-diphosphatidyltrehalose (diPT), in a healthy subject. In some embodiments, a healthy subject is a subject that is not infected by a gram negative bacterium, e.g., a *Salmonella* bacterium. In some embodiments, a healthy subject is a healthy human subject.

In some embodiments, the method further comprises comparing the level of trehalose phospholipids in the subject with a reference level of a trehalose phospholipid, e.g., 6-phosphatidyltrehalose (PT) or 6,6'-diphosphatidyltrehalose (diPT). In some embodiments, a reference level of a trehalose phospholipid is the level of a trehalose phospholipid, e.g., 6-phosphatidyltrehalose (PT) or 6,6'-diphosphatidyltrehalose (diPT), in a healthy subject. In some embodiments, the same or lower level of a trehalose phospholipid, e.g., 6-phosphatidyltrehalose (PT) or 6,6'-diphosphatidyltrehalose (diPT), in the sample from the subject being tested compared to the reference level indicates the likely absence of an infection by a Gram-negative bacterium, e.g., a *Salmonella* infection. In some embodiments, the presence of a level of trehalose phospholipids, e.g., 6-phosphatidyltrehalose (PT) or 6,6'-diphosphatidyltrehalose (diPT), in the sample from the subject being tested that is above the reference level indicates the presence of an infection by a Gram-negative bacterium, e.g., a *Salmonella* infection.

The term "subject" "individual," or "patient" typically refers to humans, but also to other animals including, e.g., other primates, rodents, canines, felines, equities, ovines, porcines, and the like. In some embodiments, a subject is a human subject. In some embodiments, a subject is an avian subject.

As used herein, a "*Salmonella* bacterium" refers to a species or subspecies of the *Salmonella* genera (e.g., *S. enterica* or *S. bongori*). In some embodiments, a *Salmonella* bacterium is a *Salmonella enterica* serovar selected from *S. paratyphi* A, *S. enteritidis*, *S. Typhi*, and *S. typhimurium*. In some embodiments, the *Salmonella* bacterium is of the serovar *S. typhimurium*, *S. typhi*, *S. paratyphi*, *S. Gallinarum*, *S. enteritidis*, *S. Choleraesius*, *S. Arizonae*, *S. Newport*, *S. Heidelberg*, *S. Infantis*, *S. Cholerasiuis*, or *S. Dublin*. In some embodiments, the *Salmonella* bacterium is a naturally occurring *Salmonella* bacterium. In some embodiments, the *Salmonella* bacterium is a recombinant *Salmonella* bacterium.

In some embodiments, the methods described herein further comprises administering a treatment for an infection with a gram negative bacterium to the subject who has been diagnosed with an infection with a gram negative bacterium, e.g., a *Salmonella* infection. Any suitable treatment known in the art can be used for the treatment of the infection with a gram negative bacterium described herein. In some embodiments, the treatment includes administering an anti-diarrheal medicine to the subject. In some embodiments, the anti-diarrheal medicine is loperamide (Imodium A-D). In some embodiments, the treatment includes administering an antibiotics to the subject. In some embodiments, the treatment includes administering a probiotics to the subject.

EXAMPLES

The invention is further described in the following examples, which do not limit the scope of the invention described in the claims.

Materials and Methods

The following materials and methods were used in the examples of the current application.

Bacterial cultures and total lipid extraction. In addition to the bacterial strains listed in Table 1, *S. tyhpimurium* 14028s strains in which single genes are replaced by a cassette containing a kanamycin resistance gene oriented in the sense direction, or a chloramphenicol resistance gene oriented in the antisense direction were used. A single colony was picked from a plate, transferred to a 3 ml starter culture and incubated overnight at 37° C. while shaking. One ml of a starter culture was added to 500 ml of medium and incubated overnight at 37° C. while shaking. Bacteria were centrifuged for 15 minutes at 3500 rpm and washed twice with PBS. Lipid were extracted by rocking the pellet in organic solvent for 1 hour at 20° C., centrifugation for 10 minutes at 3500 rmp and collection of the supernatant. Solvents used for extraction were HPLC grade 2:1 Chloroform (Merck): Methanol (Merck) (C:M), 1:1 C:M, and 1:2 C:M. The three supernatants were pooled and dried and lipids were dissolved and stored in 1:1 C:M. Murine colon, cecum or small intestinal content (0.5-1.0 gram) or fresh human stool (1.0-2.0 gram) were suspended in 10:1 $CH_3OH$:0.3% NaCl in water and subjected to a series of extractions against petroleum ether, 9:10:3 $CHCl_3$:$CH_3OH$:0.3% NaCl in water, and 5:10:4 $CHCl_3$:$CH_3OH$:0.3% NaCl in water. Extracts were combined, dried, and weighed. Spiked samples were spiked directly after initial suspension in 10:1 Methanol:0.3% NaCl in water.

TABLE 1

Bacterial strains and culture media

| Species or strain | Number | Culture medium |
|---|---|---|
| Salmonella Enteritidis | SAL RIVM 423.78 | Luria broth |
| Salmonella Enteritidis | SAL RIVM 423.79 | Luria broth |
| Salmonella Enteritidis | SAL RIVM 423.68 | Luria broth |
| Salmonella Paratyphi B | SAL RIVM 423.37 | Luria broth |
| Salmonella Paratyphi A | SAL RIVM 422.26 | Luria broth |
| Salmonella Paratyphi A | SAL RIVM 421.73 | Luria broth |
| Salmonella Paratyphi A | NVGH308 | Luria broth |
| Salmonella Typhi | SAL RIVM 424.47 | Luria broth |
| Salmonella Typhi | SAL RIVM 422.41 | Luria broth |
| Salmonella Typhi | SAL RIVM 421.56 | Luria broth |
| Salmonella Typhi | Quailes | Luria broth |
| Salmonella Typhimurium | SAL RIVM 423.77 | Luria broth |
| Salmonella Typhimurium | SAL RIVM 423.57 | Luria broth |
| Salmonella Typhimurium | SAL RIVM 423.62 | Luria broth |
| Salmonella Typhimurium | 14028s | Luria broth |
| Salmonella bongori | RIVM 66:Z65 | Luria broth |
| Shigella dysenteriae | BD09-OO284, serovar 3 | Luria broth |
| Shigella flexneri | BD09-0271 | Luria broth |
| Escherichia coli | DH10B | Luria broth |
| Escherichia coli | DH5α | Luria broth |
| Escherichia coli | bw25113 | Luria broth |
| Escherichia coli | ATCC25922 | Luria broth |
| Escherichia coli | EHEC CVI-7, O150:H2 | Luria broth |
| Escherichia coli | EHEC CVI-19, O177:H25 | Luria broth |
| Pseudomonas aeruginosa | ATCC27853 | Luria broth |
| Pseudomonas aeruginosa | NCTC 10662 | Luria broth |
| Brucella melitensis | x10017283-001 (WBVR) | Tryptic soy broth |
| Bordetella pertussis | B1917 | THIJS (Thalen et al.) |
| Mycobacterium tuberculosis | H37Ra | Obtained dry (Difco) |
| Rhodococcus equi | ATCC 33701 | Brain Heart Infusion broth |
| Staphylococcus aureus | Coagulase + clinical isolate | Brain Heart Infusion broth |
| Lactobacillus johnsonii | Cecum of BALB/cJ mouse | Basal medium, anaerobic (Zitomersky et al.) |
| Bacteroidus ovatus | ATCC 8483 | Basal medium, anaerobic (Zitomersky et al.) |
| Bacteroidus vulgatus | ATCC 8482 | Basal medium, anaerobic (Zitomersky et al.) |
| Bacteroidus thetaiotamicron | VPI-5482 | Basal medium, anaerobic (Zitomersky et al.) |

TABLE 1-continued

Bacterial strains and culture media

| Species or strain | Number | Culture medium |
|---|---|---|
| Bacteroidus fragilis | NCTC 9343 | Basal medium, anaerobic (Zitomersky et al.) |

Comparative lipidomics. Total lipid extracts of triplicate cultures of *S. typhi* (Quailes) and *S. paratyphi* A (NVGH308) were separated using GL-Sciences Inertsil® Diol 3 µm 2.1×150 mm normal phase HPLC column equipped with Varian Monochrom 3 µm×4.6 mm diol guard column. Lipids were measured on an Agilent Quadrupole Time-of-Flight (Q-TOF) Accurate-Mass QTOF LC/MS G6520B instrument in positive mode as described (Layre et al., 2011). Data were analyzed using Mass Hunter (Agilent), LIMMA (Ritchie et al., 2015), and XCMS (Smith et al., 2006).

Thin layer chromatography. DURASIL-25 TLC plates (Macherey-Nagel) were pre-cleared with C:M:$H_2O$ (60:30:6)(V:V:V) and dried. Bacterial total lipid extract (300 µg) or purified standard (40 µg) were applied and resolved with C:M:$H_2O$ (60:30:6)(V:V:V). The plates were dried and either stained for analytical purposes (FIG. 1b) or used for specific lipid isolation. Staining was performed by spraying 3% copper acetate monohydrate (Sigma Aldrich) in 8% phosphoric acid (Merck) on the plate and baking at 140° C. Isolation of specific lipids was performed after spraying the plate with water, which makes lipids bands temporarily visible. Lipids of interest were marked, the plate was dried, and the silica layer containing the lipid was scraped of the glass plate. The lipid was isolated from the silica by rocking the silica for 1 hour in 1:1 C:M. After rocking the sample was centrifuged and the supernatant containing the lipid was stored. PE (850758P) and PG (840503P) standards were from Avanti Lipids.

Analytical mass spectrometry. For mass determination and higher order CID-MS, purified lipids were dissolved in methanol and measured by nano-ESI-MS in the positive mode (LXQ Linear Ion Trap Mass Spectrometer with $MS^n$ software; Thermo Fisher Scientific). For optimal detection and quantification of PT, diPT, PE, and CL with high mass resolution, reversed phase HPLC-MS was performed on an accurate-mass QTOF LC/MS G6520 instrument. In 15 minutes, a gradient from 100% solvent A (5% $H_2O$ in MeOH with 2 mM ammonium formate) to 100% solvent B (10% cyclohexane in 1-propanol with 3 mM ammonium formate) was run on an Agilent Poroshell 120 Å, EC-C18, 1.9 µm column, equipped with an Agilent EC-C18, 3.0×5 mm, 2.7 µm guard column. The elution time of cardiolipin was determined using a synthetic standard (Avanti #750332). For the quantification of natural diPT, the standard addition analytical method was used. *S. typhi* total lipids (1 mg/ml) were spiked with a series of known concentrations of synthetic diPT (0, 5, 10, 15 µg/ml) and subjected to reversed phase HPLC-MS analysis. The peak areas of extracted ion chromatograms of m/z 1626.032 (fatty acid chain length and unsaturation: C66:2) were plotted against the concentrations of the spiked synthetic standard. The extrapolated number on the X-axis is the estimated concentration of natural diPT (m/z 1626.032) in the *S. typhi* total lipid extract. The peak area of two other fatty acid variants (m/z 1654.064 C68:2 and m/z 1648.016 C68:5) were also extracted and compared to the peak area of m/z 1626.032 to determine their concentrations. The estimated natural diPT percentage was obtained by the combined concentrations of three major chain length analogs divided by the total injected lipid concentration (1 mg/ml).

Nuclear magnetic resonance. NMR spectra were recorded on an Oxford 600 MHz Magnet (600 MHz for 1H, 151 MHz for 13C), Bruker AVANCE II Console system, equipped with 5 mm Prodigy HCN TXI cold probe and an Agilent 700 MHz magnet (700 MHz for 1H, 176 MHz for 13C) with a DDR2 console equipped with an Agilent Triple resonance Helium cold probe. The 31P-decoupling experiments were performed on a Varian 400 MHz magnet equipped with 5 mm AutoX OneProbe. Chemical shifts are reported in ppm and coupling constants (J) in Hz. The samples were measured in MeOH-d4 of which the residual solvent resonance was used as an internal standard (δ 3.31 for 1H, δ 49.00 for 13C). The 1H-NMR spectra were assigned using COSY, TOCSY, multiplicity-edited HSQC (135DEPT-HSQC) and HMBC. The TOCSY experiments were performed with a MLEV17 mixing scheme with a 100 ms spin lock (Gheysen et al., 2008). The data are reported as follows: chemical shifts (δ), multiplicity (s=singlet, d=doublet, dd=double doublet, ddd=double doublet, td=triple doublet, t=triplet, dt=double triplet, q=quartet, m=multiplet), coupling constants J (Hz) and integration (FIGS. 7A-I).

Reconstitution of ClsB in *S. typhimurium* ΔclsB mutant. ClsB was isolated via PCR using forward primer 5'CGCG-GATCCGATACGGTAACGCGGTTCTTTCT (SEQ ID NO:1) and reverse primer 5'GATGAAT-TCCGGCCGCAATAAAGCCGTCCAAG (SEQ ID NO:2). The sequence of the PCR product was verified by Sanger sequencing. A second PCR was performed using forward primer 5'TAGAGGAATAATAAATGAT-GAAATGCGGCTGGCGTGAAGGTAATCAA (SEQ ID NO:3) and reverse primer 5'GTTAGGGCTTCACTCCTGT-ATTTTC (SEQ ID NO:4) to make it suitable for cloning into the pBAD-TOPO vector (Life-Technologies). Correct insertion was confirmed by restriction digestion with BsmI (New England Biolabs). A 2 ml *S. typhimurium* ΔclsB culture was grown overnight in LB media with chloramphenicol (25 μg/ml). 0.5 ml of the starter culture was diluted in 50 ml of LB with CM. This culture was incubated for 2.5 hour at 37° C. while shaking. The culture was washed three times with ice-cold 10% glycerol and used for electroporation by adding 50 ng of pBAD-TOPO-CLSB to 40 μl of bacteria. A 0.1 cm cuvette was pulsed with 1.6 kV, capacitance of 25 μF, for ~5 μs. Cells were grown for 4 hour in 1 ml of LB without antibiotics at 37° C. before plating on LB plates with 100 μg/ml ampicillin. After overnight incubation colonies were picked and grown overnight in 3 ml of LB with chloramphenicol and ampicillin. Insertion of the clsB gene was confirmed by PCR. Total lipid extraction was performed on cultures of a reconstituted clone grown with or without induction with 0.2% arabinose.

Mincle activation assay. Lipids were diluted in 20 μl isopropanol per well of a flat bottom 96 well plate. Isopropanol was evaporated, after which $3 \times 10^4$ reporter cells in 100 μl medium were added per well. Reporter cell lines were FcRγ-, murine Mincle and FcRγ-, or human Mincle and FcRγ-expressing 2B4-NFAT-GFP cells. After 18 hr at 37 C, cells were washed with PBS 1% BSA and GFP expression was measured on the FACSCanto II (BD). Data were analyzed using FlowJo software.

Figure 5A:
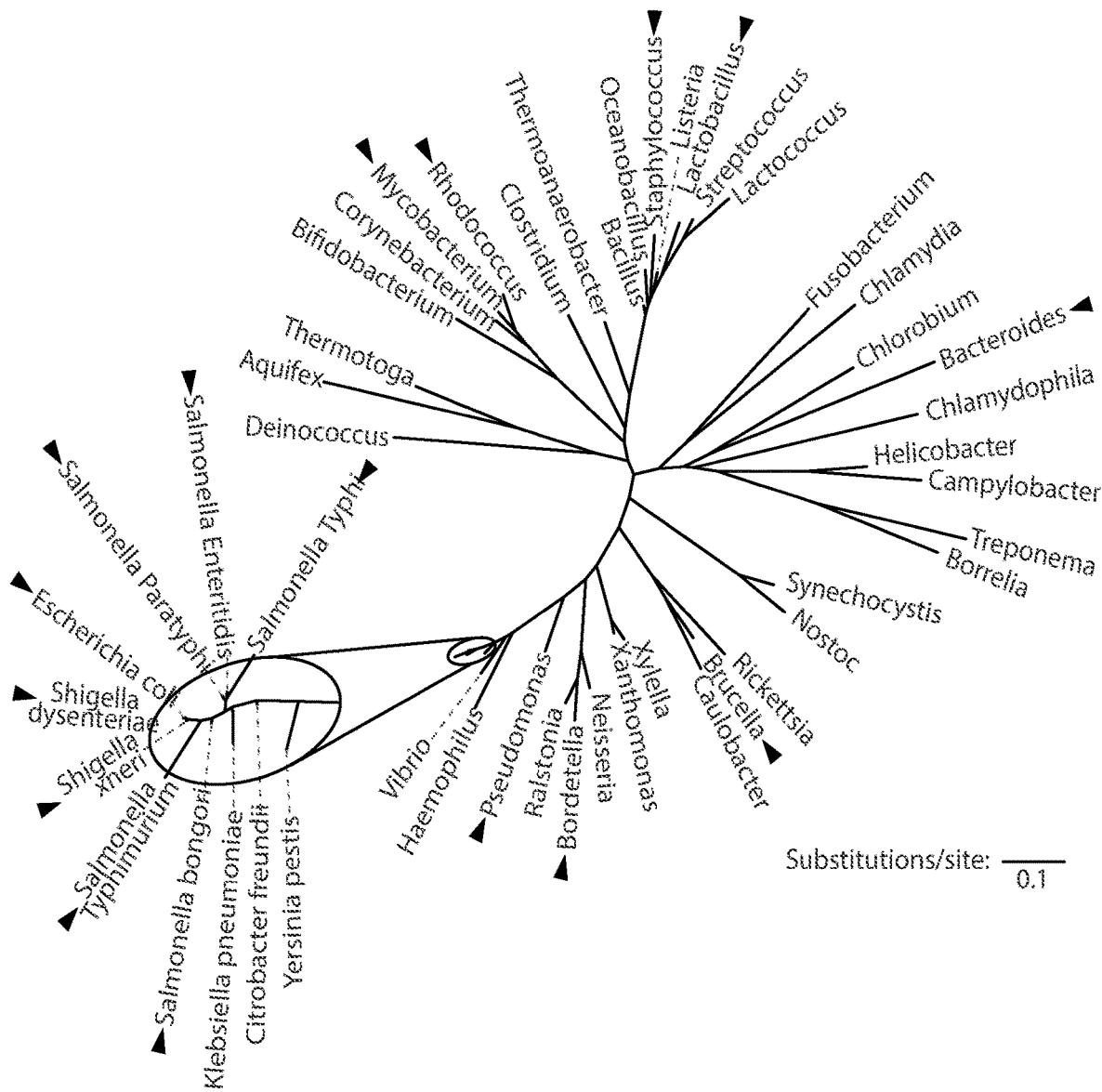
FIG. 5A is a phylogenetic tree based on 16S RNA sequences of a broad range of bacterial species, focusing on close relatives of *Salmonella* (inset). Species that underwent genomic analysis and lipid chemotyping are indicated (triangles).
Figure 5B:
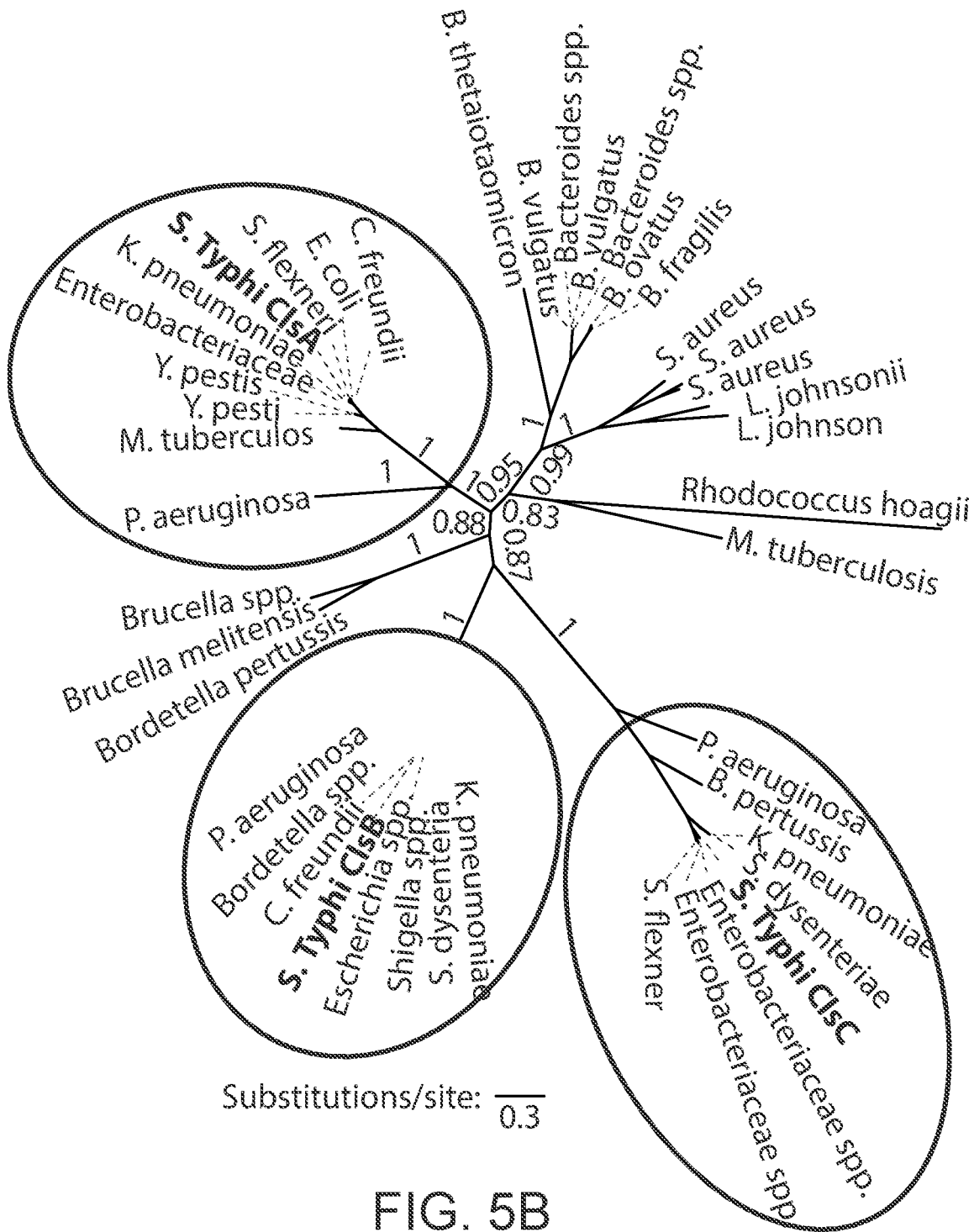
FIG. 5B is phylogenetic tree of Cls protein sequences.

Identification of ClsB in other bacterial species. For a selection of bacterial species, the 16S sequence was downloaded from the SILVA database (https://www.arb-silva.de). Alignment, Classification and Tree (ACT) service from the SILVA server was used with default settings to align the sequences and generate a phyologenetic tree. The unrooted tree was visualized using the ITOL server (http://itol.embl.de/). Protein sequences of ClsA, ClsB, and ClsC of *S. typhi* were used for a BLASTP search in bacterial genomes using the NCBI server. For each Cls protein, the percentage identity to the top hit in each bacterial species was determined. A BLASTP search of this top hit in the *S. typhi* genome was performed to determine whether the closest hit was the same Cls protein used in the initial BLASTP search. For the phylogenetic analysis of Cls proteins, the amino acid sequences were aligned using muscle (Edgar, 2004), informative sites selected with trimAl (Capella-Gutierrez et al., 2009), and the tree as shown in FIG. 5b was calculated with MrBayes (Ronquist et al., 2012) for 1 million generations under the mixed amino acid model and a 25% burning for consensus tree generation; a separate calculation using iqtree (Nguyen et al., 2015) under the automatic model selection resulted in the same topology.

Synthesis of diPT. A stereoselective chemical synthesis of diPT, including de novo synthesis of a fatty acid with a 9R,10S cis-cyclopropyl ring was developed. The cyclopropyl fatty acid was prepared as described by Spencer et al. (Shah et al., 2014). Briefly, rhodium-catalyzed cyclopropenation of octyne with ethyl diazoacetate was followed by resolution of the enantiomers via diastereomer formation and chromatography (Liao et al., 2004). The resulting enantiopure cyclopropenes were then converted to the desired enantiomeric fatty acids over several synthetic steps including a Wittig reaction (Coxon et al., 1999) and a diimide reduction (Smit et al., 2008). Diacylglycerol was prepared by epoxide ring-opening (Jacobsen et al., 1997) of protected S-glycidol with palmitic acid, followed by esterification of the resulting hydroxyl group with the 9R,10S cyclopropyl fatty acid. Careful deprotection, to avoid acyl shift, produced the free diacylglycerol (Fodran and Minnaard, 2013). Suitably protected trehalose was converted to bis-2-cyanoethyl N,N-diisopropylchlorophosphoramidite and coupled with diacylglycerol, mediated by dicyano imidazole, and then immediately followed by oxidation to the phosphate. Finally, deprotection of the phosphates and removal of the benzyl protecting groups provided the desired product.

Example I. Identification and Characterization of Trehalose Phospholipids in *Salmonella* Species Lipidomic Analysis of Pathogenic *Salmonella* Serovars High-performance liquid chromatography-mass spectrometry (HPLC-MS)-based comparative lipidomics was used (Layre et al., 2011) to study a major pathogenic *Salmonella enterica* serovar, *S. typhi*, and compare its lipid profile with the less virulent, but closely related serovar, *S. paratyphi* A. Each molecular species of lipid isolated from the bacteria, or its adduct, is detected as a three-component data point known as a molecular event. A molecular event consists of a retention time on the HPLC column, a mass-to-charge ratio (m/z), and an intensity value. The number of molecular events estimates the total number of lipids present, including chain length variants, altered adducts, and isotopes of each molecule. The two *Salmonella* serovars combined generated 4569 molecular events (FIG. 1A). Molecular diversity is lower than the 6,000 to 10,000 events in the highly complex cell wall of *Mycobacterium tuberculosis* (Layre et al., 2011). However, this number still represents substantial lipid diversity in a Gram-negative pathogen. Comparison of *S. typhi* and *S. paratyphi* A resulted in 865 lipids that differed in intensity by 2-fold with a corrected p value of <0.05, documenting substantial divergence of the two lipidomes. Specific strategies were designed to prioritize the unknowns for identification.

Two Previously Unidentified, Abundant Lipids in S. typhi

Figure 1B:
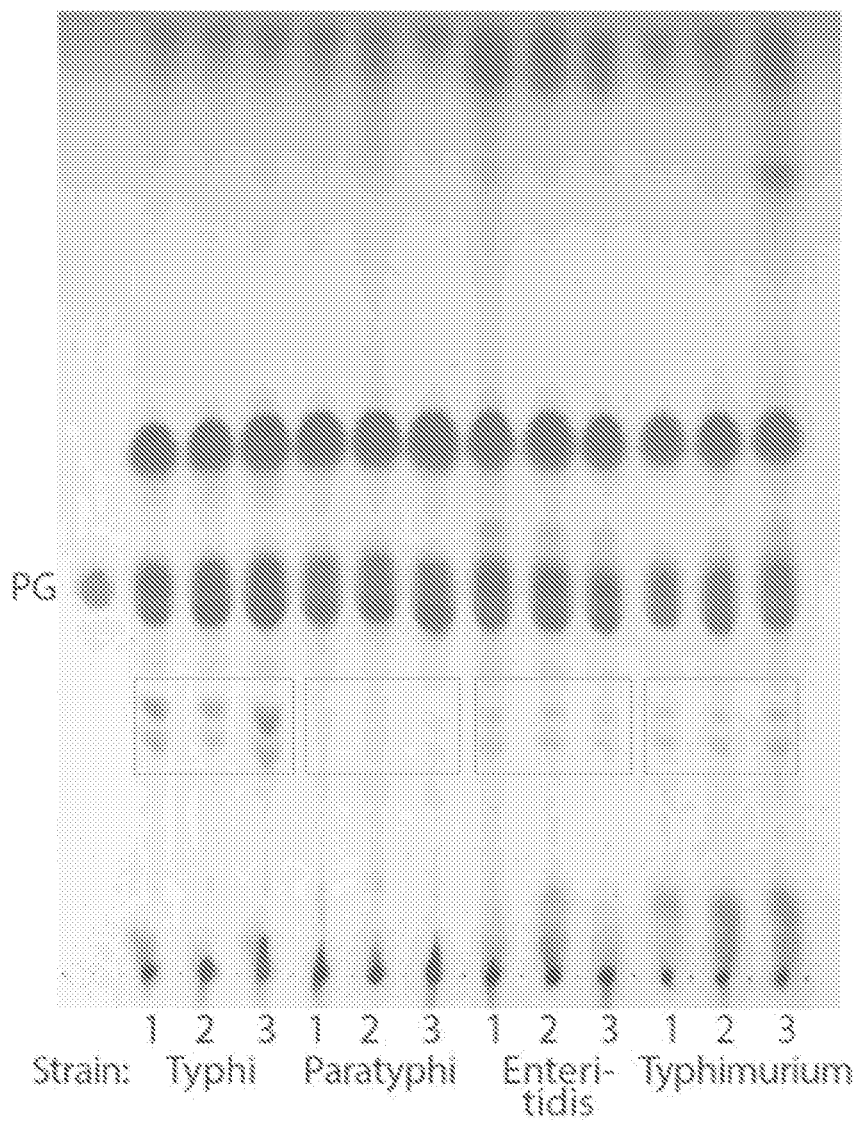
FIG. 1B is an image depicting total lipid extracts (300 μg/lane) of 12 independently derived clinical isolates belonging to four different strains of *Salmonella enterica enterica* were analyzed by TLC. Phosphatidylglycerol (PG, 40 μg) was used as a standard. Grey boxes are drawn around two unknown lipids with $R_f$ 0.22 and 0.26.
Figure 1C:
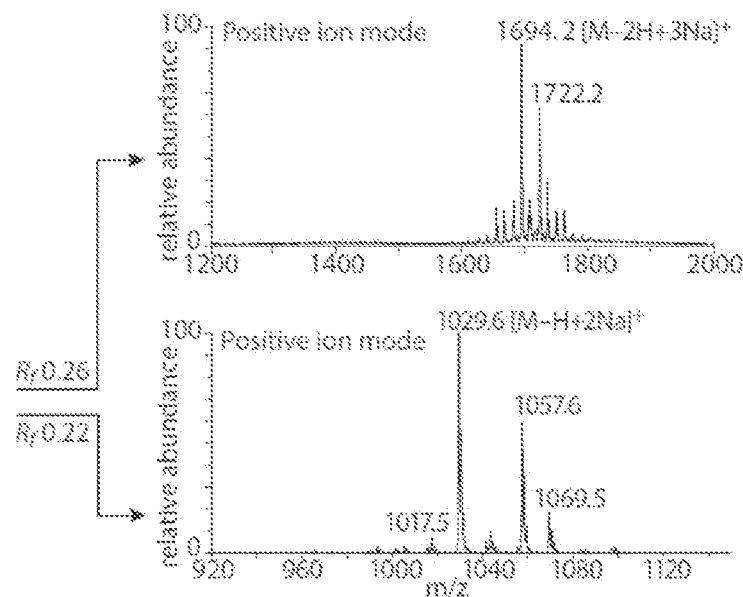
FIG. 1C is a diagram showing the results of positive mode nanoESI-MS analysis of the lipids from *S. typhi*.

To focus on lipids of high biological interest, including previously unknown compounds or candidate virulence factors, molecular events that: 1) were enriched in S. Typhi, 2) had high absolute intensity, and 3) had m/z values that did not match known compounds in LIPID MAPS or other databases were prioritized. Strain-specific enrichment of two abundant lipids was evident even by relatively insensitive normal phase TLC method (FIG. 1B). Two spots with retardation factors ($R_f$) of 0.26 and 0.22 showed much denser spots in S. typhi as compared to S. paratyphi A. Positive mode nanoelectrospray ionization (nano-ESI) MS analysis of TLC scrapings of these spots yielded spectra that were dominated by ions of m/z 1694.2 and 1029.6, respectively. These were observed along with ions corresponding to chain length and saturation variants that differed by 14 ($CH_2$) or 12 (C) u, including m/z 1722.2, m/z 1057.6 and m/z 1069.5 (FIG. 1C). Initial discovery efforts emphasized HPLC-TOF-MS over TLC because the former is ≈$10^6$-fold more sensitive. The fact that these two lipids were visible by the less sensitive technique indicates high abundance in S. typhi (FIG. 1B). Other lipids identified by the HPLC-lipidomics system are produced at <10 part per million of total cellular lipid. The limit of detection of charring on TLC is ~1 µg, so any clearly visible spot in a profile from 300 µg of total bacterial lipid suggest production in the low parts per hundred range. If the combined density of the two unknowns is a quarter or more of that of the phosphatidylglycerol (PG) standard (40 µg), these two unknown lipids comprise ~3.3% of total extractable lipids of S. typhi (FIG. 1b).

Figure 1D:
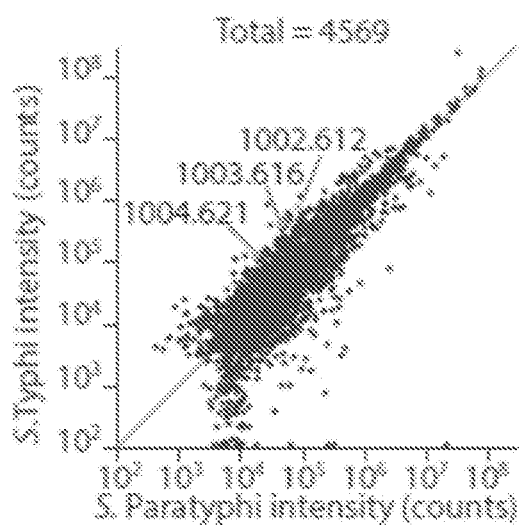
FIG. 1D is a scatterplot showing the mean intensities (integrated counts) of 4569 ions detected in 3 replicates of *S. typhi* (Quailes) and *S. paratyphi* A (NVGH308) in a lipidomics experiment. The grey lines point to ions matching the ammonium adduct of M corresponding to the lipid with $R_f$ 0.22 (m/z 1002.612) and its isotopes.

As a first step to identification, low mass accuracy values from TLC-nano-ESI MS (FIG. 1C) were matched to high mass resolution data from the HPLC-TOF-MS lipidomic data expressed as a volcano plot (FIG. 1A) or scatterplot (FIG. 1D). This approach identified ions corresponding to ammoniated adducts ($[M+NH_4]^+$) of M in the spectrum from the lipid with $R_f$ 0.22 on TLC (FIG. 1C). Using the higher mass accuracy data (m/z 1002.612), M was deducted as being $C_{48}H_{89}O_{18}P$. This indicates that the compound was a phospholipid, consistent with its observed retention time in HPLC-MS (FIG. 1E, 29.5 min) matching known phosphoglycolipids (Layre et al., 2011). Importantly, high mass accuracy mass value and molecular formula allowed searching of lipid databases, which returned no matches, indicating that the target was previously unknown. Given that S. typhi is a widely studied pathogen of world-wide significance, finding a previously unidentified compound among the most abundant lipids in this organism was unexpected. These data provided a strong rationale for focused analysis of the compounds of $R_f$ 0.22 and 0.26 to determine their complete structures.

Serovar-Specific Patterns of Phospholipid Expression

Figure 1E:
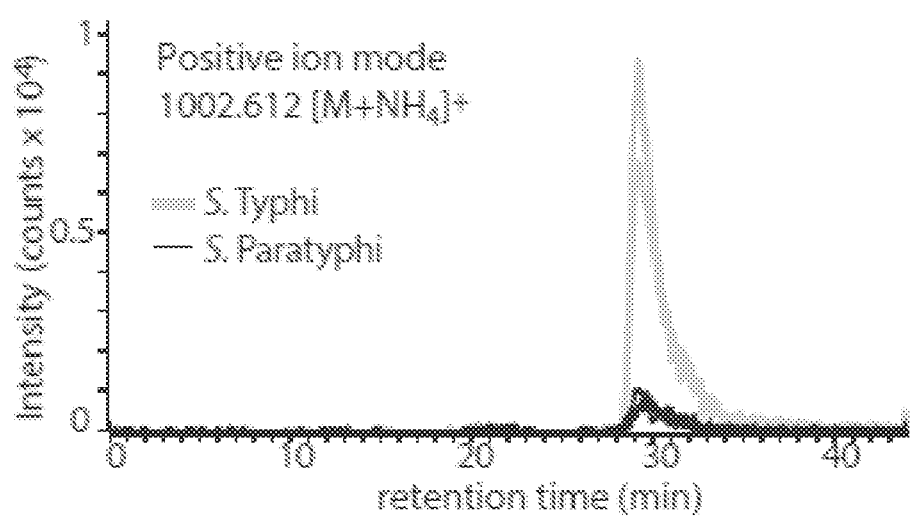
FIG. 1E is a diagram showing extracted ion chromatograms of the $R_f$ 0.22 lipid for three independent cultures of *S. typhi* and three *S. paratyphi* A measured at m/z 1002.6.

Differential analysis of four pathogenic Salmonella enterica serovars (S. typhi, S. paratyphi, S. Enterica, S. typhimurium) using three separately obtained clinical isolates within each serovar, showed uniform abundance of the two unknown lipids among independent clinical isolates (FIG. 1B). Looking across the serovars, the two lipids showed the same ranking with S. typhi>S. typhimurium≈S. enteriditis>S. paratyphi. These findings were consistent with the possibility of co-regulation of two structurally related lipids in the same pathway. TLC (FIG. 1B) resulted in barely discernable bands in S. paratyphi. However, using the established strains S. typhi Quailes and S. paratyphi A strain NVGH308, ion chromatograms reproducibly demonstrated a co-eluting lipid with a mass of 1002.612 in S. paratyphi A, confirming the presence of trace amounts of the unknown in this serovar (FIG. 1E). Based on ion chromatogram intensity calculated as peak area, S. paratyphi produces 9-fold less product than S. typhi. Overall, these data demonstrated serovar-specific synthesis of many lipids in Salmonella and identified two previously unknown phospholipids enriched in S. typhi.

Identification and Characterization of Two Trehalose Phospholipids

Figure 2A:
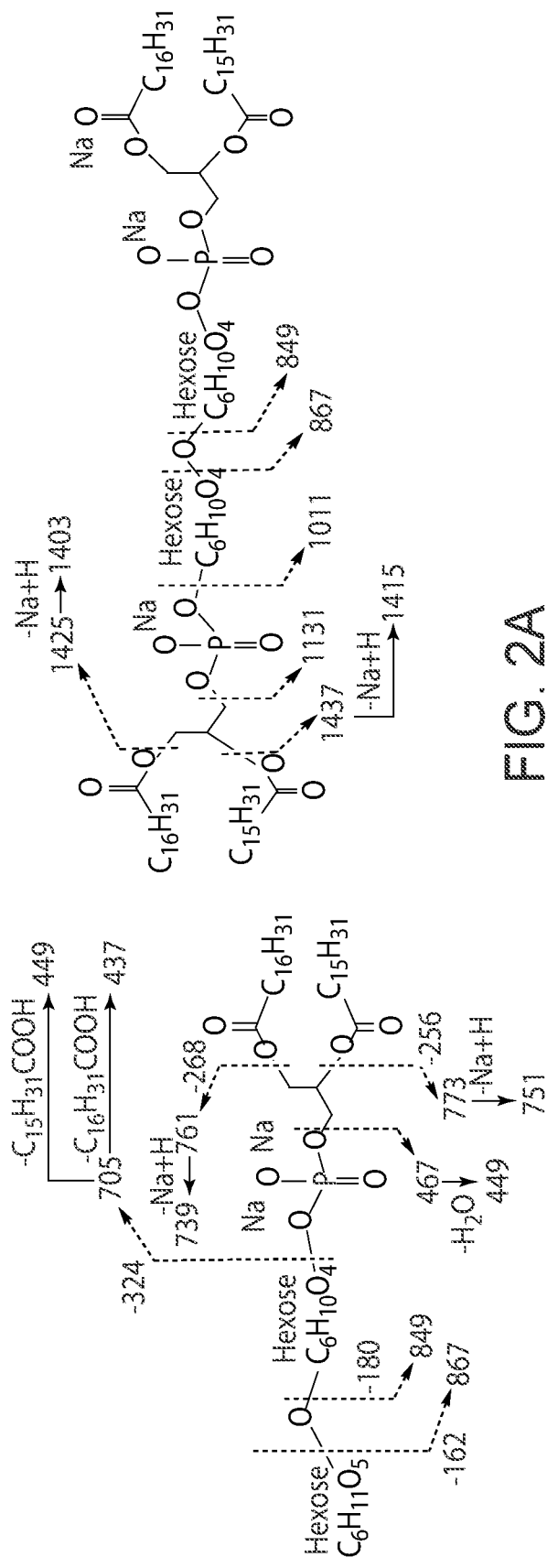
FIG. 2A is a schematic diagram showing partial structures of two unknown *S. Typhi* lipids based on nanoESI-CID-MS" illustrate the component structures, which tentatively identify a di-hexose core structures with likely phosphatidyl groups with C16 and C17:1 fatty acyl units.
Figure 2B:
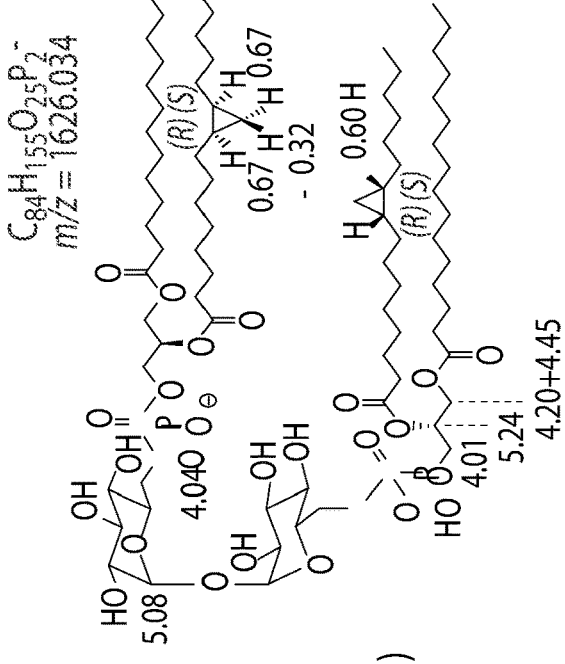
FIG. 2B is a schematic diagram showing the interpretation of the NMR spectroscopic data in FIGS. 6A-B, indicating the presence of two glucose groups in α-anomeric linkage and carriage of the phosphatidyl groups at the 6-position of glucose, as well as cis-cyclopropyl groups in the fatty acyl units. The chain length position was not established directly but corresponds to known structures.
Figure 2B:
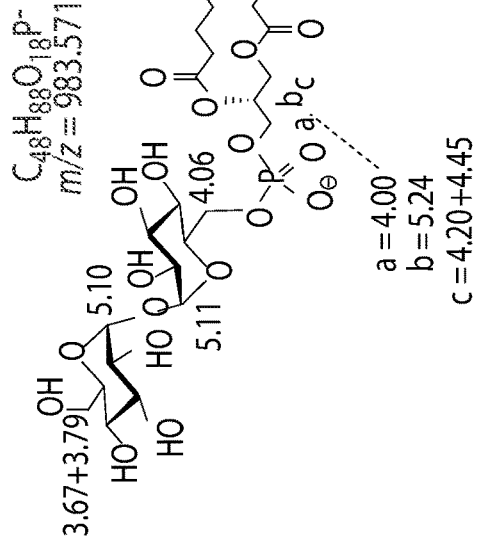
Figure 6A:
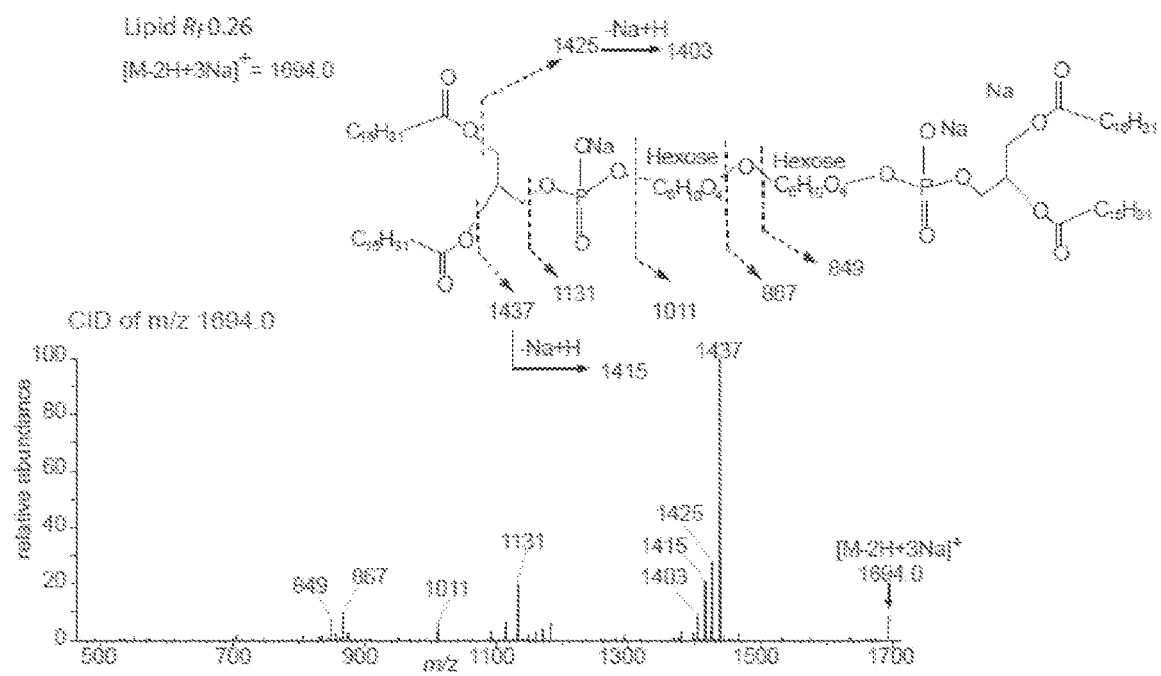
FIGS. 6A-B show the identification of TLC-isolated lipids from *S. typhi* as hexose phospholipids. Material from the upper (Rf 0.26, 6A) and lower (Rf 0.22, 6B) band, isolated as shown in FIG. 1C, was subjected to multistage collisional mass spectrometry using nanoelectrospray ionization mass spectrometry in the positive mode on an LXQ Linear Ion Trap Mass Spectrometer. The first stage collisional mass spectrum is shown. The interpretation is based on this spectrum and additional higher stage CID-MS experiments that are not shown.
Figure 6B:
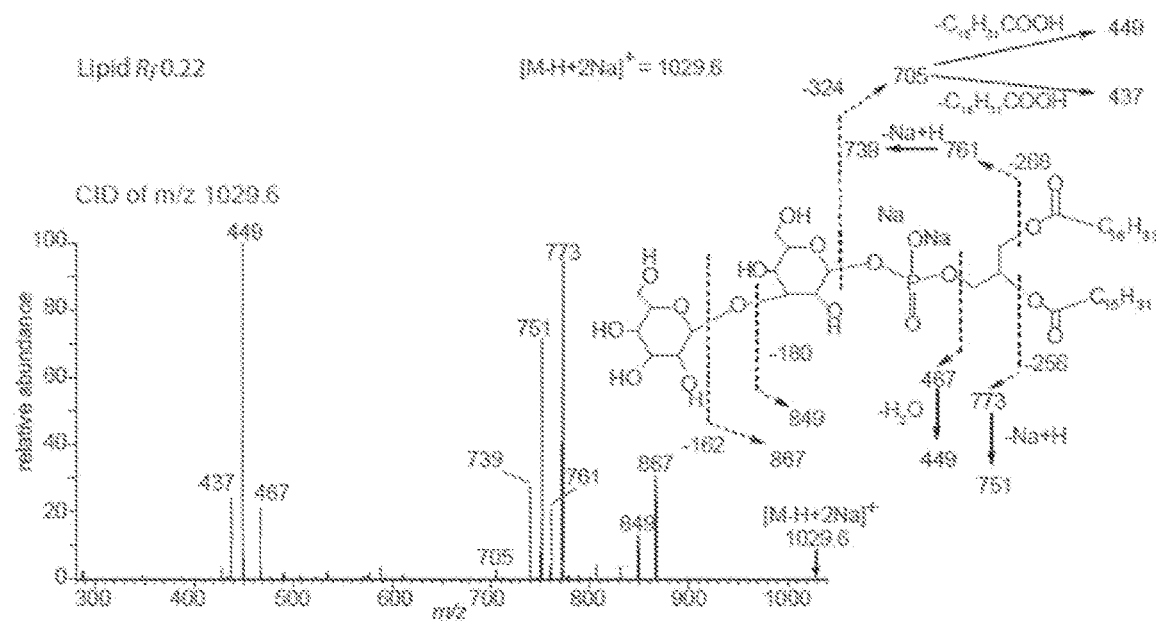

Nearly all MS signals from TLC-purified S. typhi material corresponded to m/z 1694.2 or m/z 1029.6 and the identifiable isotopes and chain length variants thereof, indicating that each spot contained only one major product (FIG. 1B). Initial characterization by ion trap CID-MS tentatively identified the lipids as two structurally related dihexose phospholipids that contained either one or two phosphatidyl groups (FIG. 2A, FIGS. 6A-B). The lower band consisted of phosphatidyldihexose and the upper band of diphosphatidyldihexose. One of the fatty acids in the phosphatidyl group was a palmitic acid (C16). The other one was a C17:1, suggesting the presence of either an unsaturation or a cyclopropyl group.

Figure 7A:
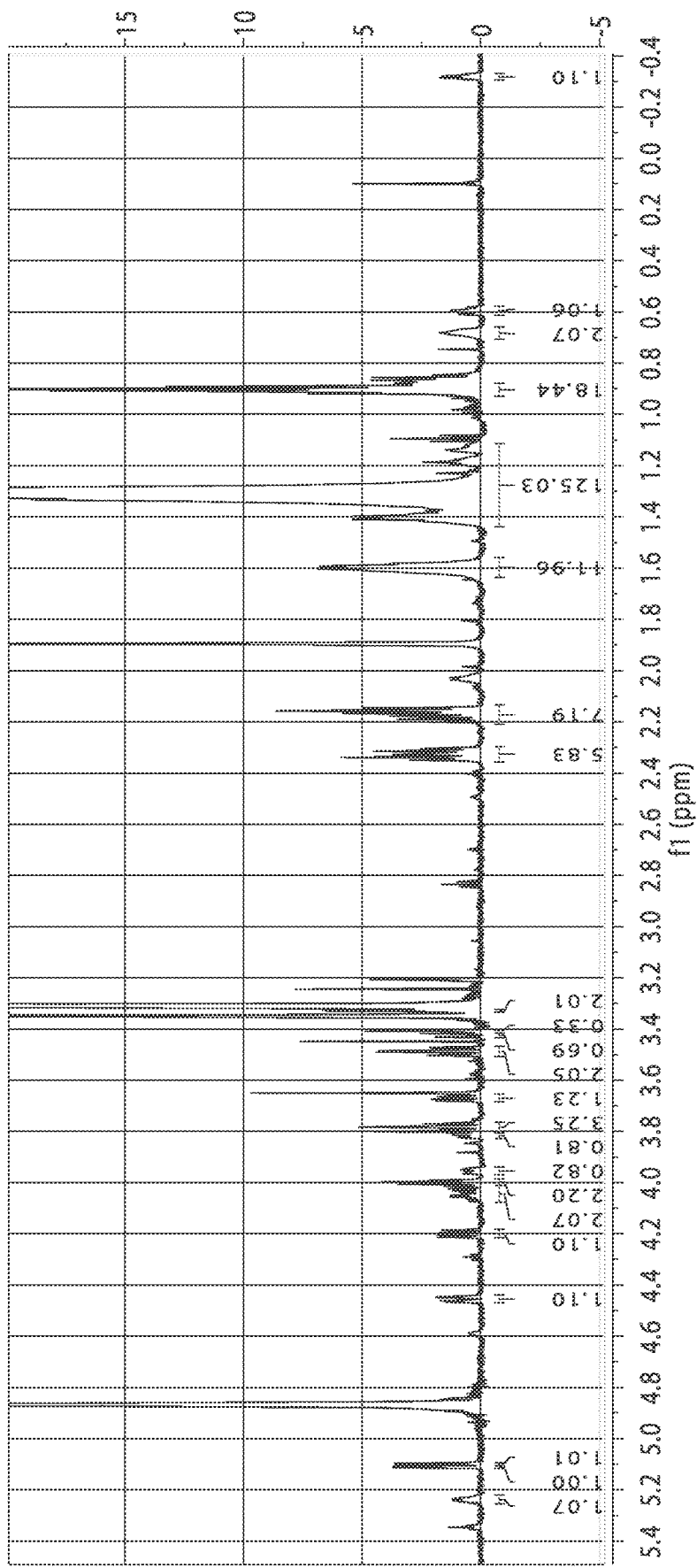
FIGS. 7A-K show the identification of phosphatidyltrehalose and diphosphatidyl trehalose from *S. typhi* by NMR. Identification of phosphatidyltrehalose from *S. typhi* by NMR (a-e). TLC-isolated lower (Rf 0.22) band lipid from *S. typhi* was analyzed by (A) 1H-NMR, (B) COSY, (C) TOCSY with 100 ms spin-lock, (D) 135-Distortionless Enhancement by Polarization Transfer (DEPT)-heteronuclear single quantum coherence (HSQC), and (E) 31P-coupled and 31P-decoupled 1H-NMR. 1H-NMR (700 MHz, MeOH-d4): δ 5.27-5.21 (m, 1H), 5.11 (d, J=3.7 Hz, 1H), 5.10 (d, J=3.7 Hz, 1H), 4.45 (dd, J=12.1, 3.0 Hz, 1H), 4.20 (dd, J=12.0, 6.9 Hz, 1H), 4.05 (ddd, J=11.8, 5.6, 2.2 Hz, 2H), 4.00 (t, J=5.6 Hz, 2H), 3.98-3.94 (m, 1H), 3.82 (ddd, J=10.3, 5.3, 2.3 Hz, 1H), 3.80-3.76 (m, 3H), 3.67 (dd, J=11.8, 5.2 Hz, 1H), 3.49 (td, J=9.8, 3.8 Hz, 2H), 3.41 (dd, J=9.4 Hz, 1H), 3.34-3.33 (m, 1H), 2.37-2.29 (m, 6H), 2.21-2.13 (m, 7H), 1.66-1.55 (m, 12H), 1.44-1.12 (m, 55H), 0.92-0.88 (m, 13H), 0.70-0.66 (m, 2H), 0.60 (ddd, J=4.3 Hz, 1H), −0.32 (q, J=5.0 Hz, 1H). 13C (176 MHz, MeOH-d4)—signals observed in the multiplicity-edited HSQC—: δ 94.8, 74.2, 74.0, 73.6, 72.9, 72.5, 71.6, 71.1, 65.6, 64.4, 63.6, 62.3, 38.7, 36.3, 34.7, 32.6-23.6 (multiple resonances), 27.3, 25.8, 22.6, 19.9, 16.6, 14.5. Identification of diphosphatidyltrehalose from *S. typhi* by NMR (F-I). TLC-isolated upper (Rf 0.26) band lipid from *S. typhi* was analyzed by (F) 1H-NMR, (G) COSY, (H) TOCSY with 100 ms spin-lock, and (I) 135- Distortionless Enhancement by Polarization Transfer (DEPT)-heteronuclear single quantum coherence (HSQC). 1H-NMR (600 MHz, MeOH-d4): δ 5.27-5.22 (m, 1H), 5.08 (d, J=3.7 Hz, 1H), 4.45 (dd, J=12.0, 3.0 Hz, 1H), 4.20 (dd, J=12.0, 6.9 Hz, 1H), 4.06-4.02 (m, 2H), 4.01 (t, J=5.7 Hz, 2H), 3.96 (dt, J=9.2, 2.0 Hz, 1H), 3.78 (t, J=9.4 Hz, 1H), 3.50 (dd, J=9.7, 3.6 Hz, 1H), 3.44 (d, J=9.9 Hz, 1H), 2.37-2.29 (m, 5H), 2.22-2.12 (m, 4H), 1.66-1.55 (m, 9H), 1.40 (d, J=7.6 Hz, 8H), 1.37-1.24 (m, 80H), 1.19 (dd, J=8.5, 4.6 Hz, 3H), 1.14 (s, 2H), 0.91 (td, J=7.0, 4.5 Hz, 16H), 0.71-0.65 (m, 2H), 0.60 (ddd, J=4.5, 3.7 Hz, 1H), −0.32 (q, J=5.0 Hz, 1H). 13C signals (151 MHz, MeOH-d4)—observed in the multiplicity-edited HSQC—: δ 95.4, 74.0, 73.0, 72.6, 71.6, 71.1, 65.5, 64.5, 63.6, 38.8, 36.4, 34.8, 32.9-23.5 (multiple resonances), 27.5, 25.9, 22.9, 19.8, 16.6, 14.3, 11.6. Summary table: correlation of NMR data with structure (J). NMR assignments of the lower and upper band isolated from *S. typhi*. assigned using the multiplicity-edited HSQC spectrum, bapparent doublet, capparent multiplet, dapparent triplet, eassigned using a Heteronuclear Multiple Bond Correlation (HMBC) spectrum,*=3JH,P coupling, grey boxes=not applicable or not obtained (K) *S. typhi* total lipids were spiked with known concentrations of synthetic diPT (C66:2 with m/z 1626.032) and subjected to reverse phase negative mode HPLC-QTof-MS to estimate the amount of diPT.
Figure 7B:
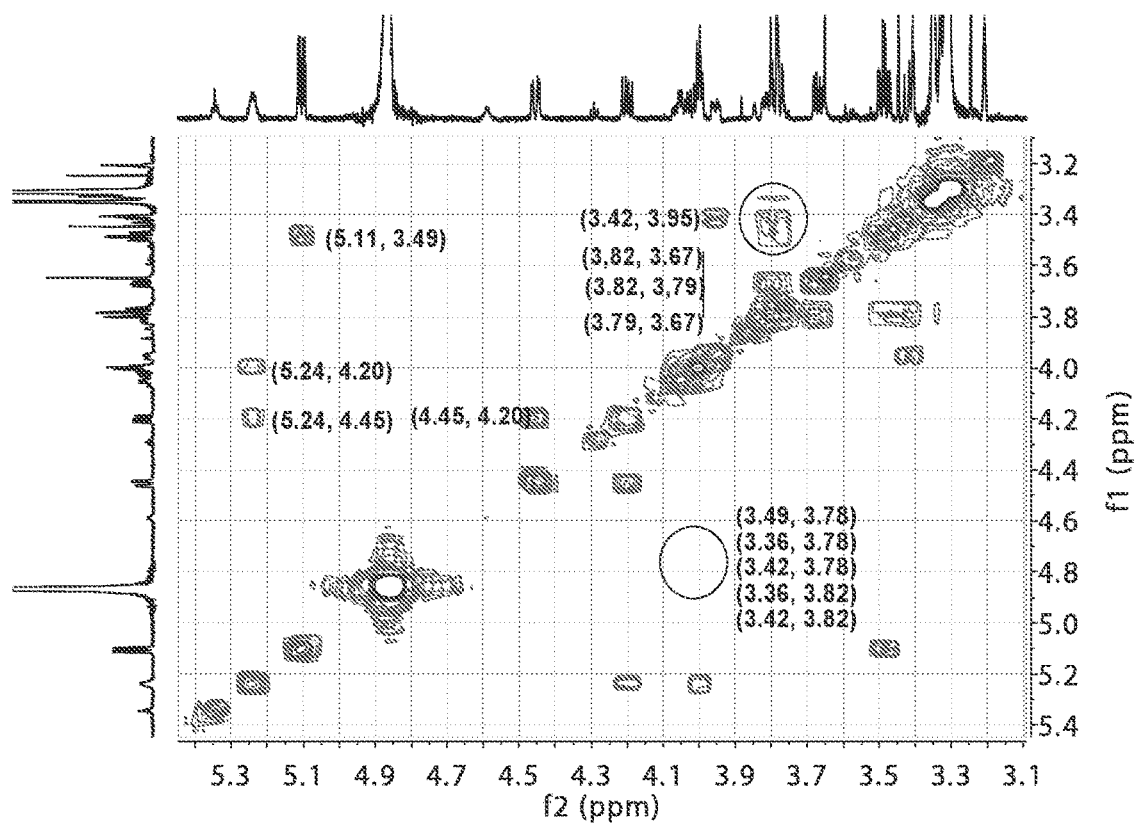
Figure 7C:
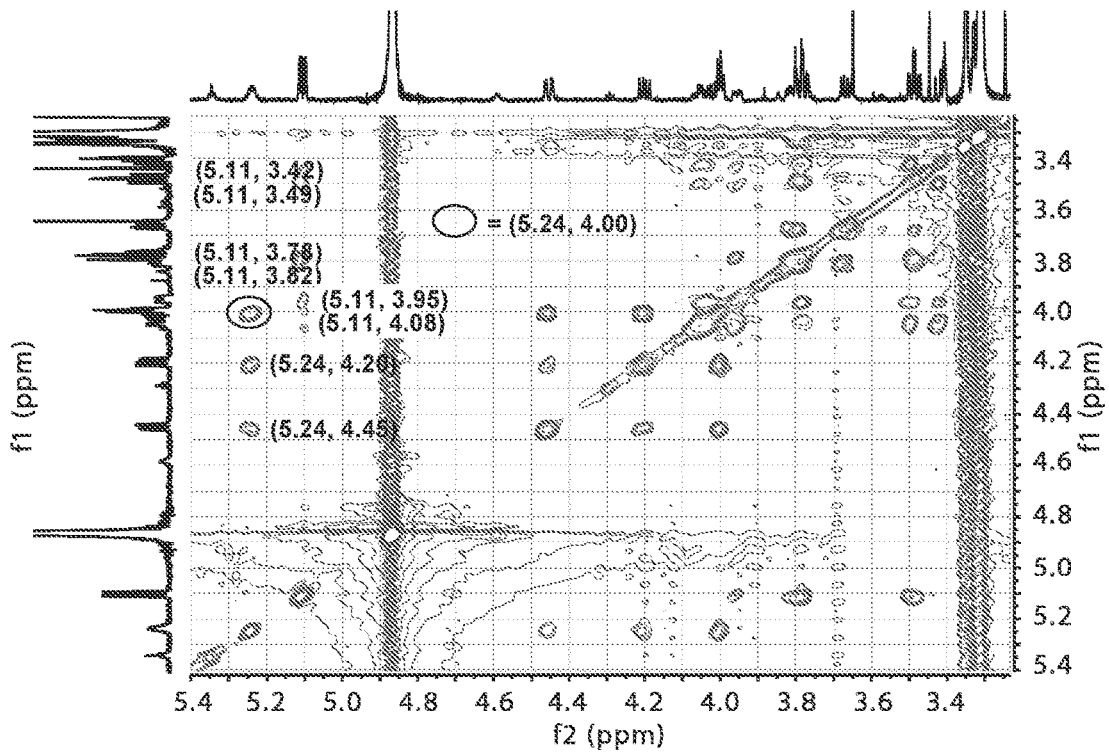
Figure 7D:
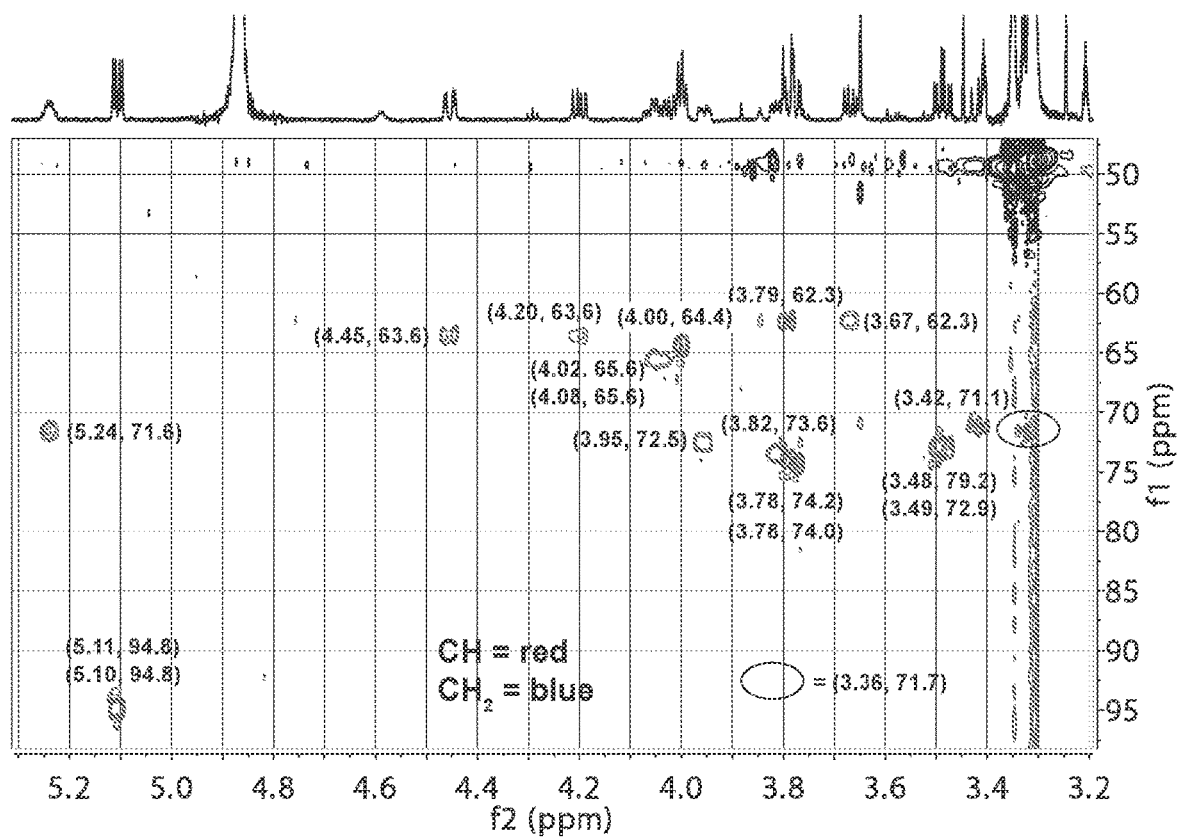
Figure 7E:
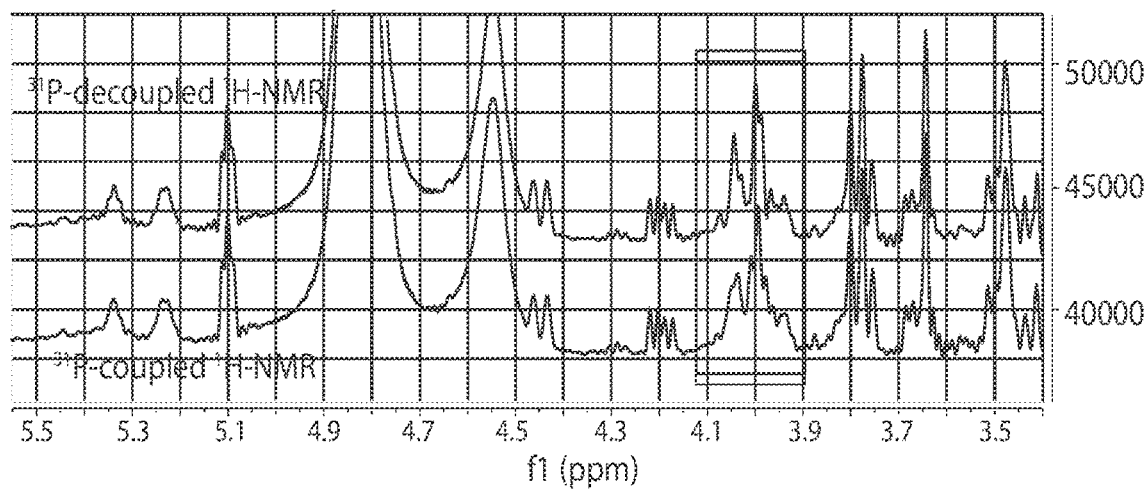
Figure 7F:
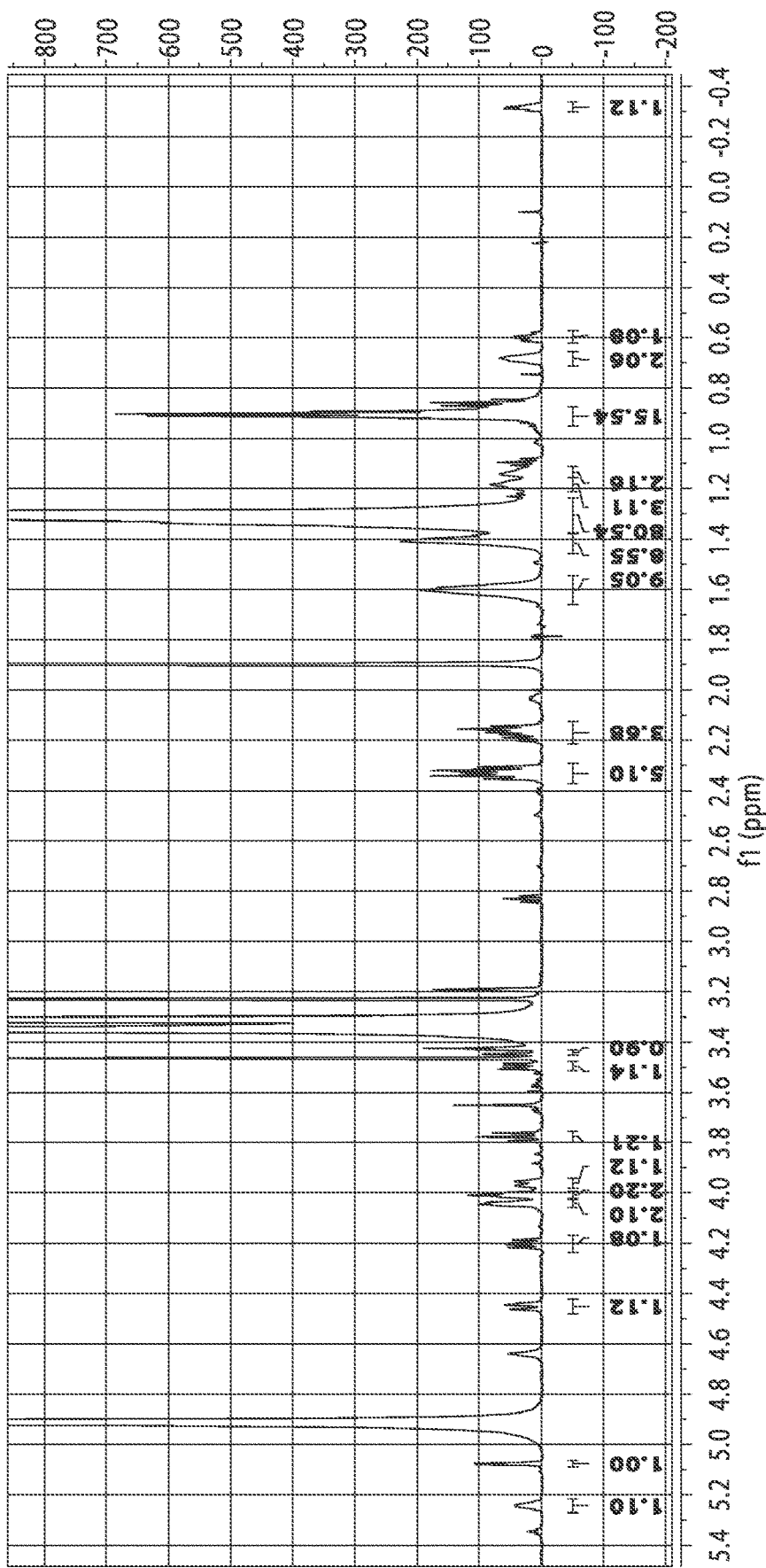
Figure 7G:
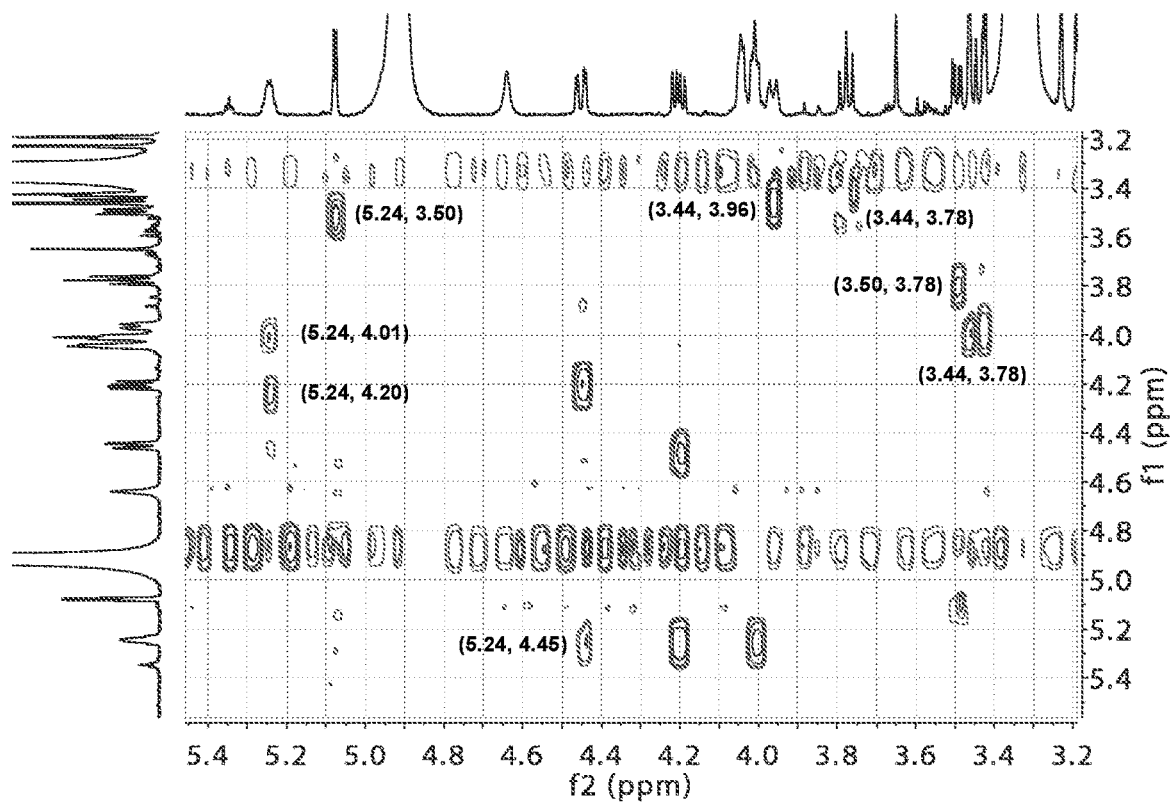
Figure 7H:
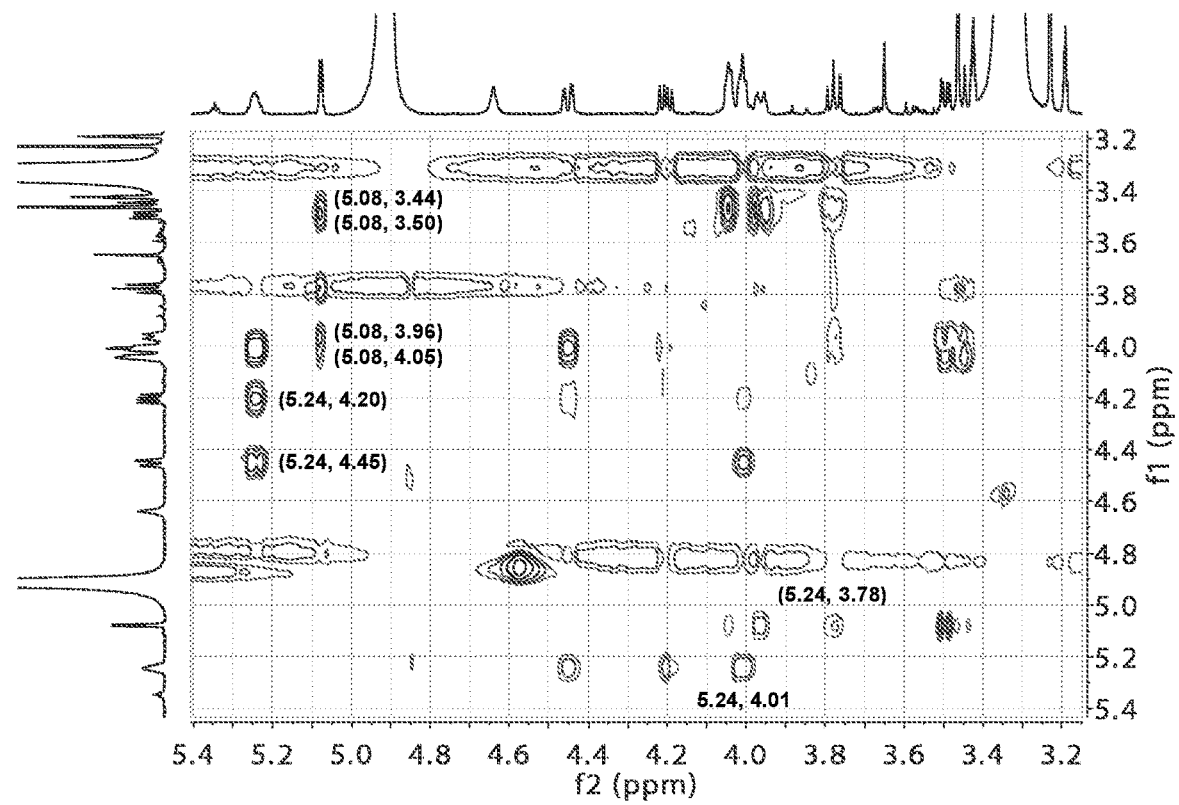
Figure 7I:
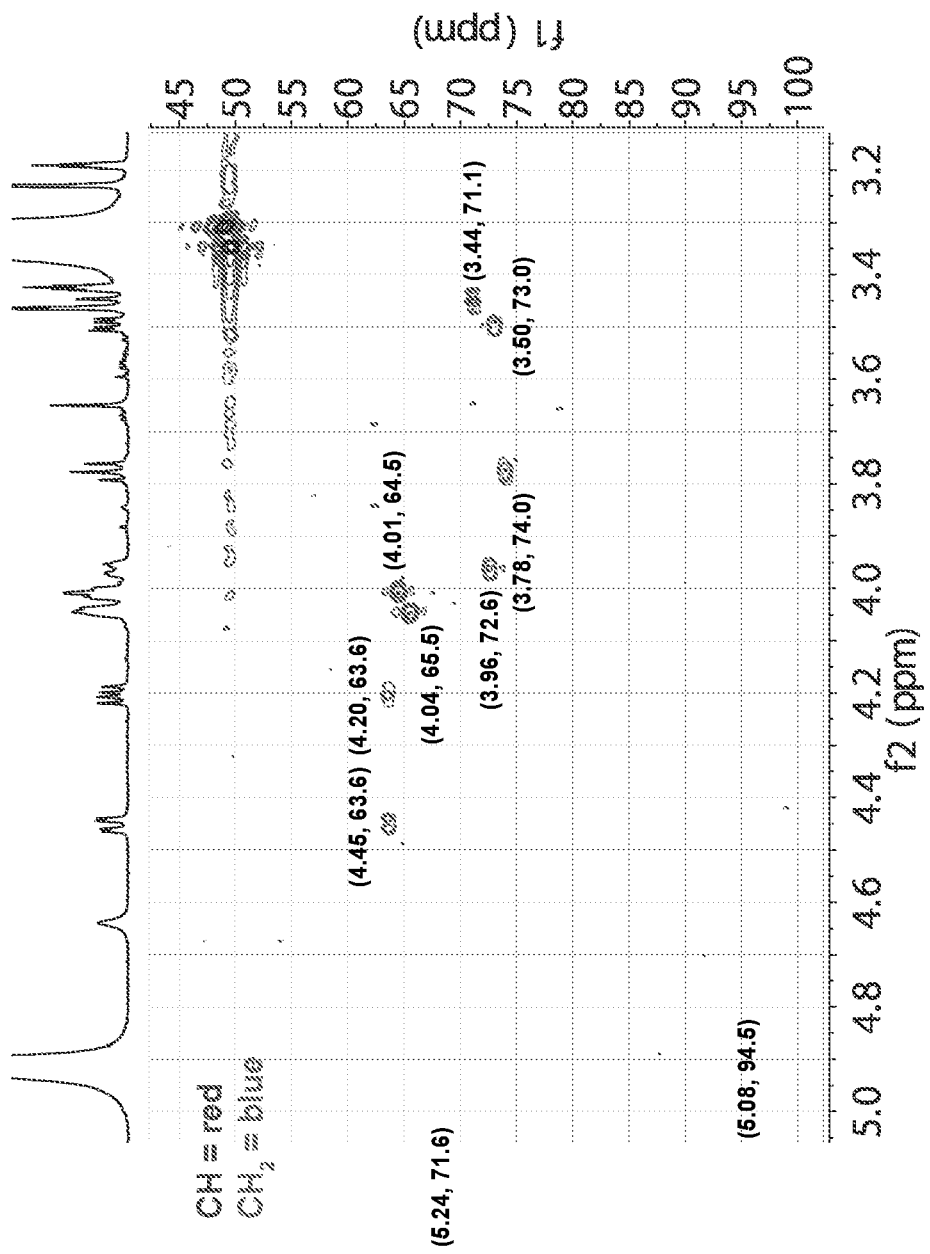
Figure 7J:
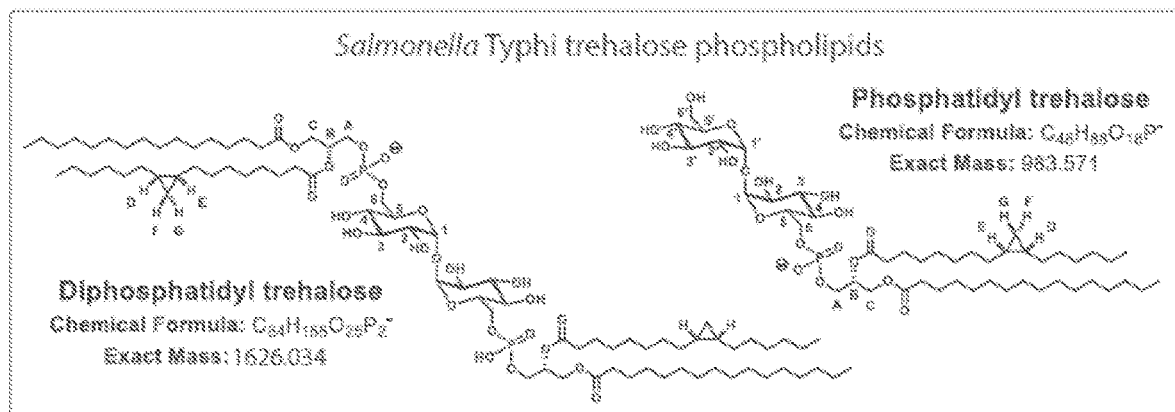

1- and 2-dimensional NMR spectroscopy analysis was performed to further analyze the phospholipds (FIG. 2B, FIGS. 7A-I). This approach showed that the lower migrating unknown compound possesses two anomeric protons (doublets at δ 5.10 and 5.11 ppm) both with a coupling constant (J) of 3.7 Hz, indicating an α,α-linked dihexose structure. The signals between δ 3.3-4.1 ppm were complex, necessitating correlation spectroscopy (COSY) analysis, which allowed assignment of the protons at C1-C5, showing two C5 signals at δ 3.82 and δ 3.95 (FIG. 7B). 2D-total correlation spectroscopy (TOCSY) NMR showed a one spin-system for the dihexose unit with five cross-peaks and the anomeric center, revealing the C6 signal at δ 4.08 (FIG. 7C). Distortionless Enhancement by Polarization Transfer Heteronuclear Single Quantum Coherence Spectroscopy (135DEPT-HSQC) (FIG. 7D) showed clear C6 signals at δ 4.08+δ 4.02 (with $^{13}C$=δ 65.6), and C6' signals at δ 3.79+δ 3.67 (with $^{13}C$=δ 62.3). Also, an additional C4 signal could be assigned at δ 3.36-71.7. The significant difference of the C6-signals in both the $^1H$ and $^{13}C$-NMR resulted from a phosphate moiety at C6, as shown in the $^{31}P$-decoupled $^1H$-NMR (FIG. 7E) and the CID-MS spectrum (FIG. 2A). Coupling constants for the dihexose CH units were established to be in the 8-10 Hz interval, consistent with J-values for trans stereochemistry. The only hexose with all-trans stereochemistry between the H-atoms is glucose.

Finally, the α,α-trehalose-6-phosphate moiety was unambiguously verified by comparing the $^1H$- and $^{13}C$-NMR signals with that of α,α-trehalose-6-phosphate. The signals at δ 5.24 (m, 1H), δ 4.00 (t, J=5.6, 2H) and the diastereotopic protons at δ 4.45 (dd, J=3.0, 12.0, 1H) and δ 4.20 (dd, J=6.9, 12.0, 1H) were part of one spin-system in the 2D-TOCSY, consistent with a glycerol moiety. $^1H$-NMR signals with resonances at δ −0.32, 0.60 and 0.68 ppm indicated a cis-cyclopropane unit (Knothe, 2006). NMR spectra from the higher migrating unknown were similar to those described above (FIGS. 7F-I), but were less complex because of reduced peak overlap, consistent with a symmetrical molecule.

Figure 2C:
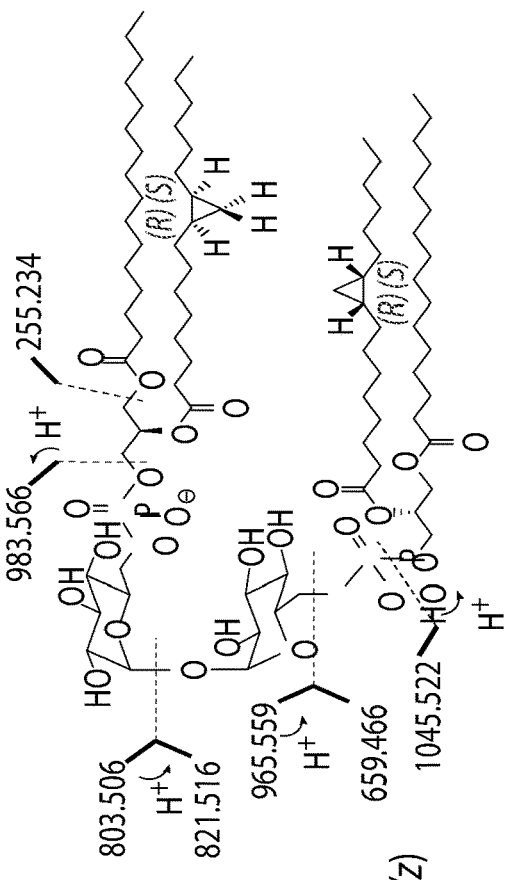
FIG. 2C is a schematic diagram showing the interpretation of the high mass resolution CID-TOF-MS data, confirming key fragments seen in nanoESI CID-MS in FIG. 2A, allowing chemical assignments with high reliability.
Figure 2C:
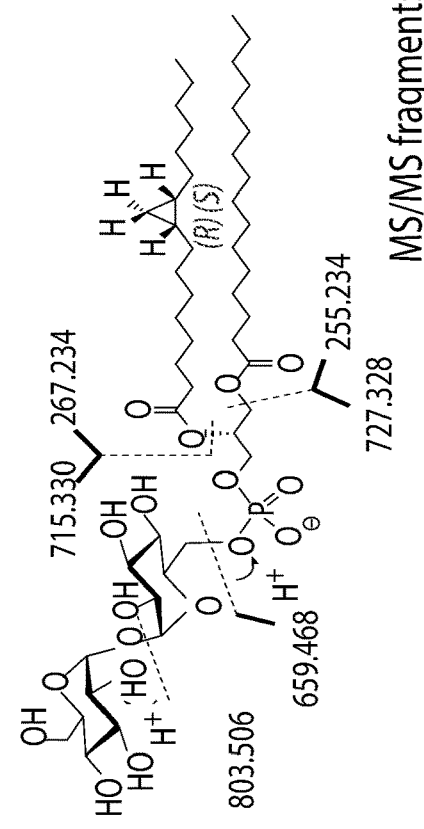

Extending the low mass accuracy results of nano-ESI-CID-MS, time of flight (TOF) CID-MS (FIG. 2C) yielded high mass accuracy ions that enabled determination of the atomic composition of the fragments (FIG. 2C), solving the structures of the unknowns as 6-phosphatidyltrehalose (PT)

and 6,6'-diphosphatidyltrehalose (diPT). This is the first report of trehalose-containing phospholipids.

Figure 8A:
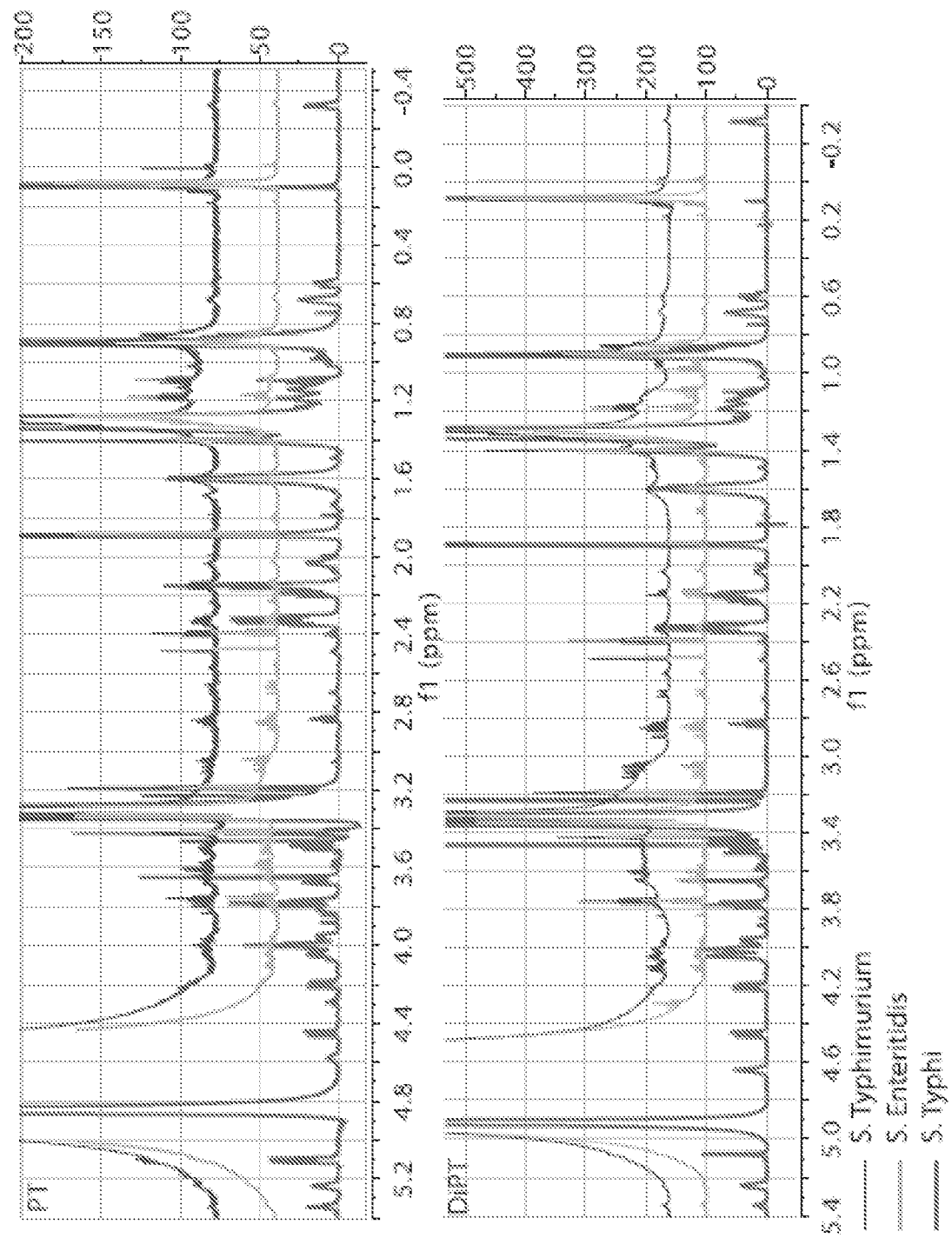
FIG. 8A shows the results of 1H-NMR spectra of TLC-isolated PT (upper panel) and diPT (lower panel) from *S. typhi*, *S. enteritidis*, and *S. typhimurium* were merged and aligned.
Figure 8B:
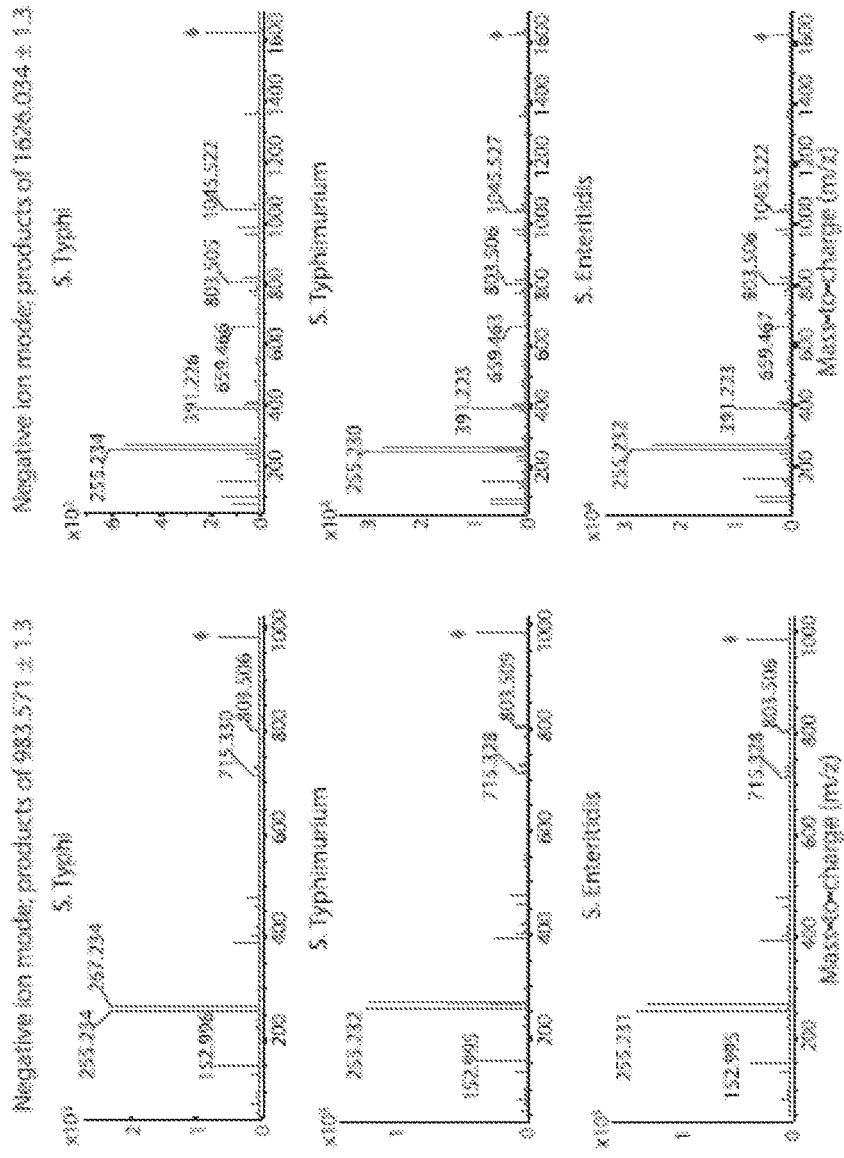
FIG. 8B shows the results of negative ion mode high accuracy collisional mass spectra of TLC-isolated PT (left panels) and diPT (right panels) from *S. typhi*, *S. enteritidis*, and *S. typhimurium*.
Figure 8B:
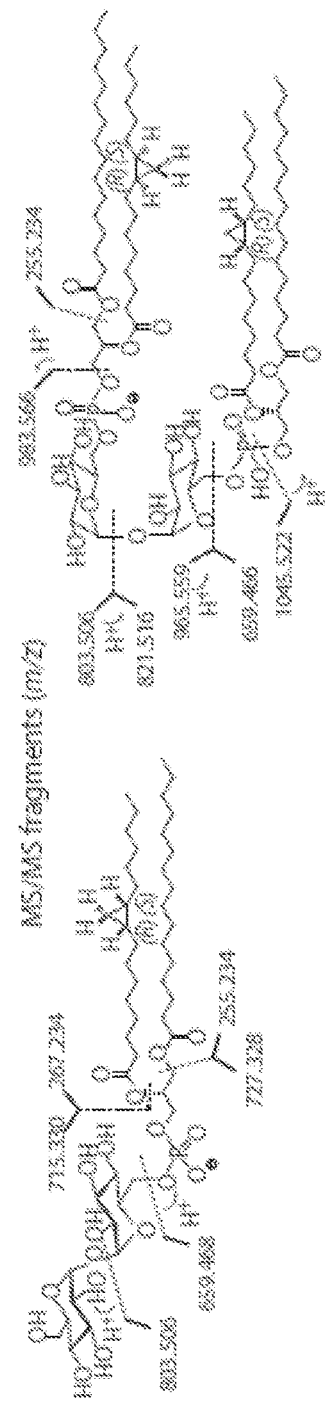
Figure 9A:
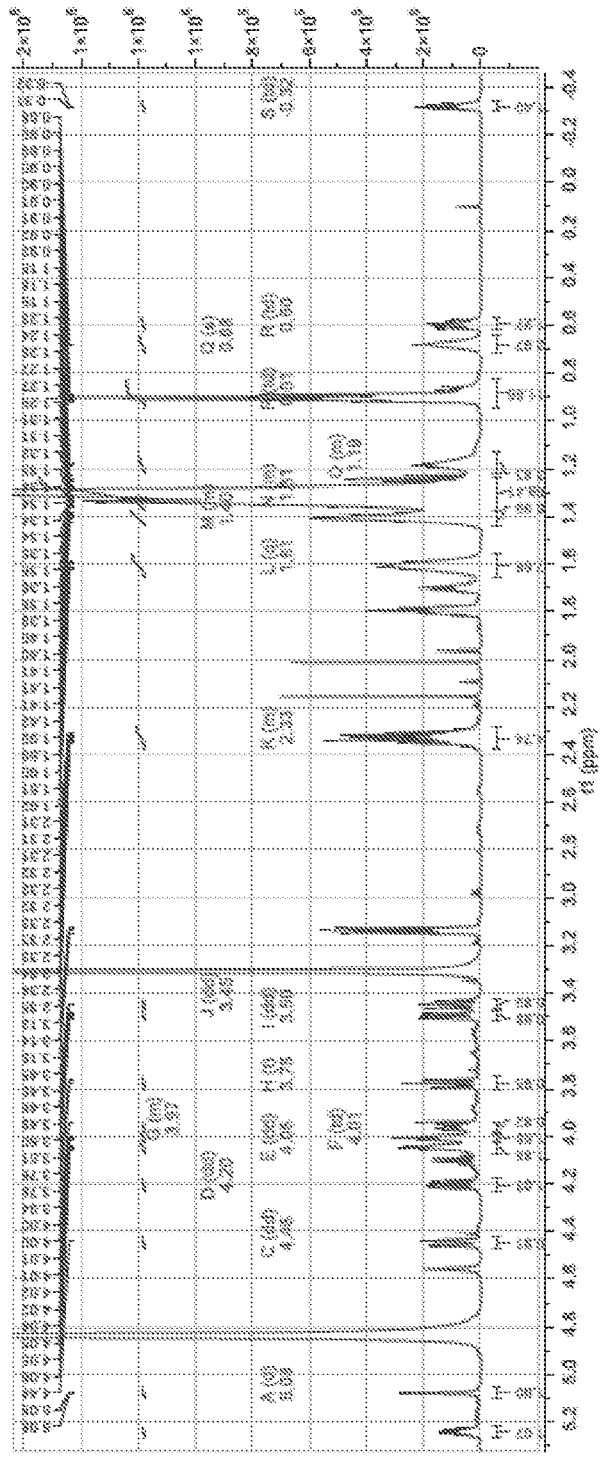
FIGS. 9A-D show the results of NMR of synthetic diPT. Synthetic diPT was analyzed with (9A) 1H NMR (600 MHz), (9B) 13C NMR (150 MHz), (9C) gCOSY, (9D) Multiplicity—Edited HSQC 1H NMR (600 MHz, CD3OD): =5.24 (dtd, J=6.7, 5.1, 3.1 Hz, 1H), 5.08 (d, J=3.8 Hz, 1H), 4.45 (dd, J=12.0, 3.1 Hz, 1H), 4.20 (dd, J=12.0, 6.9 Hz, 1H), 4.05 (dd, J=6.2, 3.5 Hz, 2H), 4.01 (td, J=5.5, 1.6 Hz, 2H), 3.98-3.94 (m, 1H), 3.78 (t, J=9.4 Hz, 1H), 3.50 (dd, J=9.7, 3.8 Hz, 1H), 3.45 (dd, J=10.0, 9.0 Hz, 1H), 2.37-2.29 (m, 4H), 1.61 (q, J=6.9, 6.2 Hz, 7H), 1.44-1.38 (m, 8H), 1.37-1.24 (m, 65H), 1.22-1.13 (m, 4H), 0.91 (td, J=7.0, 4.2 Hz, 11H), 0.68 (s, 3H), 0.60 (td, J=8.3, 4.1 Hz, 1H), −0.32 (td, J=5.4, 4.1 Hz, 1H). 13C NMR (150 MHz, MeOD): =174.9, 174.539, 95.7, 74.3, 73.3, 72.9, 72.9, 71.96, 71.9, 71.4, 65.8, 65.8, 64.9, 64.75, 63.9, 54.8, 45.7, 35.2, 35.0, 33.2, 33.1, 31.4, 31.3, 30.9, 30.8, 30.7, 30.6, 30.5, 30.5, 30.3, 29.9, 26.1, 26.1, 23.8, 23.8, 23.1, 16.9, 16.9, 14.5, 14.5, 11.7.
Figure 9B:
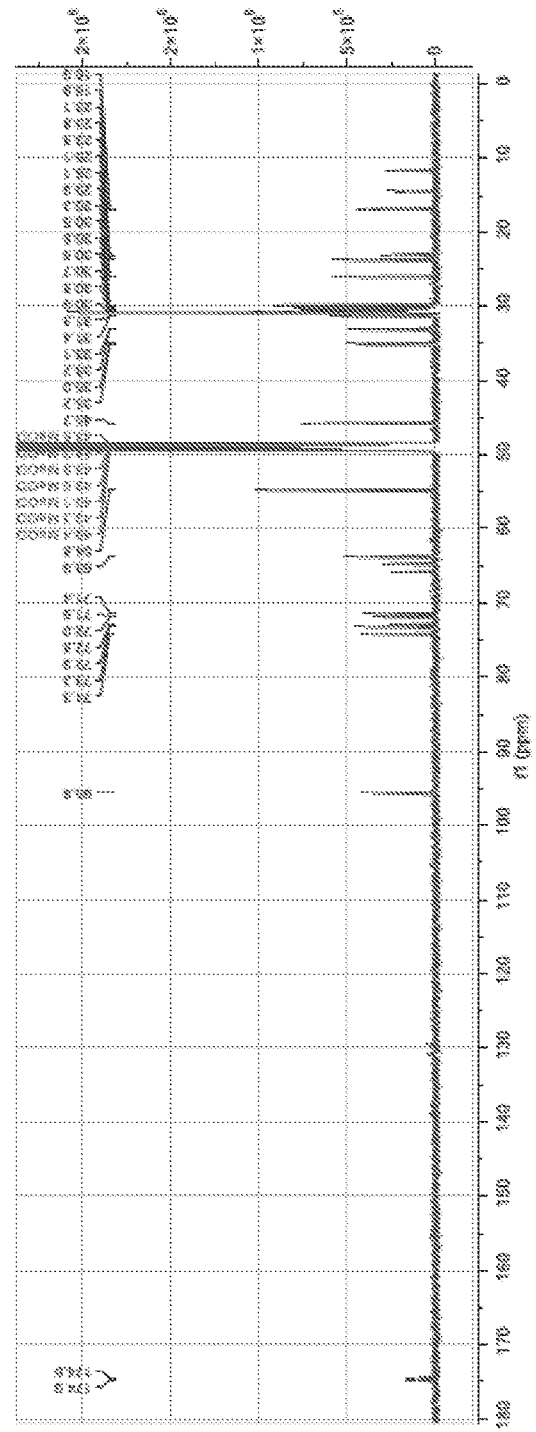
Figure 9C:
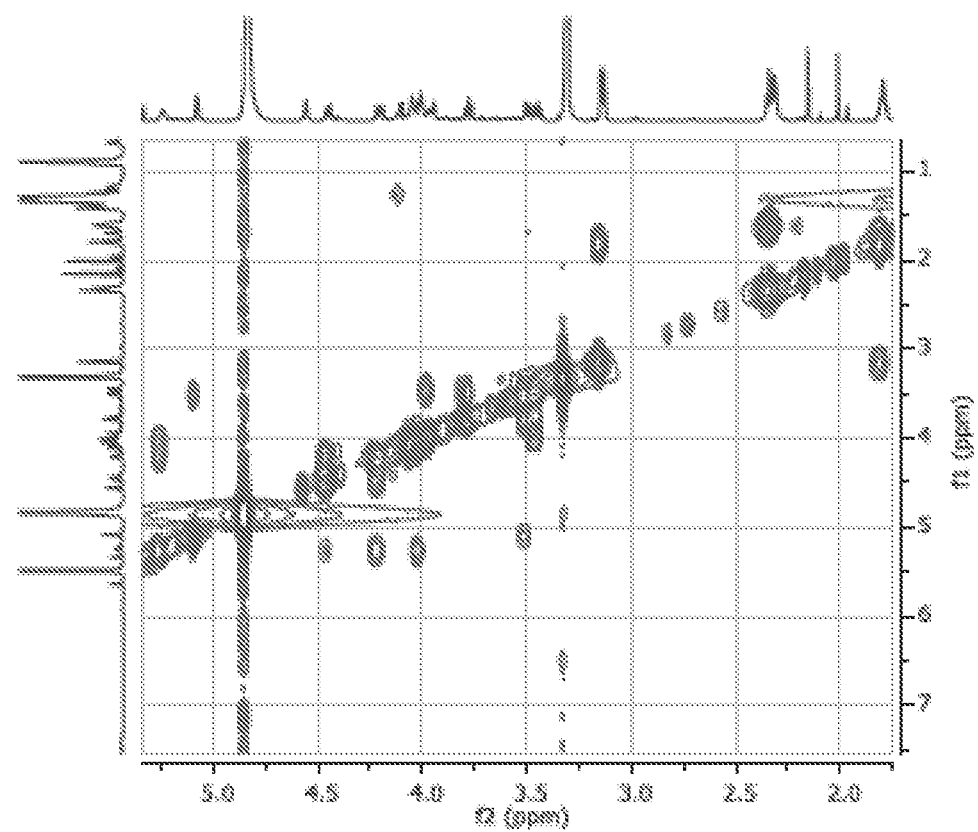
Figure 9D:
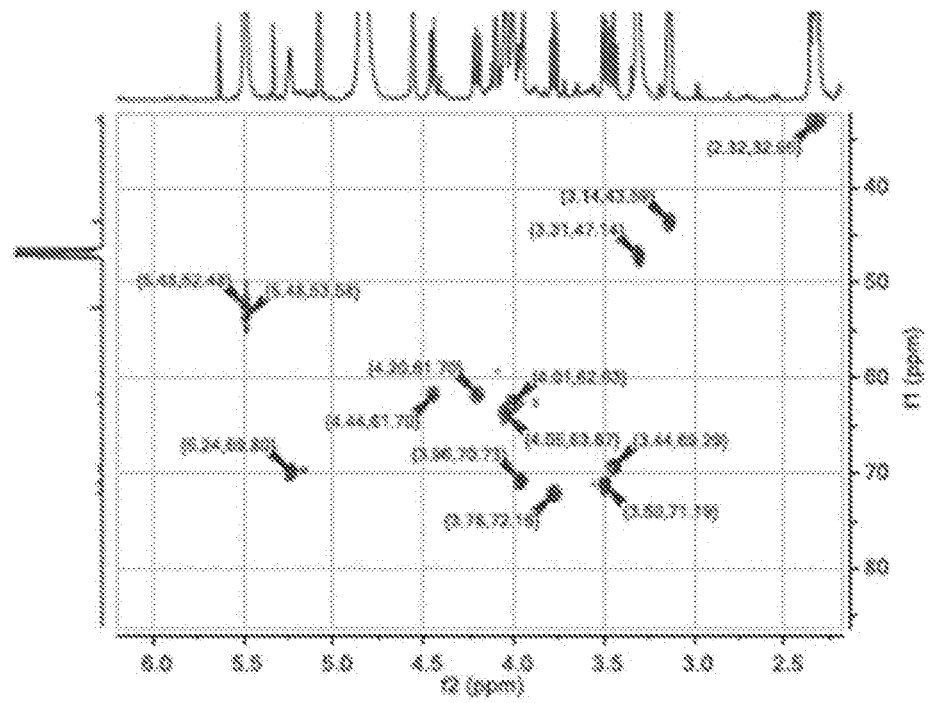
Figure 10:
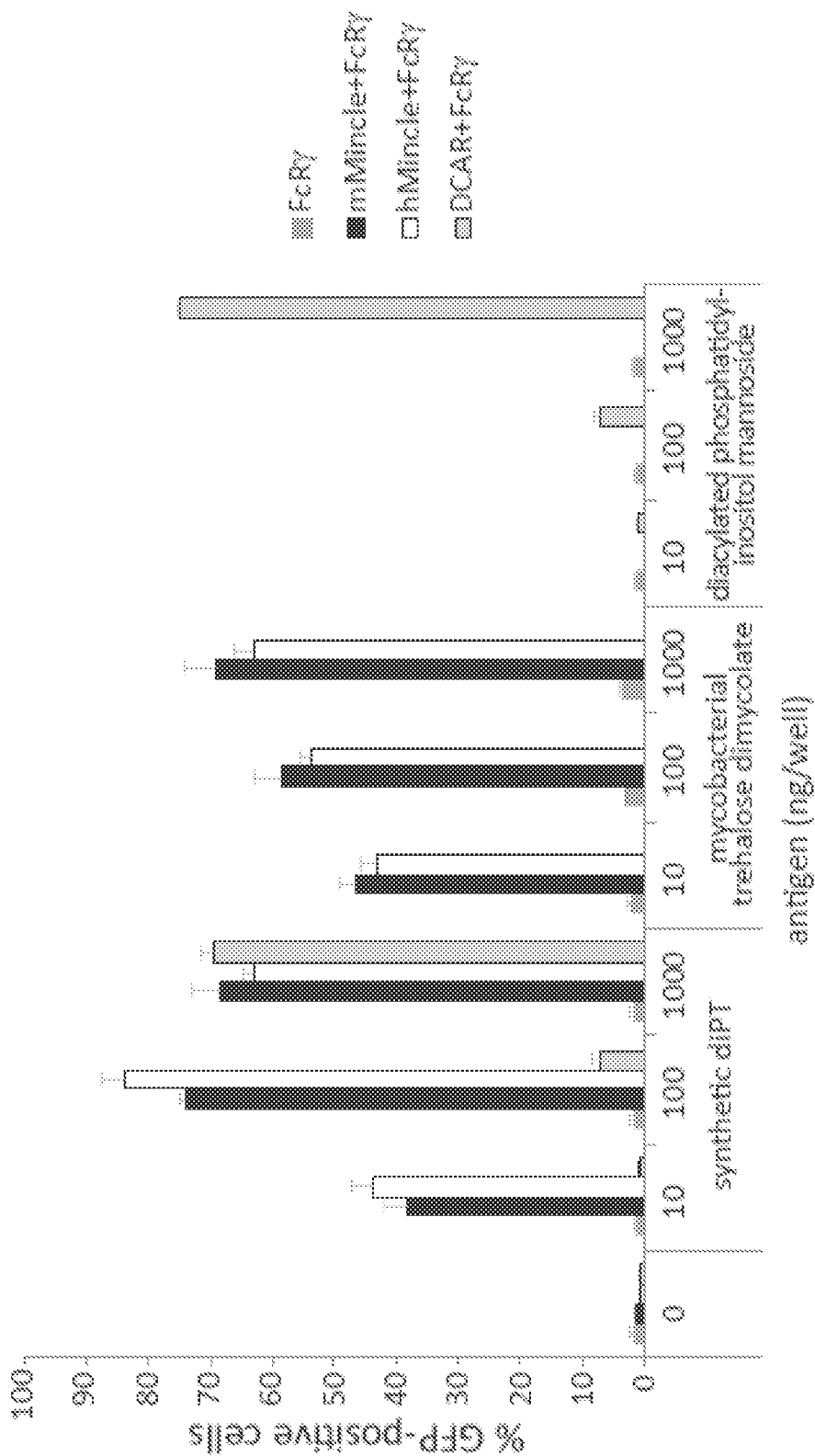
FIG. 10 shows GFP expression of reporter cell lines expressing FcRγ alone, murine Mincle-FcRγ, human Mincle-FcRγ, or the murine C-type lectin receptor dendritic cell immunoactivating receptor (DCAR)-FcRγ, after stimulation with synthetic diPT, mycobacterial trehalose dimycolate, or diacylated phosphatidylinositol mannoside, a known DCAR ligand.
Figure 11A:
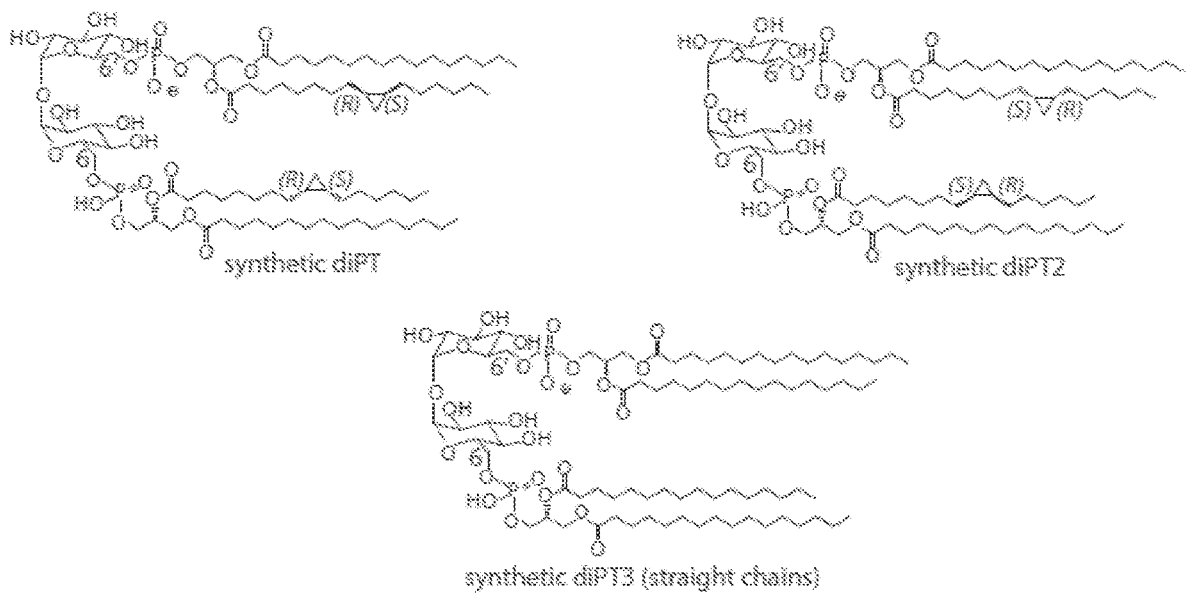
FIG. 11A shows the chemical structures of synthetic diPT, synthetic diPT2 and synthetic diPT3.
Figure 11B:
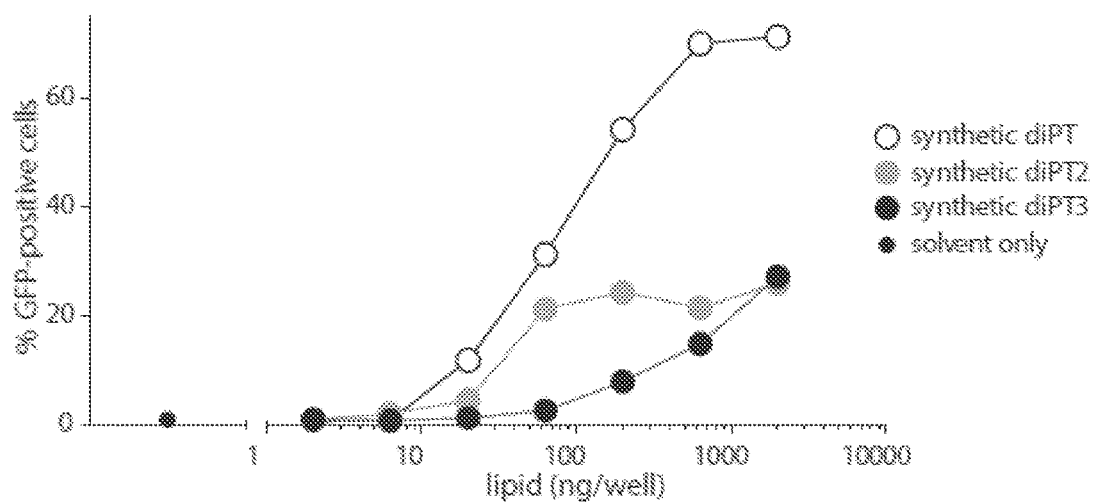
FIG. 11B shows GFP expression pf a reporter cell line expressing murine Mincle-FcRγ after stimulation with the indicated synthetic molecules.

Next the weaker co-eluting bands detected in other *Salmonella* serovars (FIG. 1B) were further analyzed. Despite being available in lower quantity and purity, NMR patterns of TLC-purified material from *S. typhimurium* and *S. enteritidis* were consistent with the lipids from each of these three serovars being chemically identical (FIG. 8A). Although the lower yields limited NMR analysis and introduced artifacts from water contamination, CID-MS allows specific targeting of ions matching the m/z of PT and diPT. CID-MS independently established all of the major components of these structures, including fragment ions matching m/z values for loss of hexose, loss of dihexose, loss of phosphatidylhexose, as well as mono- and diacylated phosphatidyl units (FIG. 8B). Also, *S. typhimurium* and *S. enteriditis* lipids co-eluted with *S. typhi* lipids as the characteristic doublets, matching the retention of TLC-MS proven PT and diPT (FIG. 1B). The combined TLC, MS and NMR analyses provide clear evidence for production of PT and diPT by all three species.

Example II. Synthesis of Trehalose Phospholipids

Chemical Synthesis of Trehalose Phospholipids

Trehalose is an abundant and common disaccharide in plants and certain bacteria but is rare or absent in mammalian cells. Therefore, trehalose-containing lipids are by definition foreign compounds for the mammalian immune system. This provides a strong rationale to test for immune responses to these newly-discovered trehalose-based compounds. As LPS or other minor contaminants could create false positive results in cellular assays, a complete chemical synthesis of diPT was performed. Based on prior reports describing naturally occurring Gram-negative bacterial fatty acids 9R,10S cyclopropyl fatty acid was first synthesized. This compound, together with palmitic acid, was used to prepare the required diacylglycerol, which along with hexabenzyl trehalose were used to assemble diPT via phosphoramidite coupling and subsequent deprotection. The 9-step synthesis was carried out with an overall yield of 69%, resulting in 15 mg of the final product. The final product was validated by HPLC-MS and NMR spectroscopy showing good correspondence of the chemical shifts between the two samples, thereby verifying the proposed chemical structure of diPT (FIGS. 7F-J).

Figure 7K:
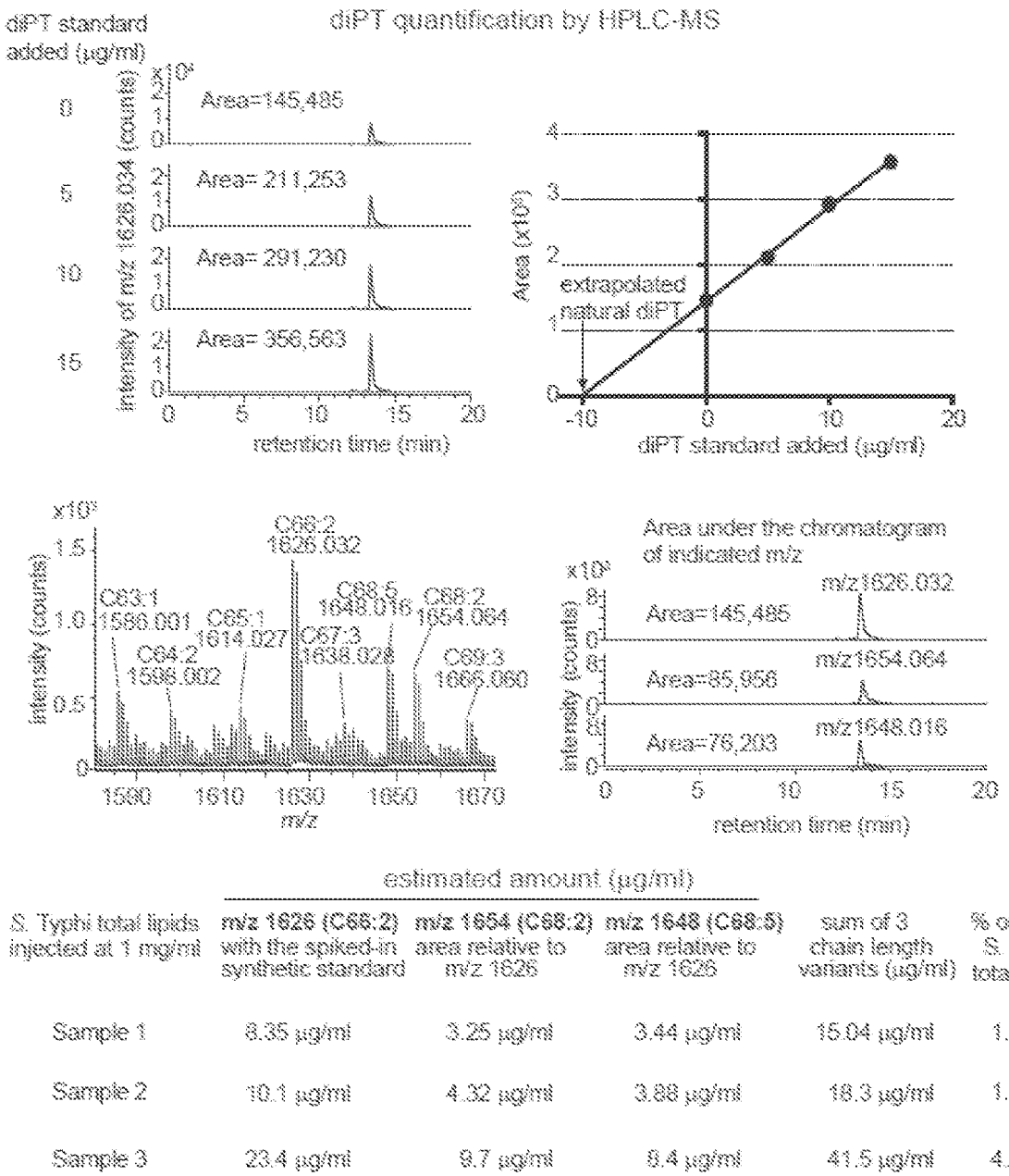

Access to milligram quantities of a synthetic diPT standard allowed more quantitative assessments of diPT as a component of the *S. typhi* lipidome (FIG. 7K). Using synthetic diPT as an internal standard for HPLC-MS and applying the method of standard additions to the three brightest natural diPT ions, the diPT is estimated to be 2.5% of *S. typhi* total lipid extract. This is a conservative estimate because more than 6 ions are seen, and it generally matches the estimate for diPT of 1.7 percent derived from TLC (FIG. 1B). Both results indicate the diPT and PT are among the most abundant lipids in *S. typhi*.

*S. typhi* Trehalose Phospholipids are Potent Mincle Ligands

Figure 3A:
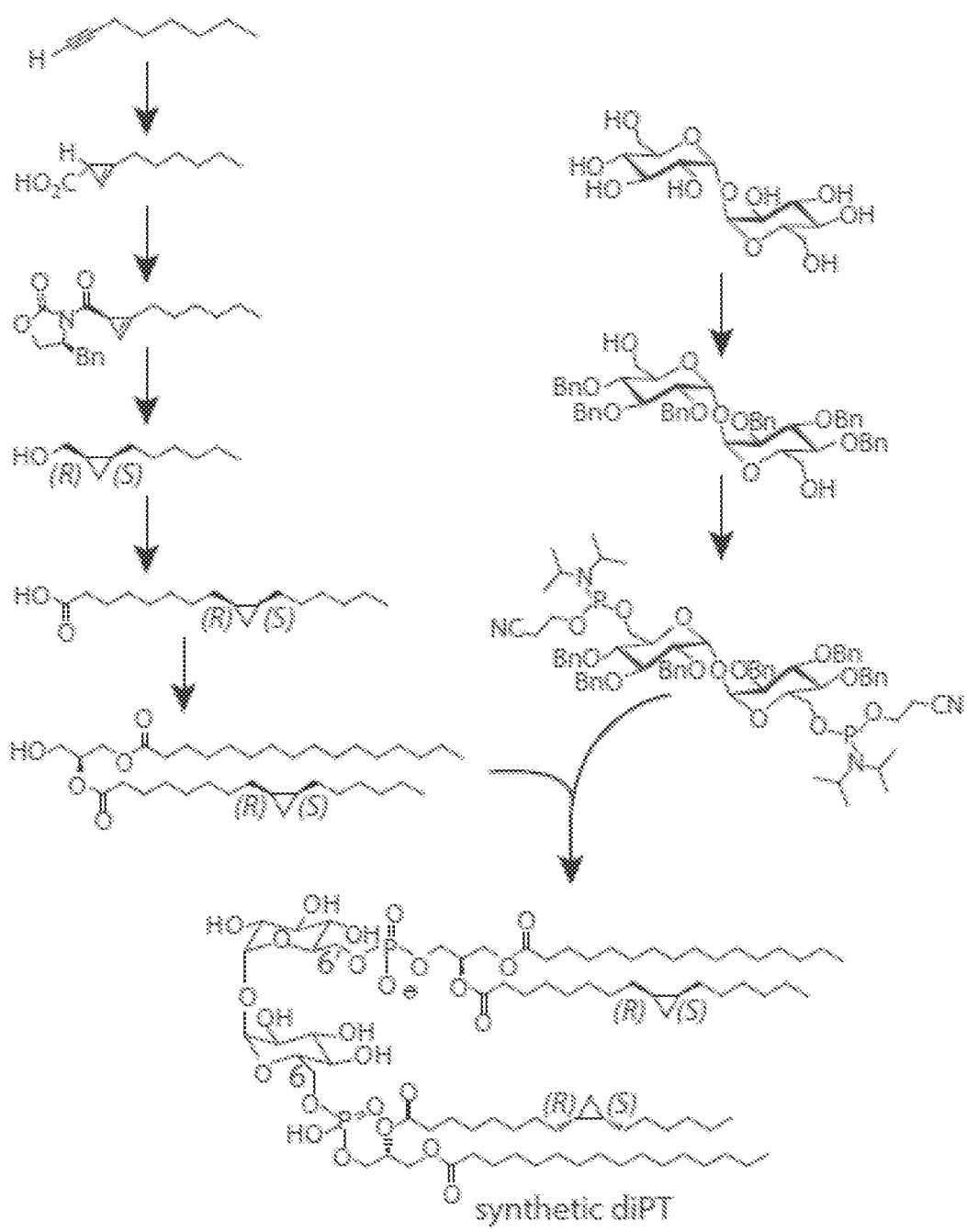
FIG. 3A is a schematic diagram showing the chemical synthesis of diPT containing C17:1 and C16 fatty acyl units such as found in natural diPT.
Figure 3B:
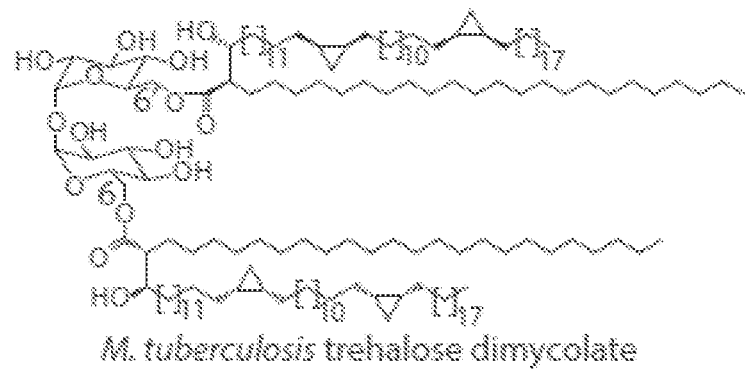
FIG. 3B is a schematic diagram showing the chemical structures of two natural trehalose based lipids, *M. tuberculosis* trehalose dimycolate (TDM, upper) and diacylated sulfoglycolipid (Ac$_2$SGL, lower).
Figure 3B:
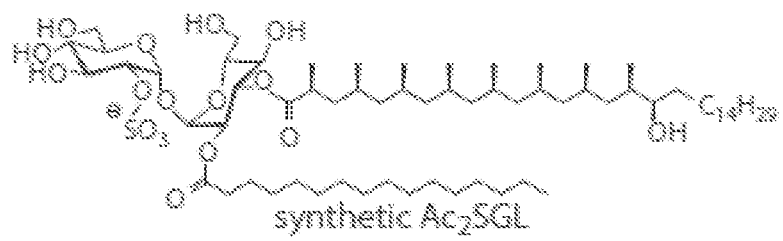
Figure 3C:
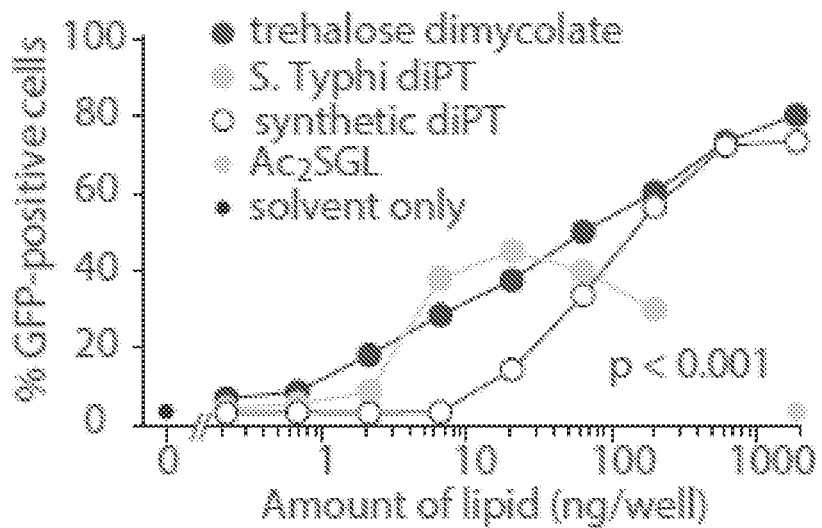
FIG. 3C is a diagram showing the binding of diPT and the Mincle receptor. GFP expression was measured using a murine Mincle-FcRγ reporter cell line and the indicated plate bound lipids (ng/well) in singlicate. Data are representative of five experiments using different combinations and dose of antigens with similar results.
Figure 3D:
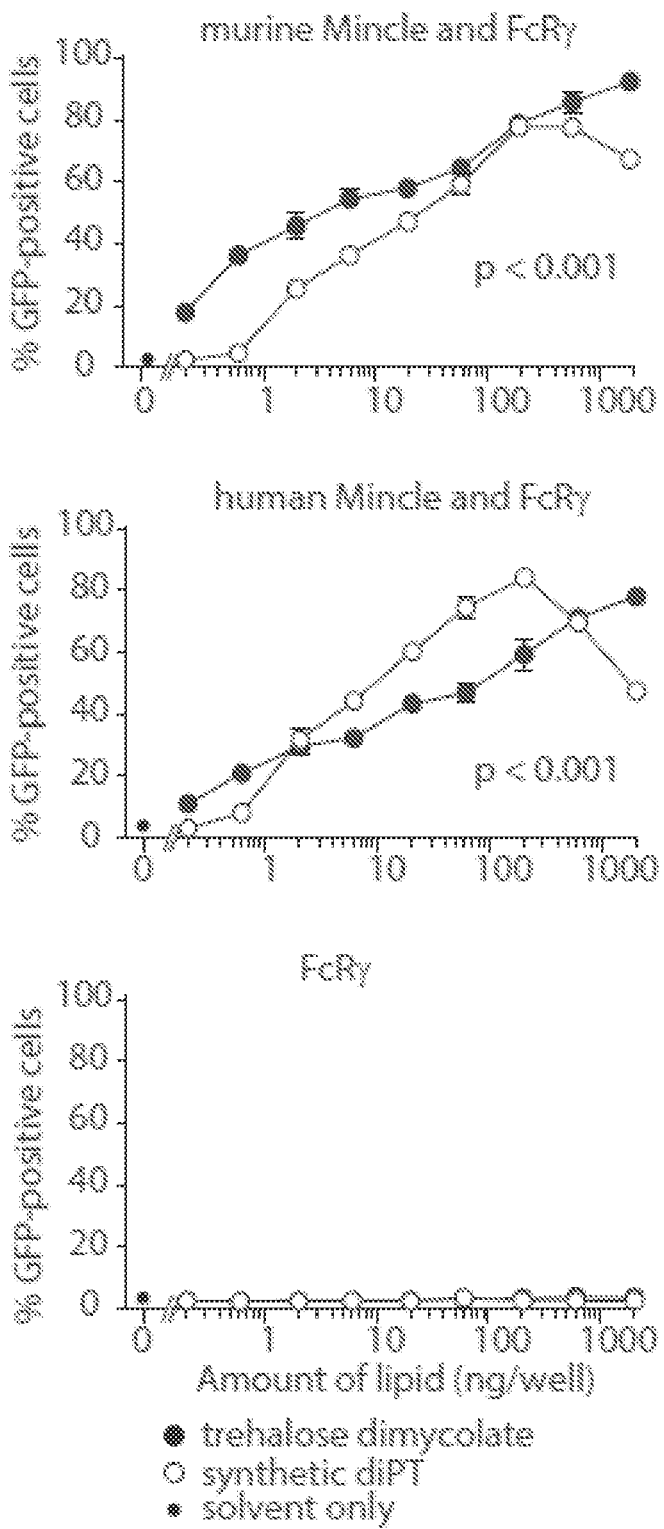
FIG. 3D is a diagram showing the GFP expression of reporter cell lines expressing murine Mincle-FcRγ, human Mincle-FcRγ, or FcRγ alone, after stimulation with trehalose dimycolate or synthetic diPT in triplicate wells. p<0.001 by ANOVA after curve fitting and analysis using the R package drc.

To determine whether diPT is recognized by Mincle, a reporter cell line stably transduced with murine Mincle, its signaling partner, FcRγ and an NFκB-driven green fluorescent protein (GFP) reporter construct was used. Because hydrophobic glycolipids like TDM are integrated in membranes and do not act in solution, bioassays to mimic this interaction rely on first coating wells with lipid and then adding cells in aqueous media. Despite this technical limitation, dose responses are measurable (FIG. 3C). The dose responses to TDM and natural diPT were similar and highly sensitive in absolute terms, with cells responding to 5 ng of coated lipid. Pure synthetic diPT was recognized by Mincle with high sensitivity, with responses seen at 20 ng of coated lipid. Synthetic sulfoglycolipid, a glycolipid substituted at the 2 and 3 positions of trehalose, did not stimulate the Mincle reporter cell line at high doses. Subsequently, murine and human Mincle reporter cell lines were compared and again highly sensitive responses were observed to synthetic diPT, with activation present at nanogram levels. Human Mincle is marginally more sensitive to diPT than to TDM, while for murine Mincle the opposite is true (FIG. 3D). DiPT failed to activate a negative control cell line expressing FcRγ only. Thus, diPT efficiently stimulates Mincle.

Candidate Gene Approach to Biosynthesis

To determine the mechanism of biosynthesis of trehalose phospholipids, a candidate gene approach was used. Considering PT and diPT as carbohydrate-substituted phosphatidylglycerol and mining the *S. typhi* genome, 12 candidate genes for biosynthesis of PT and diPT were identified. Among these 12 candidates are four biosynthetic enzymes that produce trehalose from either glucose 6-phosphate and UDP-glucose (OtsA, OtsB) or from α(1-4)-linked glucose polymers (TreY, TreZ), and a fifth enzyme that shares a domain with PapA3, which is responsible for lipid transfer onto mycobacterial trehalose phleate (EntF). In addition, four enzymes involved in synthesis of phospholipids (PagP, PgpA, PgpB, PgpC) and three putative cardiolipin synthases (ClsA, ClsB, ClsC), which are thought to transfer phosphatidyl units onto phosphatidylglycerol were tested.

Cardiolipin Synthase B is Essential for Trehalose Phospholipids Biosynthesis

Figure 4A:
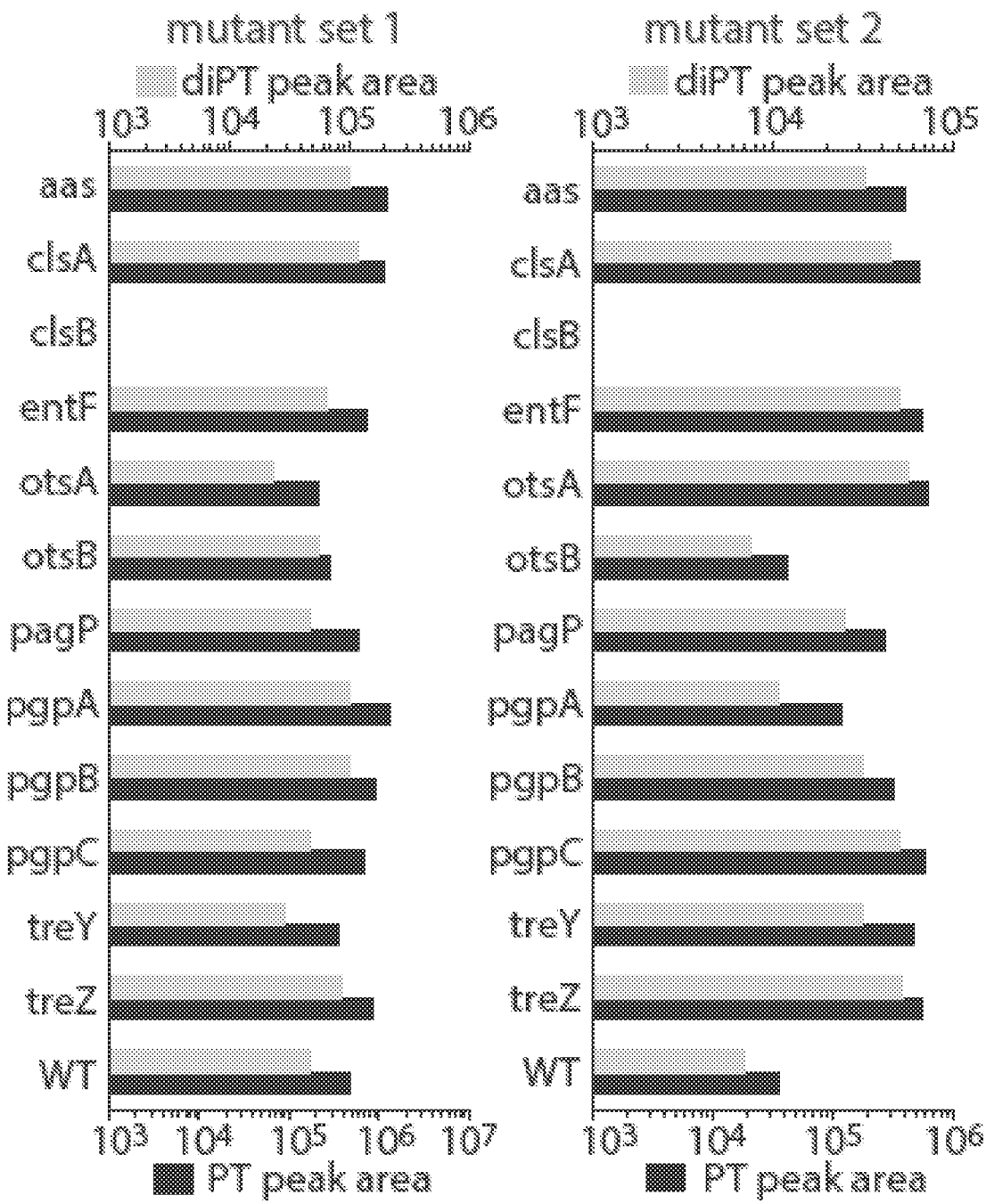
FIG. 4A is a diagram showing the abundance of PT and diPT determined in total lipid extracts from two independently generated sets of *S. typhimurium* single gene knockouts generated by selection under kanamycin (set 1) or chloramphenicol (set 2).
Figure 4B:
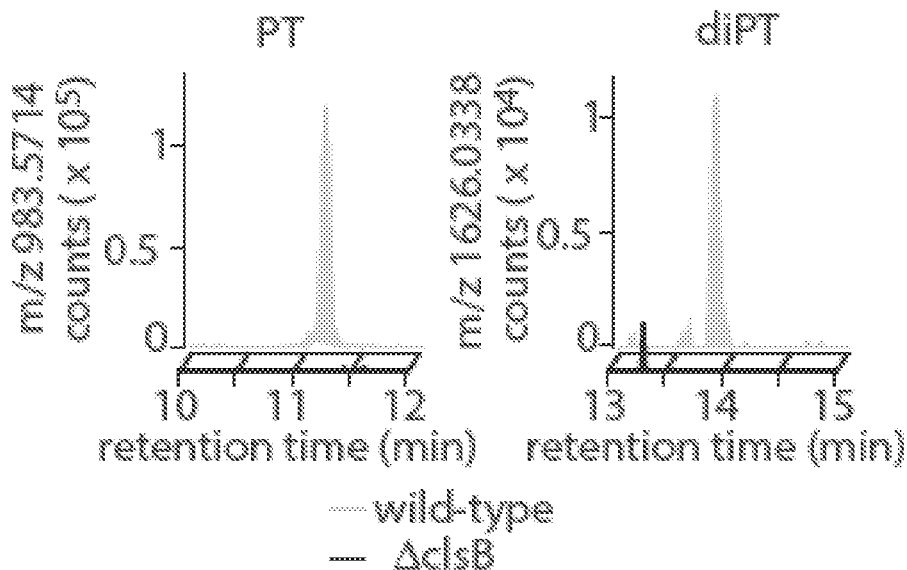
FIG. 4B is a diagram showing the results of ion chromatograms of PT (m/z 983.6) and diPT (m/z 1626) in lipid extracts from wild-type *S. typhimurium* and in *S. typhimurium* ΔclsB.
Figure 4C:
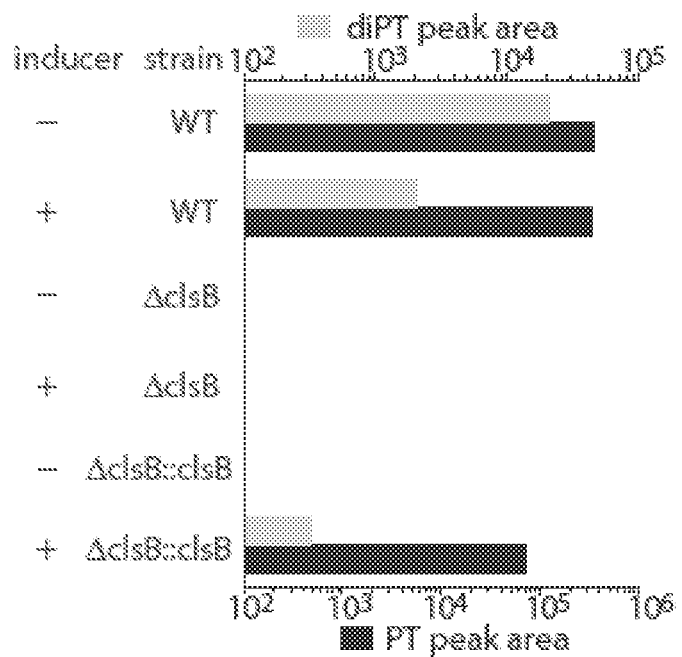
FIG. 4C is a diagram showing the production of PT and diPT in wild-type *S. typhimurium* (WT), *S. typhimurium* ΔclsB mutant (ΔclsB) and genetically complemented *S. typhimurium* ΔclsB (ΔclsB::clsB) in the present or absence of the inducer, arabinose.

Two candidate diPT and PT biosynthetic genes were tested using two sets of single gene knockouts in *S. typhimurium*, which were generated independently as kanamycin or chloramphenicol selected mutants (Porwollik et al., 2014). Because diPT did not resolve well on normal phase HPLC-MS, a suitable reverse phase HPLC method was developed that could reliably detect both PT and diPT. An equivalent mass of total lipid, as determined by weighing dry lipid, from each single gene knockout (FIG. 4A) was analyzed using phosphatidylethanolamine (PE) as a secondary loading control (Table 2). This screen provided a clear result that was reproducible in both sets of mutants and for both lipids, with essentially all or nothing effects for each gene studied. Of 12 candidates, 11 genes (aas, clsA, entF, otsA, ostB, pagP, pgpA, pgpB, pgpC, treY, treZ) were non-essential for biosynthesis (FIG. 4A). There was no trehalose in the culture media, yet trehalose phospholipids persisted in single gene knockouts in trehalose biosynthesis pathways. This outcome likely resulted from the existence of independent routes to trehalose production, which involve either glucose-6-phosphate (OtsA, OtsB) or maltose and maltodextran (TreY, TreZ, TreT, TreS) intermediates. Only the clsB single gene knockout showed loss of PT and diPT in both mutant sets, while PE levels were unchanged (FIGS. 4A-4B and Table 2). That this loss of PT and diPT was observed in two independently generated single gene knockout sets reduces the likelihood that lipid loss was due to an unrelated second hit occurring elsewhere in the genome of clsB mutants. In addition, a genetically complemented clsB knockout using an arabinose-inducible system was generated. Only when treated with arabinose, the reconstituted clsB knockout (ΔclsB::clsB) produced PT and diPT, demonstrating that clsB is necessary and sufficient for its production (FIG. 4C). In the wild type strain, arabinose treatment partially diminished diPT synthesis for unknown reasons, which might partly explain why the arabinose-treated, genetically complemented strains did not fully restore lipid production to wild type levels. Taken together, these data demonstrate that ClsB as an essential enzyme for the synthesis of trehalose phospholipids.

The acronym clsB (previously known as ybhO or f413) stands for cardiolipin (CL) synthase B (Guo and Tropp, 2000), an assignment based on sequence homology rather than direct demonstration of this enzymatic role. Using HPLC-MS to detect signals (m/z 1390) at the retention time of a CL standard, no significant change in the intensity or shape of the biphasic peak assigned to CL in the clsB knockouts was observed (FIG. 4D and Table 2). Therefore, clsB is non-essential, and under the conditions tested, does not affect CL concentration. Although an adjunctive role in CL biosynthesis might be masked by parallel functions of ClsA and ClsC, the simplest interpretation is that ClsB is, despite its name, not a CL synthase. Instead of coupling phosphatidic acid to phosphatidylglycerol, ClsB couples phosphatidic acid to trehalose.

The clsB knockout strain represented a new tool to determine if diPT and PT, considered among all cell wall lipids, were essential to stimulate Mincle. Firstly, total lipid extract from wild type *S. typhimurium* stimulated Mincle (FIG. 4E). Secondly, the total lipid extract from ΔclsB bacteria did not stimulate human or murine Mincle reporter lines (FIG. 4E), indicating that among all lipids in *S. typhimurium*, the diPT pathway is the dominant or sole source of Mincle ligands.

TABLE 2

Abundance of PT, diPT, phosphatidylethanolamine, and cardiolipin in *S. Typhimurium* single gene knockouts

| Gene mutated | m/z 983 (PT) | m/z 1626 (diPT) | m/z 647 (PE) | m/z 1389 (cardiolipin) |
|---|---|---|---|---|
| Kanamycin-selected mutants peak area (×10³) | | | | |
| Aas | 1202 | 100 | 1289 | 1533 |
| ClsA | 1147 | 121 | 1632 | 1366 |
| ClsB | 0 | 0 | 1827 | 973 |
| EntF | 723 | 64 | 1919 | 1296 |
| OtsA | 214 | 23 | 1731 | 1651 |
| OtsB | 278 | 56 | 1957 | 1652 |
| PagP | 567 | 47 | 1831 | 1120 |
| PgpA | 1274 | 104 | 1677 | 1453 |
| PgpB | 932 | 103 | 1733 | 1586 |
| PgpC | 661 | 48 | 1919 | 1581 |
| TreY | 349 | 28 | 2072 | 1219 |
| TreZ | 833 | 87 | 2215 | 1417 |
| WT | 467 | 48 | 1740 | 1360 |
| Chloramphenicol-selected mutants peak area (×10³) | | | | |
| Aas | 392 | 33 | 718 | 636 |
| ClsA | 522 | 46 | 818 | 331 |
| ClsB | 0 | 0 | 728 | 581 |
| EntF | 560 | 51 | 919 | 724 |
| OtsA | 631 | 57 | 906 | 660 |
| OtsB | 42 | 7.6 | 933 | 623 |
| PagP | 278 | 25 | 791 | 701 |
| PgpA | 119 | 11 | 904 | 880 |
| PgpB | 316 | 31 | 891 | 668 |
| PgpC | 593 | 50 | 716 | 379 |
| TreY | 482 | 31 | 1052 | 794 |
| TreZ | 566 | 53 | 789 | 680 |
| WT | 36 | 6.9 | 972 | 657 |

Total lipid extracts from the indicated *S. typhimurium* single gene knockouts were analyzed by reverse phase HPLC-MS. Areas under the indicated extracted ion chromatograms are shown for PT (m/z 983.5714±10 ppm), diPT (1626.0338±10 ppm), phosphatidylethanolamine (PE) (674.4770±10 ppm, and cardiolipin (1389.9806±10 ppm).

Example III. Genetic and Chemical Phylogeny of Clsb and diPT

After the initial identification of trehalose phospholipids in *S. typhi, S. typhimurium, S. enteritidis*, and *S. paratyphi*, the distribution of these compounds among bacteria was investigated. Also, given that PT and diPT were discovered in enteric bacteria, the specific question arises as to whether humans are continuously exposed to trehalose phospholipids via intestinal microbiota or through infection with enteric pathogens. First, a basic local alignment search tool (BLAST)-reverse BLAST-based approach was used to ask whether a *S. typhi* ClsB ortholog is present in genomes of closely and distantly related bacterial genera (FIGS. 5A-5B). The four studied *Salmonella enterica* strains had clsB genes predicted to encode proteins that were 100% identical, and *S. bongori* encoded a 99% identical protein. The genomes of species belonging to β- and γ-proteobacterial *Escherichia, Shigella, Pseudomonas*, and *Bordetella* encoded ClsB proteins that ranged from 51-87% identity to *S. typhi* ClsB protein. No identifiable ClsB orthologs among α- and ε-proteobacteria, nor among more distant groups such as Gram-positive bacteria and actinobacteria was found. In all bacterial species found to have a ClsB ortholog, a ClsA ortholog, which has an established role in cardiolipin synthesis, was also present. Furthermore, phylogenetic analysis showed that ClsA, ClsB and ClsC form distinct monophyletic branches clearly separating the three enzymes (FIG. 5B).

Figure 5C:
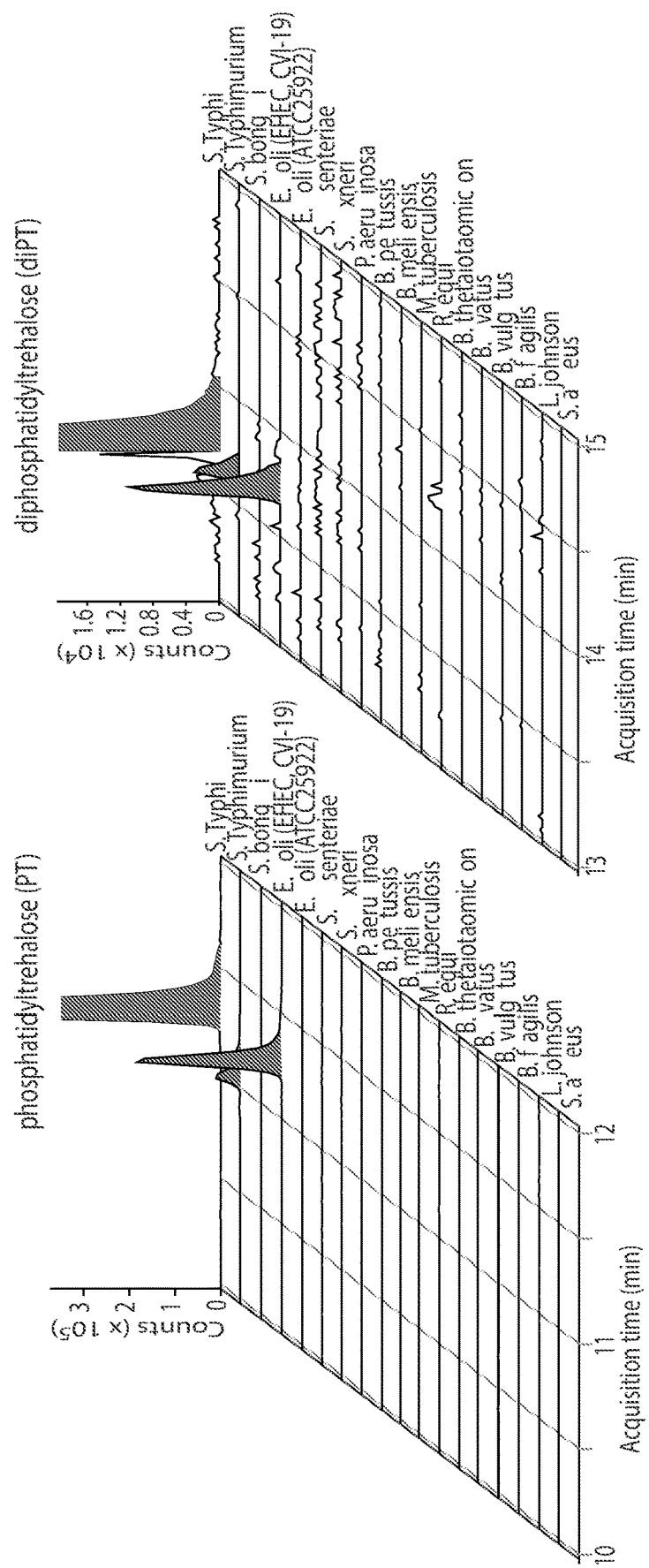
FIG. 5C is a diagram showing the HPLC-TOF-MS yielded extracted ion chromatograms matching the mass of PT and diPT for the indicated bacterial strains.
Figures 5D, 5E:
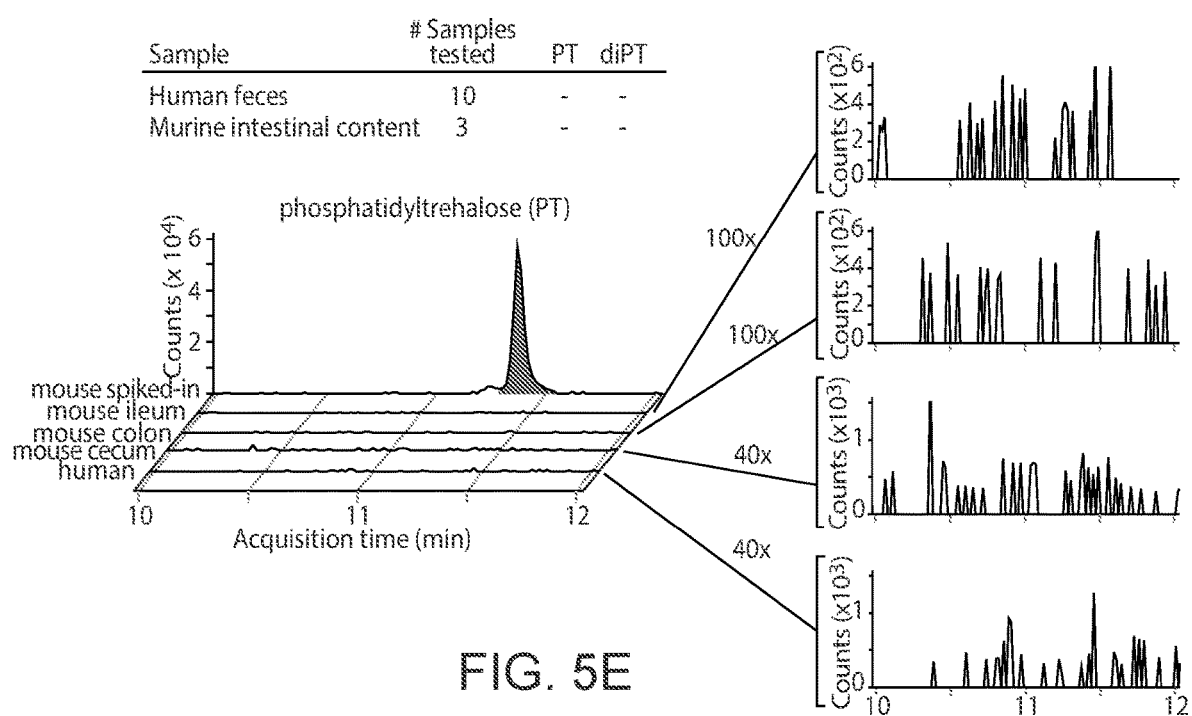
FIG. 5D shows the amino acid identity of the translated clsB genes to *S. typhi* ClsB and results of HPLC-MS-based chemotyping for PT and diPT are summarized (+: detected; −: not detected).
FIG. 5E is a diagram showing extracted ion chromatograms corresponding to the mass of PT and diPT in lipid extracts of human fecal samples, samples of murine intestinal content, and a positive control sample consisting of murine intestinal content pre-spiked with *S. typhi* total lipid extract before processing. Results are representative of 10 human and 3 mouse fecal samples, and positive signals would not be detected after increasing gain by 40-100 fold (insets).

To determine the extent to which such phylogenetic comparisons using gene homology analysis correctly predict the diPT and PT chemotypes, HPLC-MS to chemotype 16 broadly divergent species highlighted in the bioinformatic analysis was used (FIGS. 5C-5D). Despite high similarity (99%) with the *S. typhi* clsB gene, there was no detection of diPT or PT in *S. bongori*, or in other species in which a clsB ortholog was found, including *Pseudomonas aeruginosa, Bordetella pertussis*, and *Shigella* species.

These results pointed to diPT as a strain-specific phenotype present in certain gastrointestinal pathogens, but the unexpected detection of diPT in *E. coli* strains raised questions about its possible role in the intestinal microbiome. Although feces represents a complex mixture of bacteria, *E. coli* is a common and abundant species in human feces, and in vitro evidence for high trehalose phospholipid production by this and other enteric bacteria raise the question of whether this compound can be detected in stool. Therefore, the existence of trehalose phospholipids in mouse and human stool samples were investigated by HPLC-MS. Neither PT nor diPT was detected in any of 10 human fecal samples, nor in murine ileum, colon, or cecum contents. This result held true for standard HPLC-MS readouts and also when signals were amplified 40-100-fold to assess diPT signal at the limit of detection by MS (FIG. 5E). Separation by HPLC prior to ionization greatly reduces cross-suppression. A spike in positive control of an *S. typhi* lipid extract containing an estimated amount of 20 μg PT and diPT generated strong trehalose phospholipid signals (FIG. 5E). Thus, trehalose phospholipids are undetectable or absent from the normal intestinal microbiota.

Overall, these data indicate that production of diPT is a strain- or serovar-specific phenotype and varies among isolates of the same species. ClsB ortholog searches are not sufficient to predict the presence of diPT, highlighting the usefulness of lipid chemotyping assays. Further, these results reveal a general pattern that diPT is restricted to a subset of Gram-negative bacteria: it is found in pathogens but not gastrointestinal flora of healthy donors. Considering its role as an agonist for Mincle, a widely expressed innate immune pattern recognition receptor in humans, diPT becomes a candidate for adjuvant development, control of virulence, and a new marker of clinical interest to physicians.

REFERENCES

Adam, A., M. Senn, E. Vilkas, and E. Lederer. 1967. [Mass spectrometry of glycolipids. 2. Natural and synthetic diesters of trehalose]. Eur. J. Biochem. 2:460-468.

Andrews, J. R., S. Baker, F. Marks, M. Alsan, D. Garrett, B. G. Gellin, S. K. Saha, F. N. Qamar, M. T. Yousafzai, Bogoch, II, M. Antillon, V. E. Pitzer, J. H. Kim, J. John, J. Gauld, V. Mogasale, E. T. Ryan, S. P. Luby, and N. C. Lo. 2018. Typhoid conjugate vaccines: a new tool in the fight against antimicrobial resistance. Lancet Infect. Dis.

Backus, K. M., M. A. Dolan, C. S. Barry, M. Joe, P. McPhie, H. I. Boshoff, T. L. Lowary, B. G. Davis, and C. E. Barry, 3rd. 2014. The three *Mycobacterium tuberculosis* antigen 85 isoforms have unique substrates and activities determined by non-active site regions. J. Biol. Chem. 289:25041-25053.

Behler-Janbeck, F., T. Takano, R. Maus, J. Stolper, D. Jonigk, M. Tort Tarres, T. Fuehner, A. Prasse, T. Welte, M. S. Timmer, B. L. Stocker, Y. Nakanishi, T. Miyamoto, S. Yamasaki, and U. A. Maus. 2016. C-type Lectin Mincle Recognizes Glucosyl-diacylglycerol of *Streptococcus pneumoniae* and Plays a Protective Role in Pneumococcal Pneumonia. PLoS Pathog. 12:e1006038.

Belisle, J. T., V. D. Vissa, T. Sievert, K. Takayama, P. J. Brennan, and G. S. Besra. 1997. Role of the major antigen of *Mycobacterium tuberculosis* in cell wall biogenesis. Science 276:1420-1422.

Burbaud, S., F. Laval, A. Lemassu, M. Daffe, C. Guilhot, and C. Chalut. 2016. Trehalose Polyphleates Are Produced by a Glycolipid Biosynthetic Pathway Conserved across Phylogenetically Distant Mycobacteria. Cell chemical biology 23:278-289. Capella-Gutierrez, S., J. M. Silla-Martinez, and T. Gabaldon. 2009. trimAl: a tool for automated alignment trimming in large-scale phylogenetic analyses. Bioinformatics 25:1972-1973.

Coxon, G., S. Knobl, E. Roberts, M. S. Baird, J. R. Al Dulayymi, G. Besra, P. J. Brennan, and D. E. Minnikin. 1999. The synthesis of both enantiomers of lactobacillic acid and mycolic acid analogues. Tetrahedron Lett. 40:6689-6692.

Decout, A., S. Silva-Gomes, D. Drocourt, S. Barbe, I. Andre, F. J. Cueto, T. Lioux, D. Sancho, E. Perouzel, A. Vercellone, J. Prandi, M. Gilleron, G. Tiraby, and J. Nigou. 2017. Rational design of adjuvants targeting the C-type lectin Mincle. Proc. Natl. Acad. Sci. U.S.A. 114:2675-2680.

Del Fresno, C., S. Iborra, P. Saz-Leal, M. Martinez-Lopez, and D. Sancho. 2018. Flexible Signaling of Myeloid C-Type Lectin Receptors in Immunity and Inflammation. Frontiers in immunology 9:804.

Edgar, R. C. 2004. MUSCLE: multiple sequence alignment with high accuracy and high throughput. Nucleic Acids Res 32:1792-1797.

Editorial on Nobel Prize to Immunology. 2011. Nature Reviews Immunology 11:714. Fahy, E., S. Subramaniam, R. C. Murphy, M. Nishijima, C. R. Raetz, T. Shimizu, F. Spener, G. van Meer, M. J. Wakelam, and E. A. Dennis. 2009. Update of the LIPID MAPS comprehensive classification system for lipids. J. Lipid Res. 50 Suppl:S9-14.

Feinberg, H., S. A. Jegouzo, T. J. Rowntree, Y. Guan, M. A. Brash, M. E. Taylor, W. I. Weis, and K. Drickamer. 2013. Mechanism for recognition of an unusual mycobacterial glycolipid by the macrophage receptor mincle. J. Biol. Chem. 288:28457-28465.

Fodran, P., and A. J. Minnaard. 2013. Catalytic synthesis of enantiopure mixed diacylglycerols—synthesis of a major *M. tuberculosis* phospholipid and platelet activating factor. Org. Biomol. Chem. 11:6919-6928.

Furukawa, A., J. Kamishikiryo, D. Mori, K. Toyonaga, Y. Okabe, A. Toji, R. Kanda, Y. Miyake, T. Ose, S. Yamasaki, and K. Maenaka. 2013. Structural analysis for glycolipid recognition by the C-type lectins Mincle and MCL. Proc. Natl. Acad. Sci. U.S.A 110:17438-17443.

Geisel, R. E., K. Sakamoto, D. G. Russell, and E. R. Rhoades. 2005. In vivo activity of released cell wall lipids of *Mycobacterium bovis bacillus* Calmette-Guerin is due principally to trehalose mycolates. J. Immunol. 174:5007-5015.

Gheysen, K., C. Mihai, K. Conrath, and J. C. Martins. 2008. Rapid identification of common hexapyranose monosaccharide units by a simple TOCSY matching approach. Chemistry 14:8869-8878.

Gilbertson, S., and C.-W. Chang. 1995. Synthesis of New Disugar Phosphine Ligands and Their Use in Asymmetric Hydrogenation. The Journal of Organic Chemistry 60:6226-6228.

Grogan, D. W., and J. E. Cronan, Jr. 1997. Cyclopropane ring formation in membrane lipids of bacteria. Microbiology and molecular biology reviews: MMBR 61:429-441. Guo, D., and B. E. Tropp. 2000. A second *Escherichia coli* protein with CL synthase activity. Biochim. Biophys. Acta 1483:263-274.

Hildebrand, J. G., and J. H. Law. 1964. Fatty Acid Distribution in Bacterial Phospholipids. The Specificity of the Cyclopropane Synthetase Reaction. Biochemistry (Mosc.) 3:1304-1308.

Holten-Andersen, L., T. M. Doherty, K. S. Korsholm, and P. Andersen. 2004. Combination of the cationic surfactant dimethyl dioctadecyl ammonium bromide and synthetic mycobacterial cord factor as an efficient adjuvant for tuberculosis subunit vaccines. Infect. Immun. 72:1608-1617.

Ishikawa, E., T. Ishikawa, Y. S. Morita, K. Toyonaga, H. Yamada, O. Takeuchi, T. Kinoshita, S. Akira, Y. Yoshikai, and S. Yamasaki. 2009. Direct recognition of the mycobacterial glycolipid, trehalose dimycolate, by C-type lectin Mincle. J. Exp. Med. 206:2879-2888.

Jacobsen, E. N., F. Kakiuchi, R. G. Konsler, J. F. Larrow, and M. Tokunaga. 1997. Enantioselective catalytic ring opening of epoxides with carboxylic acids. Tetrahedron Lett. 38:773-776.

James, C. A., K. K. Q. Yu, M. Gilleron, J. Prandi, V. R. Yedulla, Z. Z. Moleda, E. Diamanti, M. Khan, V. K. Aggarwal, J. F. Reijneveld, P. Reinink, S. Lenz, R. O. Emerson, T. J. Scriba, M. N. T. Souter, D. I. Godfrey, D. G. Pellicci, D. B. Moody, A. J. Minnaard, C. Seshadri, and I. Van Rhijn. 2018. CD1b Tetramers Identify T Cells that Recognize Natural and Synthetic Diacylated Sulfoglycolipids from *Mycobacterium tuberculosis*. Cell chemical biology 25:392-402 e314.

Knothe, G. 2006. NMR characterization of dihydrosterculic acid and its methyl ester. Lipids 41:393-396.

Layre, E., A. de Jong, and D. B. Moody. 2014. Human T cells use CD1 and MR1 to recognize lipids and small molecules. Curr. Opin. Chem. Biol. 23:31-38.

Layre, E., and D. B. Moody. 2013. Lipidomic profiling of model organisms and the world's major pathogens. Biochimie 95:109-115.

Layre, E., L. Sweet, S. Hong, C. A. Madigan, D. Desjardins, D. C. Young, T. Y. Cheng, J. W. Annand, K. Kim, I. C. Shamputa, M. J. McConnell, C. A. Debono, S. M. Behar, A. J. Minnaard, M. Murray, C. E. Barry, 3rd, I. Matsunaga, and D. B. Moody. 2011. A comparative lipidomics platform for chemotaxonomic analysis of *Mycobacterium tuberculosis*. Chem. Biol. 18:1537-1549.

Li, C., B. K. Tan, J. Zhao, and Z. Guan. 2016. In Vivo and in Vitro Synthesis of Phosphatidylglycerol by an *Escherichia coli* Cardiolipin Synthase. J. Biol. Chem. 291:25144-25153.

Liao, L., F. Zhang, N. Yan, J. A. Golen, and J. M. Fox. 2004. An efficient and general method for resolving cyclopropene carboxylic acids. Tetrahedron 60:1803-1816.

Madigan, C. A., T. Y. Cheng, E. Layre, D. C. Young, M. J. McConnell, C. A. Debono, J. P. Murry, J. R. Wei, C. E. Barry, 3rd, G. M. Rodriguez, I. Matsunaga, E. J. Rubin, and D. B. Moody. 2012. Lipidomic discovery of deoxysiderophores reveals a revised mycobactin biosynthesis pathway in *Mycobacterium tuberculosis*. Proc. Natl. Acad. Sci. U.S.A 109:1257-1262.

Matsunaga, I., A. Bhatt, D. C. Young, T. Y. Cheng, S. J. Eyles, G. S. Besra, V. Briken, S. A. Porcelli, C. E. Costello, W. R. Jacobs, Jr., and D. B. Moody. 2004. *Mycobacterium tuberculosis* pks12 produces a novel polyketide presented by CD1c to T cells. J. Exp. Med. 200:1559-1569.

Mogasale, V., B. Maskery, R. L. Ochiai, J. S. Lee, V. V. Mogasale, E. Ramani, Y. E. Kim, J. K. Park, and T. F. Wierzba. 2014. Burden of typhoid fever in low-income and middle-income countries: a systematic, literature-based update with risk-factor adjustment. The Lancet. Global health 2:e570-580.

Moody, D. B., T. Ulrichs, W. Muhlecker, D. C. Young, S. S. Gurcha, E. Grant, J. P. Rosat, M. B. Brenner, C. E. Costello, G. S. Besra, and S. A. Porcelli. 2000. CD1c-mediated T-cell recognition of isoprenoid glycolipids in *Mycobacterium tuberculosis* infection. Nature 20; 404:884-888.

Moody, D. B., D. C. Young, T. Y. Cheng, J. P. Rosat, C. Roura-Mir, P. B. O'Connor, D. M. Zajonc, A. Walz, M. J. Miller, S. B. Levery, I. A. Wilson, C. E. Costello, and M. B. Brenner. 2004. T cell activation by lipopeptide antigens. Science 303:527-531.

Nagata, M., Y. Izumi, E. Ishikawa, R. Kiyotake, R. Doi, S. Iwai, Z. Omandi, T. Yamaji, T. Miyamoto, T. Bamba, and S. Yamasaki. 2017. Intracellular metabolite beta-glucosylceramide is an endogenous Mincle ligand possessing immunostimulatory activity. Proc. Natl. Acad. Sci. U.S.A. 114:E3285-E3294.

Nguyen, L. T., H. A. Schmidt, A. von Haeseler, and B. Q. Minh. 2015. IQ-TREE: a fast and effective stochastic algorithm for estimating maximum-likelihood phylogenies. Mol. Biol. Evol. 32:268-274.

Oda, M., H. Yamamoto, M. Shibutani, M. Nakano, K. Yabiku, T. Tarui, N. Kameyama, D. Shirakawa, S. Obayashi, N. Watanabe, H. Nakase, M. Suenaga, Y. Matsunaga, M. Nagahama, H. Takahashi, H. Imagawa, M. Kurosawa, Y. Terao, M. Nishizawa, and J. Sakurai. 2014. Vizantin inhibits endotoxin-mediated immune responses via the TLR 4/MD-2 complex. J. Immunol. 193:4507-4514.

Perez-Victoria, I., S. Kemper, M. K. Patel, J. M. Edwards, J. C. Errey, L. F. Primavesi, M. J. Paul, T. D. Claridge, and B. G. Davis. 2009. Saturation transfer difference NMR reveals functionally essential kinetic differences for a sugar-binding repressor protein. Chem Commun (Camb) 5862-5864.

Pimm, M. V., R. W. Baldwin, J. Polonsky, and E. Lederer. 1979. Immunotherapy of an ascitic rat hepatoma with cord factor (trehalose-6, 6'-dimycolate) and synthetic analogues. Int. J. Cancer 24:780-785.

Poltorak, A., X. He, I. Smirnova, M. Y. Liu, C. Van Huffel, X. Du, D. Birdwell, E. Alejos, M. Silva, C. Galanos, M. Freudenberg, P. Ricciardi-Castagnoli, B. Layton, and B. Beutler. 1998. Defective LPS signaling in C3H/HeJ and C57BL/10ScCr mice: mutations in Tlr4 gene. Science 282:2085-2088.

Porwollik, S., C. A. Santiviago, P. Cheng, F. Long, P. Desai, J. Fredlund, S. Srikumar, C. A. Silva, W. Chu, X. Chen, R. Canals, M. M. Reynolds, L. Bogomolnaya, C. Shields, P. Cui, J. Guo, Y. Zheng, T. Endicott-Yazdani, H. J. Yang, A. Maple, Y. Ragoza, C. J. Blondel, C. Valenzuela, H. Andrews-Polymenis, and M. McClelland. 2014. Defined single-gene and multi-gene deletion mutant collections in *Salmonella enterica* sv *Typhimurium*. PloS one 9:e99820.

Ritchie, M. E., B. Phipson, D. Wu, Y. Hu, C. W. Law, W. Shi, and G. K. Smyth. 2015. limma powers differential expression analyses for RNA-sequencing and microarray studies. Nucleic Acids Res 43:e47.

Ronquist, F., M. Teslenko, P. van der Mark, D. L. Ayres, A. Darling, S. Hohna, B. Larget, L. Liu, M. A. Suchard, and J. P. Huelsenbeck. 2012. MrBayes 3.2: efficient Bayesian phylogenetic inference and model choice across a large model space. Syst. Biol. 61:539-542.

Roslund, M. U., P. Tahtinen, M. Niemitz, and R. Sjoholm. 2008. Complete assignments of the (1)H and (13)C chemical shifts and J(H,H) coupling constants in NMR spectra of D-glucopyranose and all D-glucopyranosyl-D-glucopyranosides. Carbohydr. Res. 343:101-112.

Rossi, R. M., L. Yum, H. Agaisse, and S. M. Payne. 2017. Cardiolipin Synthesis and Outer Membrane Localization Are Required for *Shigella flexneri* Virulence. mBio 8:

Shah, S., J. M. White, and S. J. Williams. 2014. Total syntheses of cis-cyclopropane fatty acids: dihydromalvalic acid, dihydrosterculic acid, lactobacillic acid, and 9,10-methylenehexadecanoic acid. Org. Biomol. Chem. 12:9427-9438.

Shenderov, K., D. L. Barber, K. D. Mayer-Barber, S. S. Gurcha, D. Jankovic, C. G. Feng, S. Oland, S. Hieny, P. Caspar, S. Yamasaki, X. Lin, J. P. Ting, G. Trinchieri, G. S. Besra, V. Cerundolo, and A. Sher. 2013. Cord factor and peptidoglycan recapitulate the Th17-promoting adjuvant activity of mycobacteria through mincle/CARD9 signaling and the inflammasome. J. Immunol. 190:5722-5730.

Smit, C., M. W. Fraaije, and A. J. Minnaard. 2008. Reduction of carbon-carbon double bonds using organocatalytically generated diimide. J. Org. Chem. 73:9482-9485.

Smith, C. A., E. J. Want, G. O'Maille, R. Abagyan, and G. Siuzdak. 2006. XCMS: processing mass spectrometry data for metabolite profiling using nonlinear peak alignment, matching, and identification. Anal. Chem. 78:779-787.

Soldner, C. A., A. H. C. Horn, and H. Sticht. 2018. Interaction of Glycolipids with the Macrophage Surface Receptor Mincle—a Systematic Molecular Dynamics Study. Sci Rep 8:5374.

Tan, B. K., M. Bogdanov, J. Zhao, W. Dowhan, C. R. Raetz, and Z. Guan. 2012. Discovery of a cardiolipin synthase utilizing phosphatidylethanolamine and phosphatidylglycerol as substrates. Proc. Natl. Acad. Sci. U.S.A. 109:16504-16509.

Wang, Y., and R. I. Hollingsworth. 1995. A solvent system for the high-resolution proton nuclear magnetic resonance spectroscopy of membrane lipids. Anal. Biochem. 225: 242-251.

Werninghaus, K., A. Babiak, O. Gross, C. Holscher, H. Dietrich, E. M. Agger, J. Mages, A. Mocsai, H. Schoenen, K. Finger, F. Nimmerjahn, G. D. Brown, C. Kirschning, A. Heit, P. Andersen, H. Wagner, J. Ruland, and R. Lang. 2009. Adjuvanticity of a synthetic cord factor analogue for subunit *Mycobacterium tuberculosis* vaccination requires FcRgamma-Syk-Card9-dependent innate immune activation. J. Exp. Med. 206:89-97.

World Health Organization. 2018. Global Health Estimates 2016: Deaths by Cause, Age, Sex, by Country and by Region, 2000-2016. Geneva, WHO Yamasaki, S., E. Ishikawa, M. Sakuma, H. Hara, K. Ogata, and T. Saito. 2008. Mincle is an ITAM-coupled activating receptor that senses damaged cells. Nat. Immunol. 9:1179-1188.

Thalen, M., I. J. van den, W. Jiskoot, B. Zomer, P. Roholl, C. de Gooijer, C. Beuvery, and J. Tramper. 1999. Rational medium design for *Bordetella pertussis*: basic metabolism. J. Biotechnol. 75:147-159.

Zitomersky, N. L., M. J. Coyne, and L. E. Comstock. 2011. Longitudinal analysis of the prevalence, maintenance, and IgA response to species of the order Bacteroidales in the human gut. Infect. Immun. 79:2012-2020. PMC3088145.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A compound of Formula (IV)

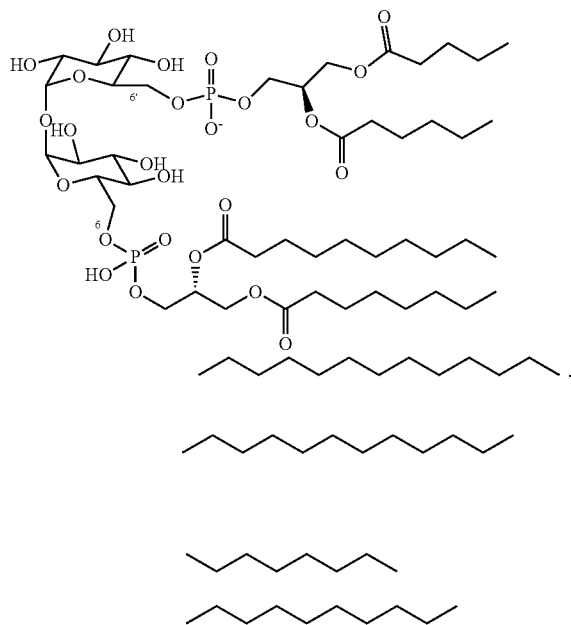

2. A pharmaceutical composition comprising a compound of claim 1, and a pharmaceutically acceptable carrier.

3. An adjuvant comprising an effective amount of the pharmaceutical composition of claim 2.

4. A composition comprising a compound of Formula (I):

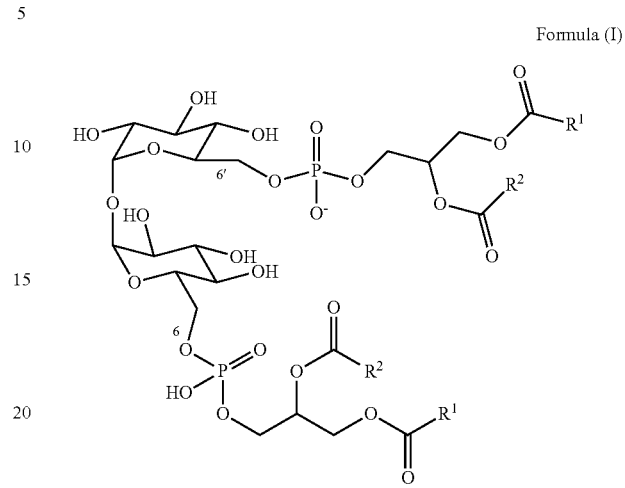

wherein $R^1$ is a saturated or unsaturated fatty acid alkyl and $R^2$ is a saturated or unsaturated fatty acid alkyl, a pharmaceutically acceptable carrier, and an antigen.

5. The composition of claim 4, wherein the antigen is a virus antigen, a bacterium antigen, a parasite or protozoa antigen, or a fungus antigen.

6. The composition of claim 4, wherein the compound is a compound of Formula (III)

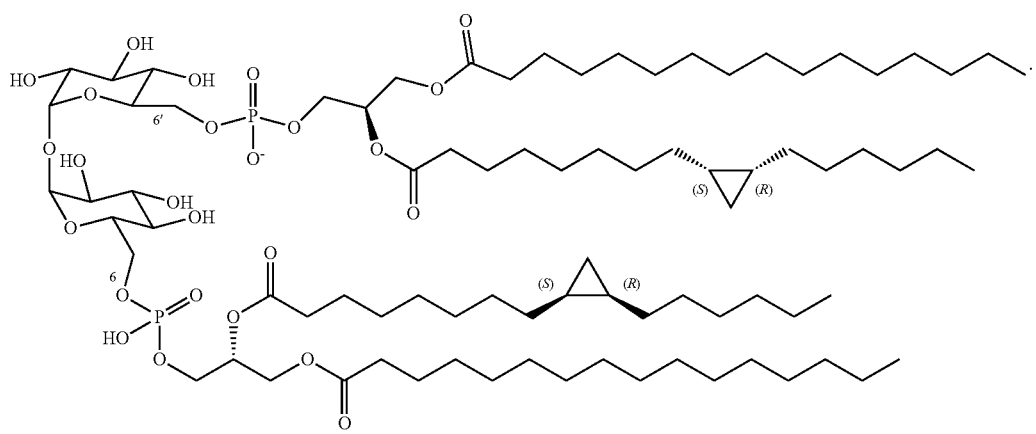

7. The composition of claim 4, wherein the compound is a compound of Formula (IV)
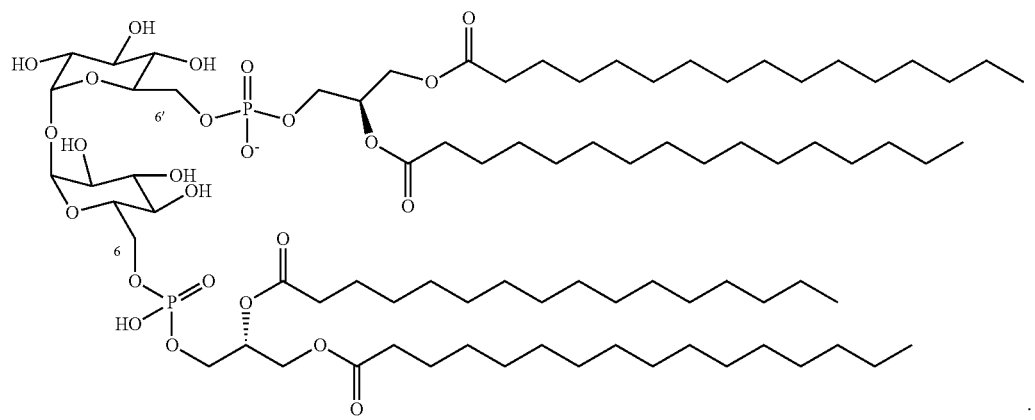
Formula (IV)
8. The composition of claim 4, wherein the compound is a compound of Formula (V)
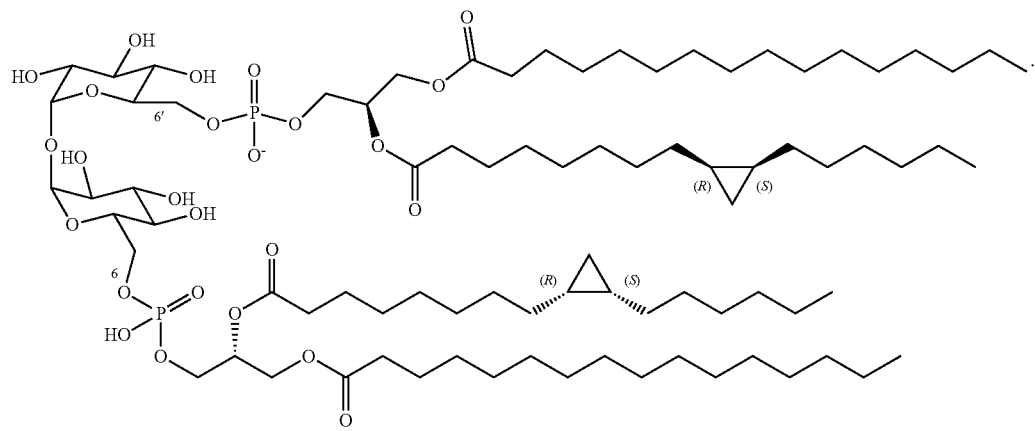
Formula (V)

9. A method of provoking an immune response to an antigen in a subject, the method comprising administering to the subject an effective amount of the composition of claim 4.

10. The method of claim 9, wherein the composition is administered subcutaneously.

\* \* \* \* \*